US010346899B2

(12) United States Patent
Holman et al.

(10) Patent No.: US 10,346,899 B2
(45) **Date of Patent: *Jul. 9, 2019**

(54) IDENTIFYING ONE OR MORE SUBSTITUTE AUTOMATED CUSTOMIZED FOOD GENERATION MACHINES FOR GENERATING ONE OR MORE SUBSTITUTE CUSTOMIZED FOOD ITEMS

(71) Applicant: Elwha LLC, Bellevue, WA (US)

(72) Inventors: Pablos Holman, Seattle, WA (US); Mark A. Malamud, Seattle, WA (US); Nathan P. Myhrvold, Bellevue, WA (US); Robert C. Petroski, Seattle, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US); Roderick A. Hyde, Redmond, WA (US); Muriel Y. Ishikawa, Livermore, CA (US); Jordin T. Kare, Seattle, WA (US); Max R. Levchin, San Francisco, CA (US); Royce A. Levien, Lexington, MA (US); Richard T. Lord, Gig Harbor, WA (US); Robert W. Lord, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 823 days.

This patent is subject to a terminal disclaimer.

(21) Appl. No.: 14/228,601

(22) Filed: Mar. 28, 2014

(65) Prior Publication Data

US 2015/0181923 A1 Jul. 2, 2015

Related U.S. Application Data

(63) Continuation of application No. 14/227,027, filed on Mar. 27, 2014, which is a continuation-in-part of
(Continued)

(51) Int. Cl.
*G06Q 30/06* (2012.01)
*G06Q 50/12* (2012.01)
(Continued)

(52) U.S. Cl.
CPC .......... *G06Q 30/0639* (2013.01); *A23P 10/00* (2016.08); *G06Q 30/0633* (2013.01);
(Continued)

(58) Field of Classification Search
CPC ............... G06Q 20/3324; G06Q 50/12; G06Q 30/0633; G06Q 30/0635; G06Q 30/0641
(Continued)

(56) References Cited

U.S. PATENT DOCUMENTS 5,147,068 A 9/1992 Wright
5,997,924 A 12/1999 Olander, Jr. et al.
(Continued)

OTHER PUBLICATIONS

Rodgers, Svetlana. Technological innovation supporting different food production philosophies in the food service sectors. International Journal of Contemporary Hospitality Management; Bradford vol. 20, Iss. 1, (2008): 19-34.*
(Continued)

*Primary Examiner* — Nathan C Uber
*Assistant Examiner* — Fawaad Haider

(57) ABSTRACT

Computationally implemented methods and systems include acquiring user preference information of a user that indicates one or more customized food preferences of the user including at least one or more ingredient integrity preferences related to integrity of one or more ingredients; determining
(Continued)

10* Automated Customized Food Generation Machine that there is no capable automated customized food generation machine present in nearby vicinity of the user that is able to currently generate one or more customized food items in compliance with the one or more customized food preferences of the user; and identifying one or more substitute automated customized food generation machines present in the nearby vicinity of the user that are able to currently generate at least one substitute customized food item that is only in partial compliance with the one or more customized food preferences of the user. In addition to the foregoing, other aspects are described in the claims, drawings, and text.

41 Claims, 34 Drawing Sheets

Related U.S. Application Data application No. 14/145,864, filed on Dec. 31, 2013, which is a continuation of application No. 14/144,163, filed on Dec. 30, 2013, said application No. 14/427,027 is a continuation-in-part of application No. 14/176,408, filed on Feb. 10, 2014, which is a continuation of application No. 14/175,416, filed on Feb. 7, 2014, now Pat. No. 9,824,382, said application No. 14/227,027 is a continuation-in-part of application No. 14/200,514, filed on Mar. 7, 2014, which is a continuation of application No. 14/199,667, filed on Mar. 6, 2014.

(51) Int. Cl.

| | |
|---|---|
| ***G07F 9/02*** | (2006.01) |
| ***G07F 9/10*** | (2006.01) |
| ***G07F 11/00*** | (2006.01) |
| ***G07F 17/00*** | (2006.01) |
| ***G07F 11/70*** | (2006.01) |
| ***A23P 10/00*** | (2016.01) |

(52) U.S. Cl.

CPC ..... *G06Q 30/0635* (2013.01); *G06Q 30/0641* (2013.01); *G06Q 50/12* (2013.01); *G07F 9/02* (2013.01); *G07F 9/10* (2013.01); *G07F 11/002* (2013.01); *G07F 11/70* (2013.01); *G07F 17/0064* (2013.01)

(58) Field of Classification Search

USPC ........................................................ 705/15

See application file for complete search history.

(56) References Cited

U.S. PATENT DOCUMENTS

| | | | | |
|---|---|---|---|---|
| 6,646,659 | B1 | 11/2003 | Brown et al. | |
| 6,662,195 | B1 | 12/2003 | Langseth et al. | |
| 7,076,438 | B1 | 7/2006 | Tobelmann et al. | |
| 7,421,285 | B1 | 9/2008 | Rao et al. | |
| 8,255,699 | B2 | 8/2012 | Tagscherer | |
| 8,429,026 | B1 | 4/2013 | Kolawa et al. | |
| 8,504,440 | B1 | 8/2013 | Kolawa et al. | |
| 8,751,334 | B2 | 6/2014 | Wijaya et al. | |
| 8,863,649 | B1 | 10/2014 | Rao et al. | |
| 9,172,738 | B1 | 10/2015 | daCosta | |
| 9,239,246 | B2 | 1/2016 | Jones | |
| 2001/0011680 | A1 | 8/2001 | Soltesz et al. | |
| 2002/0081356 | A1 | 6/2002 | Bebiak et al. | |
| 2003/0006281 | A1 | 1/2003 | Thomas et al. | |
| 2003/0028885 | A1 | 2/2003 | Wilcox et al. | |
| 2003/0061094 | A1* | 3/2003 | Banerjee .............. | G06Q 20/202 705/14.24 |
| 2004/0238555 | A1 | 12/2004 | Parks | |
| 2005/0267811 | A1 | 12/2005 | Almblad | |
| 2006/0188620 | A1 | 8/2006 | Gutwein et al. | |
| 2007/0112460 | A1 | 5/2007 | Kiselik | |
| 2007/0231425 | A1 | 10/2007 | Ream et al. | |
| 2007/0294129 | A1 | 12/2007 | Froseth et al. | |
| 2008/0012726 | A1 | 1/2008 | Publicover | |
| 2009/0077007 | A1 | 3/2009 | Schwarzberg et al. | |
| 2009/0204492 | A1 | 8/2009 | Scifo et al. | |
| 2009/0228325 | A1 | 9/2009 | Simmons et al. | |
| 2009/0275075 | A1 | 11/2009 | Dodd et al. | |
| 2010/0255484 | A1 | 10/2010 | Halverson et al. | |
| 2011/0208617 | A1 | 8/2011 | Weiland | |
| 2011/0238296 | A1 | 9/2011 | Purks et al. | |
| 2012/0102993 | A1 | 5/2012 | Hortin | |
| 2012/0226698 | A1 | 9/2012 | Silvestre et al. | |
| 2012/0239683 | A1 | 9/2012 | Starkman | |
| 2012/0303573 | A1 | 11/2012 | Pan et al. | |
| 2012/0323691 | A1 | 12/2012 | McLaughlin et al. | |
| 2013/0024299 | A1 | 1/2013 | Wong et al. | |
| 2013/0029693 | A1 | 1/2013 | Bradley, Jr. et al. | |
| 2013/0054016 | A1 | 2/2013 | Canter et al. | |
| 2013/0085345 | A1 | 4/2013 | Geisner et al. | |
| 2013/0218687 | A1 | 8/2013 | Sohangir et al. | |
| 2013/0311311 | A1 | 11/2013 | Chopra et al. | |
| 2013/0317921 | A1 | 11/2013 | Havas | |
| 2014/0037805 | A1 | 2/2014 | Minvielle | |
| 2014/0080102 | A1 | 3/2014 | Krishna | |
| 2014/0108320 | A1 | 4/2014 | Baca et al. | |
| 2015/0058063 | A1 | 2/2015 | Pinel et al. | |
| 2015/0227140 | A1 | 8/2015 | Douglas et al. | |

OTHER PUBLICATIONS

"Burritobot: A 3-D Printer That Spits Out Burritos"; bearing a date of Jun. 19, 2012; retrieved on Aug. 26, 2015; pp. 1-9; located at: http://www.fastcodedesign.com/1670070/burritobot-a-3-d-printer-that-spits-out-burritos (hereinafter "Burritobot").

"Inside Redbox Mobile Demo"; bearing a date of Feb. 1, 2009; uploaded to YouTube by habdeira; retrieved on Aug. 27, 2015; 1 page; located at: https://www.youtube.come/watch?v=iroan2BtzDc ("Redbox").

"Say Hello to Burritobox, The World's First Burrito Vending Machine"; bearing a date of Jan. 8, 2014; updated on Jan. 23, 2014; pp. 1-3.

Andersen; "Freshly Baked Pizzas . . . from a Vending Machine?"; bearing a date of Aug. 27, 2013; pp. 1-2; located at: http://slice.seriouseats.com/archives/2013/08/freshly-baked-pizzasfrom-a-vending-machine.html.

pizzamarketplace.com; "Let's Pizza vending machine ready for U.S. debut"; bearing a date of Jun. 5, 2017; pp. 1-2; located at: https://www.pizzamarketplace.com/articles/lets-pizza-vending-machine-ready-for-us-debut/.

"EatWaveTM Vending Launches the Industry's First 'All-In-One' Vending Machine for Hot and Cold Food Items as well as Snacks and Drinks"; Business Wire; Nov. 6, 2012; total of 3 pages, as provided by examiner; ProQuest LLC 2018.

Microwave Oven reference, The Southwest Museum of Engineering, Communication and Computation; 2007; cited and printed by Examiner on Jun. 6, 2018; total of 13 pages (as provided by examiner); located at: http://www.smecc.org/microwave_oven.htm.

Rodgers, Svetlana; "Technological innovation supporting different food production philosophies in the food service sectors"; International Journal of Contemporary Hospitality Management; 2008; pp. 19-34; vol. 20; Issue 1.

* cited by examiner

200b Screen

304* Capable Automated Customized Food Generation Machine Presence Determining Module 416 Automated Customized Food Generation Machine Querying Module 418 Preparation Preference Capable Automated Customized Food Generation Machine Presence Determining Module 420 Taste/Flavor Preference Capable Automated Customized Food Generation Machine Presence Determining Module 422 Ingredient Preference Capable Automated Customized Food Generation Machine Presence Determining Module 424 Ingredient Purity Preference Capable Automated Customized Food Generation Machine Presence Determining Module 426 Ingredient Source Preference Capable Automated Customized Food Generation Machine Presence Determining Module 428 Ingredient Source Location Preference Capable Automated Customized Food Generation Machine Presence Determining Module

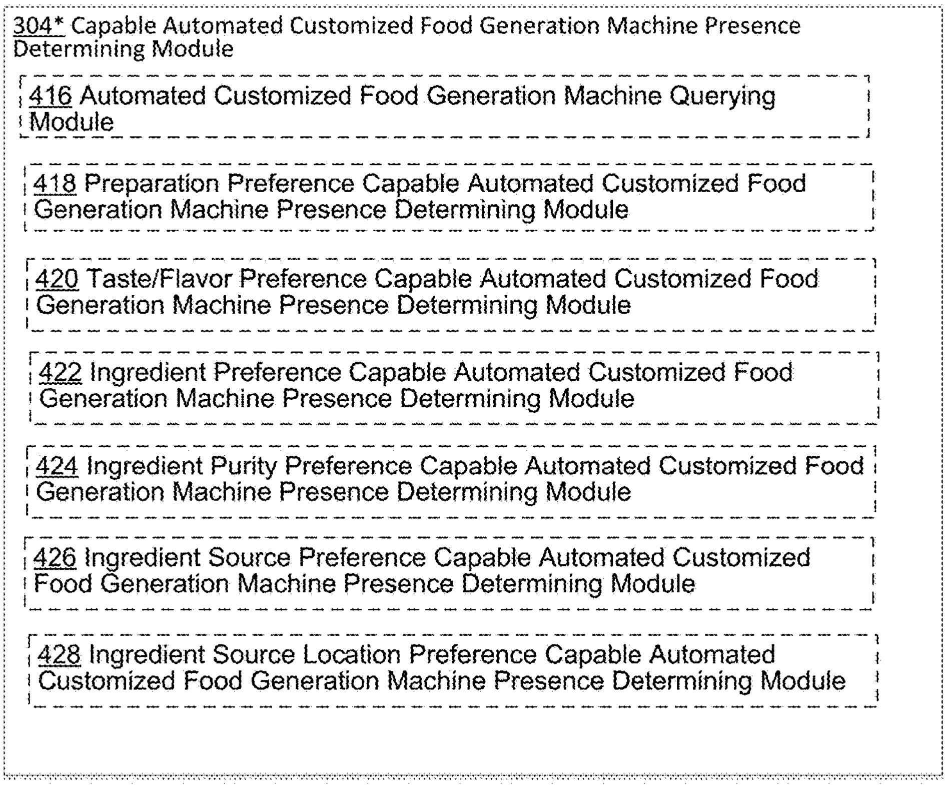

FIG. 4B

306* Substitute Automated Customized Food Generation Machine Presence Ascertaining Module 430 Substitute Automated Customized Food Generation Machine Description Ascertaining Module 432 Substitute Automated Customized Food Generation Machine Location Ascertaining Module 434 User/Substitute Machine Distance Ascertaining Module 436 Travel Route Ascertaining Module 438 Automated Customized Food Generation Machine Querying Module 440 Preferred Ingredient Deficient Substitute Automated Customized Food Generation Machine Presence Ascertaining Module 442 Substitute Ingredient Stocked Substitute Automated Customized Food Generation Machine Presence Ascertaining Module

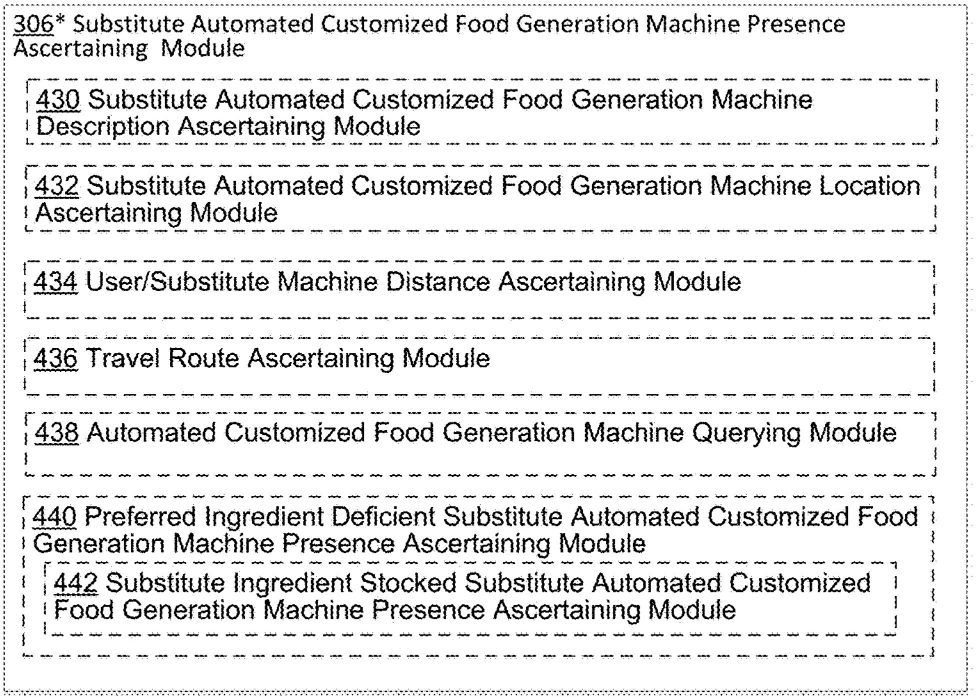

FIG. 4C

308* Indicator Presenting Module

444 Electronic Indicator Communicating Module

446 Textual Indicator Presenting Module

448 Graphical Indicator Presenting Module

450 Distance Indicator Presenting Module

452 Substitute Customized Food Item Deficiency Indicator Presenting Module

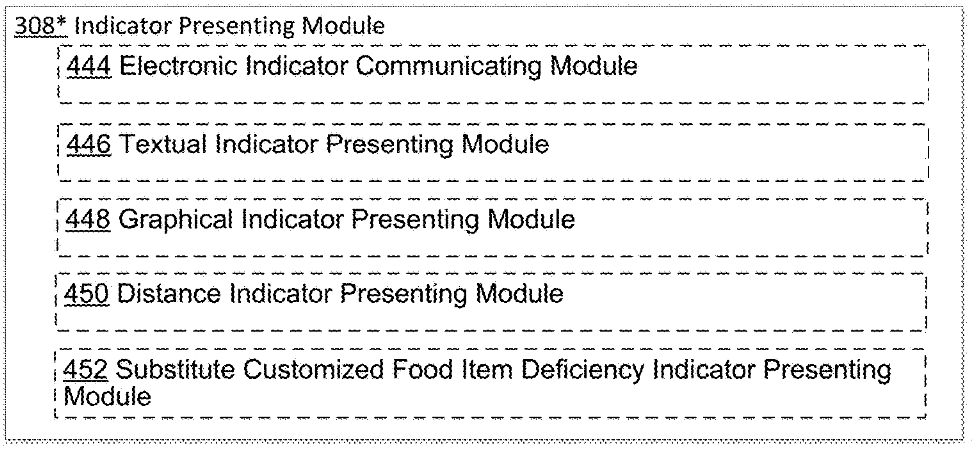

FIG. 4D

IDENTIFYING ONE OR MORE SUBSTITUTE AUTOMATED CUSTOMIZED FOOD GENERATION MACHINES FOR GENERATING ONE OR MORE SUBSTITUTE CUSTOMIZED FOOD ITEMS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related applications," if any, listed below.

PRIORITY APPLICATIONS

For purposes of the USPTO extra-statutory requirements, the present application constitutes a continuation of U.S. patent application Ser. No. 14/227,027, entitled IDENTIFYING ONE OR MORE SUBSTITUTE AUTOMATED CUSTOMIZED FOOD GENERATION MACHINES FOR GENERATING ONE OR MORE SUBSTITUTE CUSTOMIZED FOOD ITEMS, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreen, Charles Whitmer, Lowell L. Wood, Jr., and Victoria Y.H. Wood as inventors, filed 27 Mar. 2014, which is currently co-pending or is an application of which a currently co-pending application is entitled to the benefit of the filing date.

The present application constitutes a continuation-in-part of U.S. patent application Ser. No. 14/145,864, entitled SYSTEMS AND METHODS FOR PROVIDING CUSTOMIZED PACKAGINGS FOR CUSTOMIZED FOOD ITEMS THAT WERE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 31 Dec. 2013, which is currently co-pending or is an application of which a currently co-pending application is entitled to the benefit of the filing date, and which is a continuation of U.S. patent application Ser. No. 14/144,163, entitled SYSTEMS AND METHODS FOR PROVIDING CUSTOMIZED PACKAGINGS FOR CUSTOMIZED FOOD ITEMS THAT WERE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 30 Dec. 2013.

The present application constitutes a continuation-in-part of U.S. patent application Ser. No. 14/176,408, entitled SYSTEMS AND METHODS FOR PROVIDING CUSTOMIZED FOOD ITEMS THAT ARE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 10 Feb. 2014 , which is currently co-pending or is an application of which a currently co-pending application is entitled to the benefit of the filing date, and which is a continuation of U.S. patent application Ser. No. 14/175,416, entitled SYSTEMS AND METHODS FOR PROVIDING CUSTOMIZED FOOD ITEMS THAT ARE CUSTOMIZED BASED, AT LEAST IN PART, ON CUSTOMIZED FOOD ITEM INTEGRITY PREFERENCE, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 7 Feb. 2014.

The present application constitutes a continuation-in-part of U.S. patent application Ser. No. 14/200,514, entitled DIRECTING ONE OR MORE USERS TO ONE OR MORE AUTOMATED CUSTOMIZED FOOD GENERATION MACHINES, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 7 Mar. 2014 , which is currently co-pending or is an application of which a currently co-pending application is entitled to the benefit of the filing date, and which is a continuation of U.S. patent application Ser. No. 14/199,667, entitled DIRECTING ONE OR MORE USERS TO ONE OR MORE AUTOMATED CUSTOMIZED FOOD GENERATION MACHINES, naming Pablos Holman, Son Hong, Roderick A. Hyde, Muriel Y. Ishikawa, Jordin T. Kare, Max R. Levchin, Royce A. Levien, Richard T. Lord, Robert W. Lord, Mark A. Malamud, Nathan P. Myhrvold, Robert C. Petroski, Clarence T. Tegreene, Charles Whitmer, Lowell L. Wood, Jr., and Victoria Y. H. Wood, as inventors, filed 6 Mar. 2014.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

SUMMARY

In one or more various aspects, a method includes, but is not limited to, acquiring user preference information of a user that indicates one or more customized food preferences of the user including at least one or more ingredient integrity preferences related to integrity of one or more ingredients, determining that there is no capable automated customized food generation machine present in nearby vicinity of the user that is able to currently generate one or more customized food items in compliance with the one or more customized food preferences of the user; and identifying one or more substitute automated customized food generation machines present in the nearby vicinity of the user that are able to currently generate at least one substitute customized food item that is only in partial compliance with the one or more customized food preferences of the user. In various implementations, at least one of the above recited operations is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring user preference information of a user that indicates one or more customized food preferences of the user including at least one or more ingredient integrity preferences related to integrity of one or more ingredients, means for determining that there is no capable automated customized food generation machine present in nearby vicinity of the user that is able to currently generate one or more customized food items in compliance with the one or more customized food preferences of the user and means for identifying one or more substitute automated customized food generation machines present in the nearby vicinity of the user that are able to currently generate at least one substitute customized food item that is only in partial compliance with the one or more customized food preferences of the user. In addition to the foregoing, other system aspects are described in the claims, drawings, and text forming a part of the disclosure set forth herein.

In one or more various aspects, a system includes, but is not limited to, circuitry for acquiring user preference information of a user that indicates one or more customized food preferences of the user including at least one or more ingredient integrity preferences related to integrity of one or more ingredients, circuitry for determining that there is no capable automated customized food generation machine present in nearby vicinity of the user that is able to currently generate one or more customized food items in compliance with the one or more customized food preferences of the user; and circuitry for identifying one or more substitute automated customized food generation machines present in the nearby vicinity of the user that are able to currently generate at least one substitute customized food item that is only in partial compliance with the one or more customized food preferences of the user. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, acquiring user preference information of a user that indicates one or more customized food preferences of the user including at least one or more ingredient integrity preferences related to integrity of one or more ingredients, determining that there is no capable automated customized food generation machine present in nearby vicinity of the user that is able to currently generate one or more customized food items in compliance with the one or more customized food preferences of the user, and identifying one or more substitute automated customized food generation machines present in the nearby vicinity of the user that are able to currently generate at least one substitute customized food item that is only in partial compliance with the one or more customized food preferences of the user. In addition to the foregoing, other computer program product aspects are described in the claims, drawings, and text forming a part of the disclosure set forth herein.

In one or more various aspects, a system includes, but is not limited to, a user preference information obtaining module configured to obtain user preference information of a user, the user preference information to be obtained indicating one or more customized food preferences of the user including at least one or more ingredient integrity preferences related to integrity of one or more ingredients; a capable automated customized food generation machine presence determining module configured to determine that there is no capable automated customized food generation machine present in nearby vicinity of the user that is able to currently generate one or more customized food items in compliance with the one or more customized food preferences of the user; a substitute automated customized food generation machine presence ascertaining module configured to ascertain in the nearby vicinity of the user presence of one or more substitute automated customized food generation machines that are able to currently generate at least one substitute customized food item that is only in partial compliance with the one or more customized food preferences of the user; and indicator presenting module configured to present one or more indicators that identify the one or more substitute automated customized food generation machines in response, at least in part, to the ascertainment of the presence of the one or more substitute automated customized food generation machines in the nearby vicinity of the user.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 4B shows another perspective of the capable automated customized food generation machine presence determining module 304* of FIG. 3A, 3B, 3D, or 3E (e.g., the capable automated customized food generation machine presence determining module 304' of FIG. 3A, the capable automated customized food generation machine presence determining module 304" of FIG. 3B, the capable automated customized food generation machine presence determining module 304'" of FIG. 3D, or the capable automated customized food generation machine presence determining module 304"" of FIG. 3E) in accordance with various implementations.

FIG. 4C shows another perspective of the substitute automated customized food generation machine presence ascertaining module 306* of FIG. 3A, 3B, 3D, or 3E (e.g., the substitute automated customized food generation machine presence ascertaining module 306' of FIG. 3A, the substitute automated customized food generation machine presence ascertaining module 306" of FIG. 3B, the substitute automated customized food generation machine presence ascertaining module 306'" of FIG. 3D, or the substitute automated customized food generation machine presence ascertaining module 306"" of FIG. 3E) in accordance with various implementations.

FIG. 4D shows another perspective of the indicator presenting module 308* of FIG. 3A, 3B, 3D, or 3E (e.g., the indicator presenting module 308' of FIG. 3A, the indicator presenting module 308" of FIG. 3B, the indicator presenting module 308'" of FIG. 3D, or the indicator presenting module 308"" of FIG. 3E) in accordance with various implementations.

DETAILED DESCRIPTION

Figure 1A:
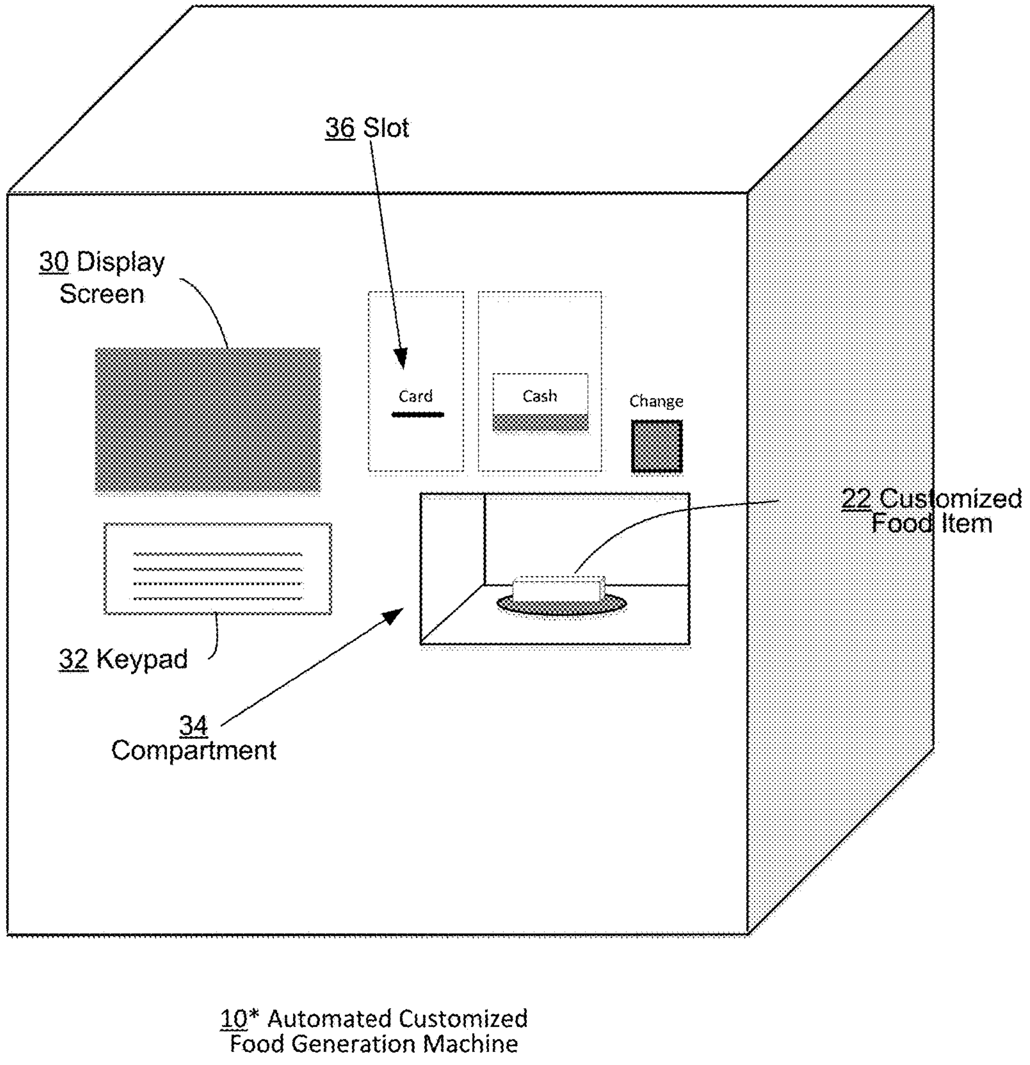
FIG. 1A illustrates an exemplary automated customized food generation machine 10* that is designed to generate customized food items in accordance with customization preferences of users.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-levelprogramming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The development and evolution of food vending machine technology has remained relatively stagnant over the last few decades even though there have been substantial technological advancements in the fields of microelectronics, automated manufacturing, and robotics. That is, today's food vending machines are not that different from vending machines of thirty or even forty years ago. With the exception of a very limited number of vending machines (such as coffee machines that allow users to make certain limited customizations of their order such as making their coffee sweeter or adding cream), the vast majority of today's food vending machines do not allow any customization of customer purchases. The vast majority of today's food vending machines only allow a user/customer to select and purchase a food item (e.g., candy bars, chips, sandwiches, drinks, and so forth) from a plurality of ready-to-eat or substantially ready-to-eat food items (note that some current food vending machines do offer food items that will need to be heated using a microwave oven) and that do not allow the user to customize their purchased food item.

With the advancement of microelectronics, robotics, and automated manufacturing technologies such as 3-D (three-dimensional) printing, it is envisioned that future food vending machines will not only be able to manufacture food items "on the spot" but will also be able to customize food items to the specific customization preferences of users. For example, with the development of 3-D (three-dimensional) printing technology, it is envisioned that customized food bars (e.g., customized energy bars) may be printed for users based on their preferences (e.g., if a user is allergic to peanuts, no peanut ingredients are used in forming an energy bar for the user). It is also envisioned that with the use of robotics, fully customized meals (e.g., customized sandwiches, breads, stews, soups, shakes, and so forth) may be manufactured using automated customized food vending machines that employ robotics or other forms of automation.

It is also envisioned that such automated customized food vending machines for generating customized foods (herein "customized food items") will be relatively compact and therefore, will have relatively limited ingredient supplies (e.g., low-fat milk, beef from Kobe, Japan, pecans, and so forth) for generating customized food items. Consequently, there may be many instances in which there will be no automated vending machines in the nearby vicinity of a user that are able to generate a "compliant" customized food item (e.g., a customized energy bar, a customized sandwich, a customized shake, a customized stew, and so forth) that is in full compliance with the customization preferences of the user. In such situations, it may be desirable to direct the user to one or more customized food vending machines (herein "automated customized food generation machines") that will have capability to generate a "substitute" customized food item that is only in partial compliance with the customization preferences of the user.

It should also be noted that many of today's sophisticated consumers are very concerned about the integrity (e.g., purity, cleanliness, sourcing, and so forth) of their food supplies. It seems as though that in recent years food supply contamination (e.g., *salmonella*, mad-cow disease, *E. coli*, and so forth) stories are being reported on a regular basis. That is, today's food supplies come from a vast number of food vendors located across the globe. For example, some food supplies originate from countries in the southern hemisphere that supply meats, fruits, and vegetables. There are also countless domestic farms and ranches throughout North America that supply chickens, pork, and beef. While the vegetable and fruit farms of California and Florida supplying the rest of America with a variety of produce. It is often very difficult for end consumers to ensure that the ingredients used to make, for example, ready-to-eat foods are of high purity and free of any disease or pesticides.

Accordingly, methods, systems, and articles of manufactures are presented herein that are designed to, among other things, acquire or obtain user preference information of a user that indicates one or more customized food preferences of the user including at least one or more ingredient integrity preferences related to integrity of one or more ingredients; determine that there is no capable automated customized food generation machine present in nearby vicinity of the user that is able to currently generate one or more customized food items in compliance with the one or more customized food preferences of the user; and identify or ascertain one or more substitute automated customized food generation machines present in the nearby vicinity of the user that are able to currently generate at least one substitute customized food item that is only in partial compliance with the one or more customized food preferences of the user. As will be further described herein, in some embodiments such operations may be performed at an automated customized food generation machine (e.g., a vending machine that can dispense customized foods), while in other embodiments such operations may be performed at a network device (e.g., one or more servers, a workstation, and so forth) that may be in communication with one or more automated customized food generation machines.

As will be used herein, the phrase "customized food preference" or "customized food preferences" of a user may be in reference to the user's preferences for customizing a food item. Examples of customization preferences include, for example, preference for using beef ingredients from Kobe Japan and not from Britain, preference that aspartame be used as a sweetener, preferences that ingredients be included in the customized food item are free of tree nuts, sources of ingredients, such as beef, having been tested to be free of impurities such as certain bacterial agents, and so forth Other examples of customization preferences will be provided herein. In various embodiments, references in the following to "capable" automated customized food generation machine[s] may be in reference to automated customized food generation machines that have the capabilities (e.g., having, for example, sufficient amounts of preferred ingredients in sufficient quantities) to be able to presently generate at least one customized food item (herein "compliant" customized food item) that is in total compliance with the one or more customized food preferences of a user. In contrast, references in the following to "substitute" automated customized food generation machine[s] may be in reference to automated customized food generation machines that have capabilities to generate customized food items (herein "substitute" customized food items) that are only in partial compliance with the one or more customized food preferences of a user.

Referring now to FIG. 1A, which illustrates an exemplary automated customized food generation machine 10* that is designed to generate customized food items 22 in accordance with customization preferences of users. Note that although the exemplary automated customized food generation machine 10* illustrated in FIG. 1A is depicted as generating a customized food item 22 that is in the form of an energy bar, in alternative embodiments, the exemplary automated customized food generation machine 10* may generate other types of customized food items 22 (e.g., customized sandwiches, customized stew, customized shakes, and so forth) having other forms. In some embodiments, the exemplary automated customized food generation machine 10* may be a standalone system that is self-contained with all of the logic needed in order to execute the various operations to be described herein—see, for example, FIG. 5. Alternatively, at least some of the operations to be described herein may actually be executed by a network device 12* that may be in communication with the exemplary automated customized food generation machines 10* as illustrated, for example, in FIGS. 1B, 1C, and 1D.

Figure 3A:
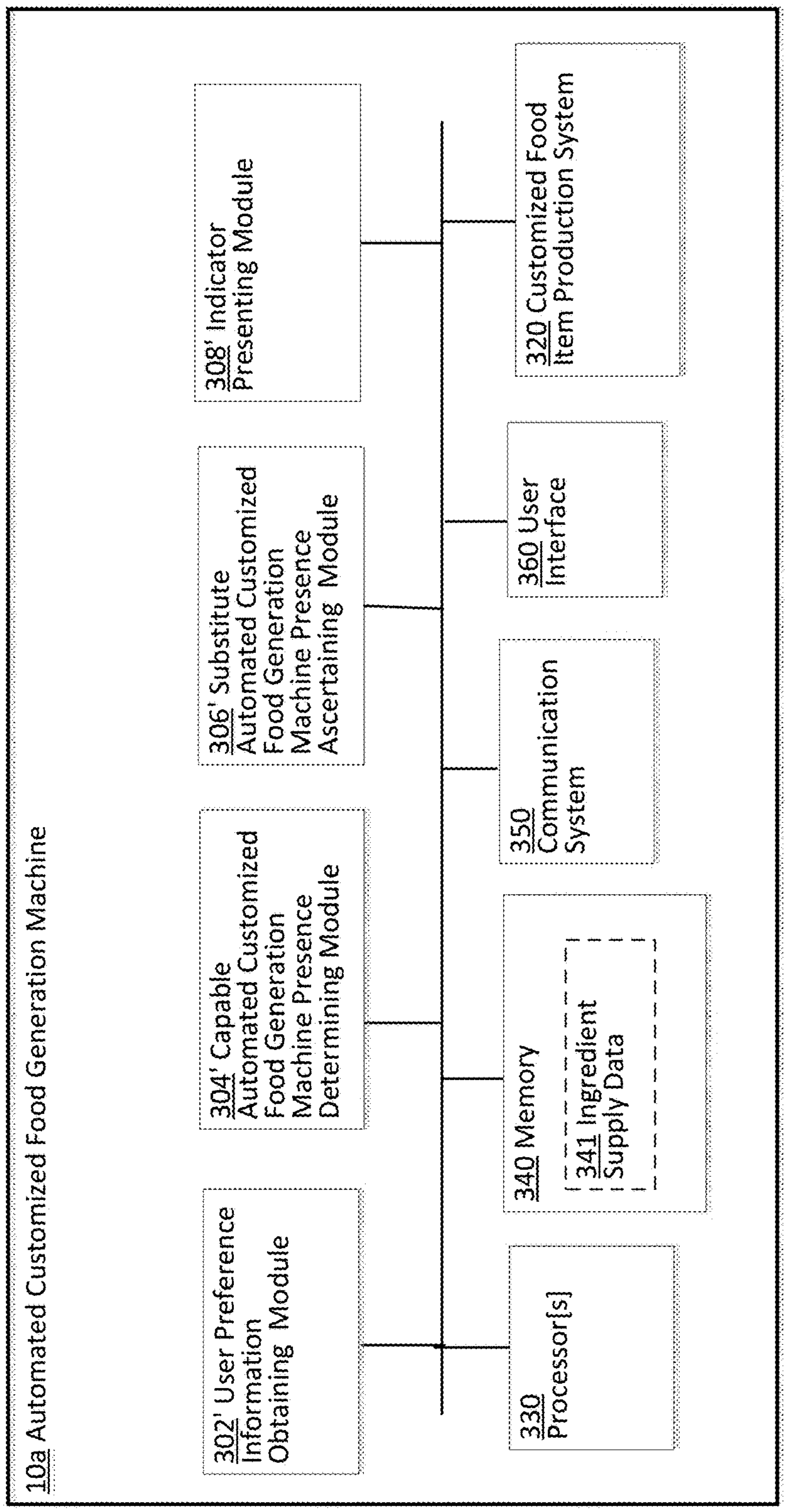
FIG. 3A shows a block diagram of a particular implementation of the automated customized food generation machine 10* of FIG. 1A illustrated as automated customized food generation machine 10*a*.
Figure 3B:
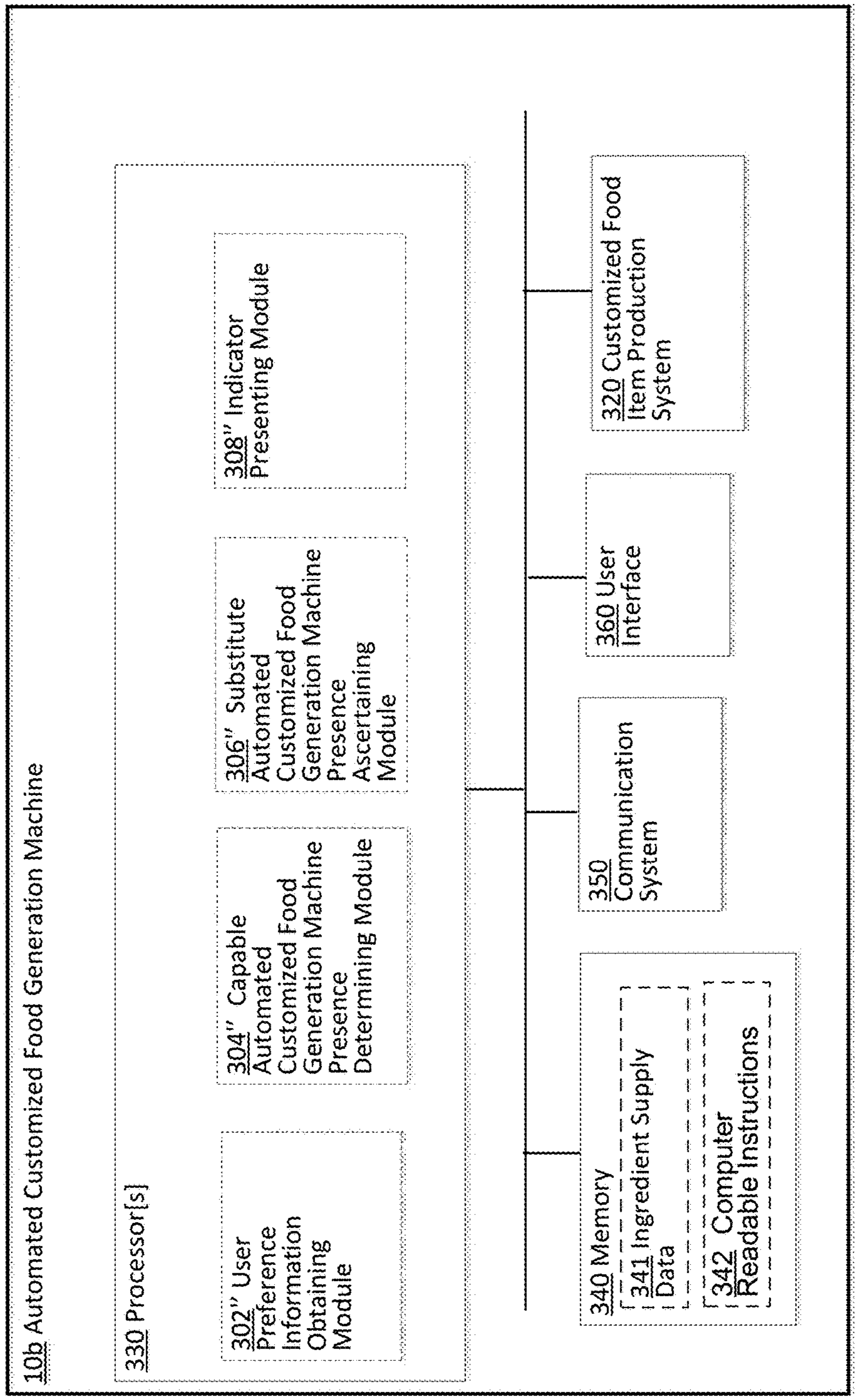
FIG. 3B shows a block diagram of another implementation of the automated customized food generation machine 10* of FIG. 1A illustrated as automated customized food generation machine 10*b*.
Figure 3C:
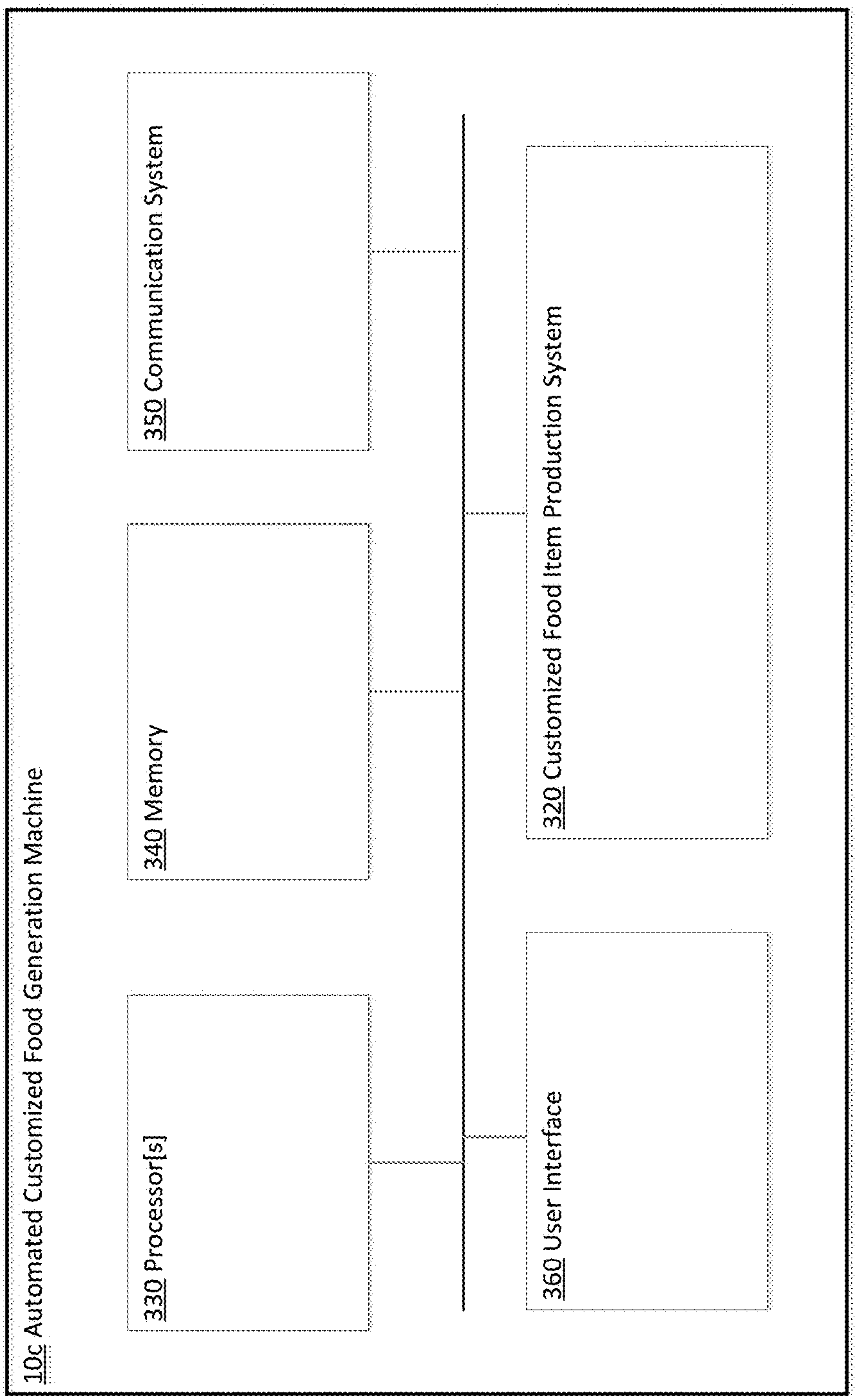
FIG. 3C shows a block diagram of another implementation of the automated customized food generation machine 10* of FIG. 1A illustrated as automated customized food generation machine 10*c*.

Note that FIGS. 3A, 3B, and 3C are three block diagrams of three different implementations of the exemplary automated customized food generation machine 10* of FIG. 1A illustrated in FIG. 3A as exemplary automated customized food generation machine 10*a*, illustrated in FIG. 3B as exemplary automated customized food generation machine 10*b*, and illustrated in FIG. 3C as exemplary automated customized food generation machine 10*c*. Further note that for purposes of the following description, "*" represents a wildcard. Thus, references in the following description to, for example, "automated customized food generation machine 10*" may be in reference to any one of, for example, the exemplary automated customized food generation machine 10*a* of FIG. 3A, to the exemplary automated customized food generation machine 10*b* of FIG. 3B, or to the exemplary automated customized food generation machine 10*c* of FIG. 3C (and/or to the automated customized food generation machine 10', 10'', 10''', or 10'''' of FIGS. 1B, 1C, 1D, and 1E.

Referring back to the exemplary automated customized food generation machine 10* of FIG. 1A, the exemplary automated customized food generation machine 10*, as illustrated, includes a display screen 30 (which may be a touchscreen), a keypad 32, a compartment 34 for dispensing one or more customized food items 22, and a slot 36 for inserting a credit card or a Smartcard. The display screen 30 may be employed to display (as well as to enter user input if it is a touchscreen) food menus, ingredient options, ingredient purity options (e.g., use ingredients free of pesticides), ingredient sourcing options (e.g., use only chicken ingredients from Tysons farm), and so forth. In various embodiments, keypad 32 may be used by a user to make selections (e.g., selection of user preferences), as well as to provide input for other types of information (e.g., user identification, credit card information, dietary information, and so forth). The automated customized food generation machine 10* may further include a slot 36 for reading a credit card or a Smartcard. Such cards may be a source for providing certain user information including user identification information and user preferences. Such cards, particularly Smartcards, which may have connectivity to mobile devices such as Smartphones, may be used in order to provide other types of user data including social networking data through their connectivity to the mobile devices or directly from such cards.

Referring briefly now to FIGS. 3A and 3B, which illustrate two block diagrams of two different implementations of the exemplary automated customized food generation machine 10* of FIG. 1A when the exemplary automated customized food generation machine 10* is a “standalone” device that has, for example, most or all of the various logic needed in order to execute, for example, the various functionalities to be described herein. In particular, FIGS. 3A and 3B illustrate two extreme implementations of the standalone implementation of the automated customized food generation machine 10* of FIG. 1A in which all of the logic modules are implemented using purely hardware solutions (e.g., employing dedicated circuitry such as application specific integrated circuitry or ASIC) as illustrated in FIG. 3A (e.g., illustrated in FIG. 3A as automated customized food generation machine 10*a*) or in which all of the logic modules are implemented using software solutions (e.g., software executed by one or more processors or controllers) as illustrated in FIG. 3B (e.g., illustrated in FIG. 3B as automated customized food generation machine 10*b*).

Note that for purposes of simplicity and for ease of illustration, only the two extreme implementations (e.g., the “hardware” implementation as illustrated by the automated customized food generation machine 10*a* of FIG. 3A and the “software” implementation as illustrated by the automated customized food generation machine 10*b* of FIG. 3B) of the standalone automated customized food generation machine 10* are presented here. However, it is recognized that any combination of software and hardware solutions are possible and may be employed in various alternative embodiments. In any event, the “standalone” automated customized food generation machine 10*a* depicted in FIG. 3A is the “hard” implementation of the standalone implementation of the automated customized food generation machine 10* of FIG. 1A where all of the logic modules (e.g., the user preference information obtaining module 302', the capable automated customized food generation machine presence determining module 304', the substitute automated customized food generation machine presence ascertaining module 306', and the indicator presenting module 308') are implemented using purely hardware solutions (e.g., circuitry such as application specific integrated circuit or ASIC). In contrast, the automated customized food generation machine 10*b* of FIG. 3B is the soft implementation of the standalone implementation of the automated customized food generation machine 10* of FIG. 1A where all of the logic modules (e.g., the user preference information obtaining module 302", the capable automated customized food generation machine presence determining module 304", the substitute automated customized food generation machine presence ascertaining module 306", and the indicator presenting module 308") are implemented using software solutions (e.g., programmable instructions in the form of computer readable instructions 342 being executed by hardware such as one or more processors 330) as illustrated in, for example, FIG. 3B. Note that FIG. 3C illustrates a block diagram (illustrated in FIG. 3C as automated customized food generation machine 10*c*) of a particular implementation of the automated customized food generation machine 10* of FIG. 1 when the automated customized food generation machine 10* is not a standalone device (e.g., when one or more logic modules may be remotely located, such as at a network device 12*, as illustrated in FIG. 1B)

Turning now to FIGS. 1B, 1C, 1D, and 1E, which illustrate various exemplary scenarios of a user 13 interacting with a network device 12* and/or with one or more automated customized food generation machines 10* in accordance with various embodiments. These scenarios are presented herein in order to facilitate understanding of various operations and concepts to be described herein. Note that in the exemplary scenarios illustrated in FIGS. 1B, 1C, 1D, and 1E, the network device 12* or one of the automated customized food generation machines 10* may actually implement the various operations to be described herein—see, for example, operational flow 500 of FIG. 5.

Figure 1B:
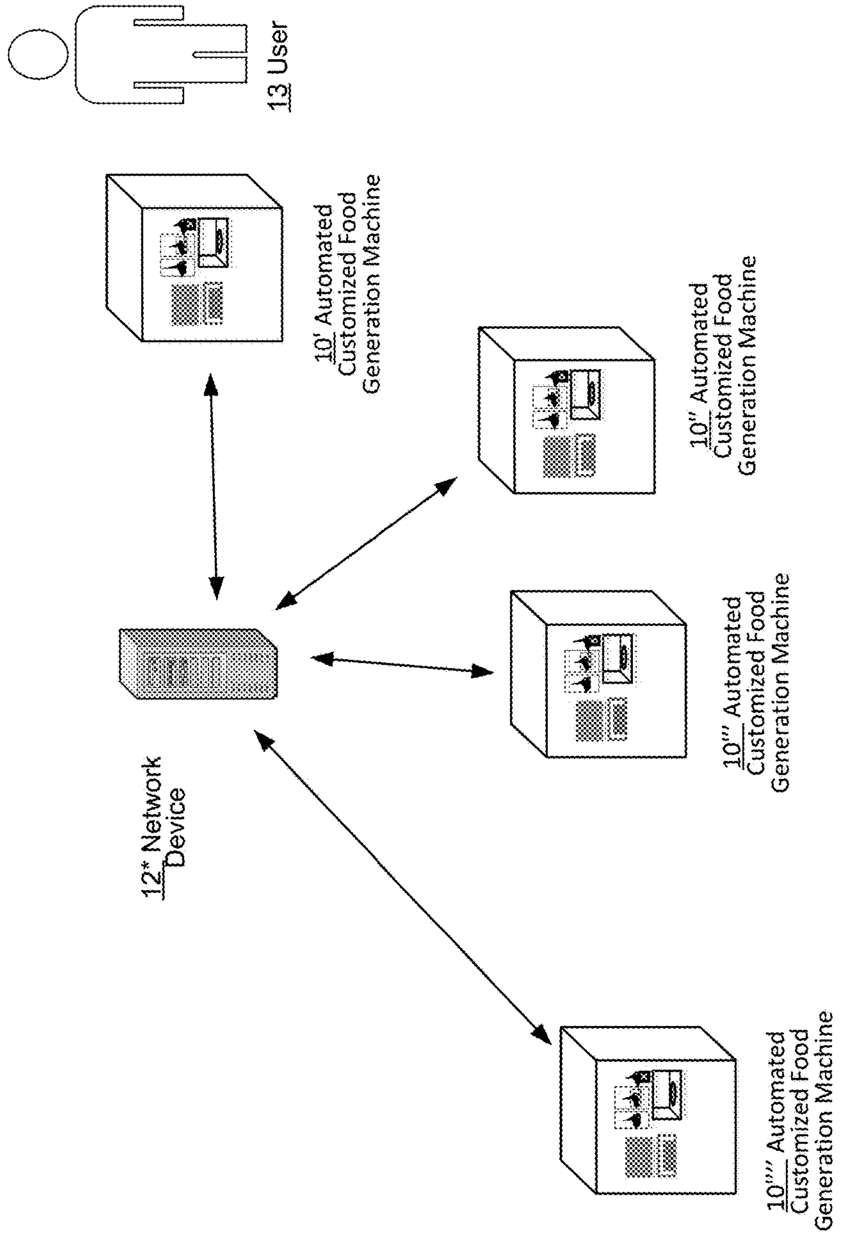
FIG. 1B shows a user 13 in an example environment that includes multiple automated customized food generation machines.

Referring particularly now to FIG. 1B, which shows a user 13 directly interfacing or interacting with an automated customized food generation machine 10' (herein “interfacing” automated customized food generation machine) in order to order/purchase one or more customized food items 22. Upon obtaining user preference information indicating food customization preferences of the user 13 from the user 13 or from other sources, a determination (which may be made by the network device 12* and/or by the interfacing automated customized food generation machine 10') may be made that the automated customized food generation machine 10' is unable to satisfactorily fulfill the user’s customization preferences.

The network device 12* (e.g., a network system such as a server or a workstation, or a plurality of network computers—“the cloud”) may then determine whether there are any nearby “capable” automated customized food generation machines that are in the nearby vicinity of the user 13 that are able to currently generate one or more customized food items 22 in full compliance with the one or more customized food preferences of the user 13. For purposes of the example scenario of FIG. 1B (as well as in the example scenarios of FIGS. 1C, 1D, and 1E), the automated customized food generation machine 10"" will be assumed to be a capable automated customized food generation machine that is able to currently (e.g., at the time of the determination) generate one or more customized food items 22 (e.g., “compliant” customized food items) in full compliance with the customization preferences (herein “customized food preferences”) of the user 13. However, because the capable automated customized food generation machine 10"" is far away from the user 13 and not in the nearby vicinity (e.g., within half a mile, within two miles, or within some other short travel distance) of the user 13, the capable automated customized food generation machine 10"" may not be considered as a viable machine for the user 13 to use and therefore, the user 13 may not be directed to such a machine.

In various embodiments, the network device 12* may be further designed to identify in the nearby vicinity of the user 13 “substitute” automated customized food generation machines that are able to generate one or more “substitute” customized food items that are only in partial compliance with the one or more customized food preferences of the user 13. For purposes of this example scenario of FIG. 1B (as well as for the example scenarios of FIGS. 1C, 1D, and 1E) only the automated customized food generation machines 10" and 10"' will be assumed to be substitute automated customized food generation machines that are located in the nearby vicinity of the user 13. Note that for purposes of the scenario of FIG. 1B, the automated customized food generation machine 10' may be referred to as the “interfacing” automated customized food generation machine because the user 13 is directly interfacing/interacting with the automated customized food generation machine 10'.

Figure 3D:
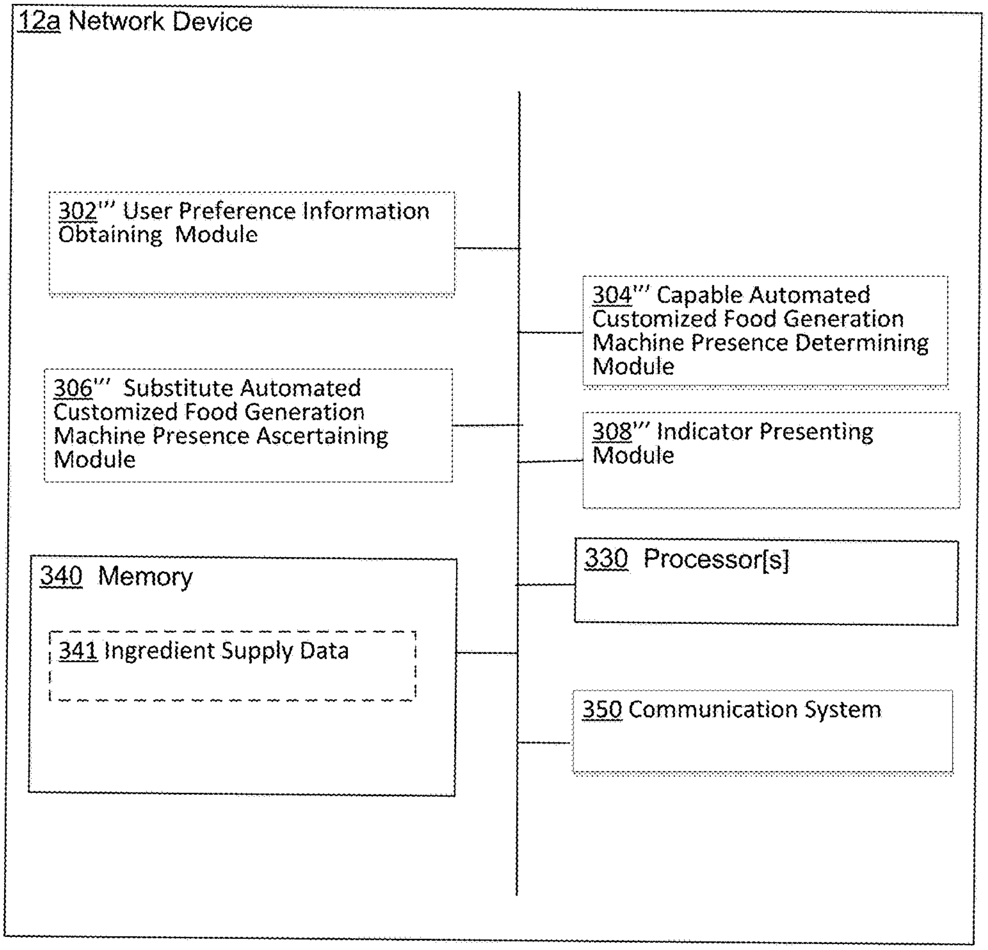
FIG. 3D shows a block diagram of a particular implementation of the network device 12* of FIG. 1B, 1C, or 1D illustrated as network device 12*a*.
Figure 3E:
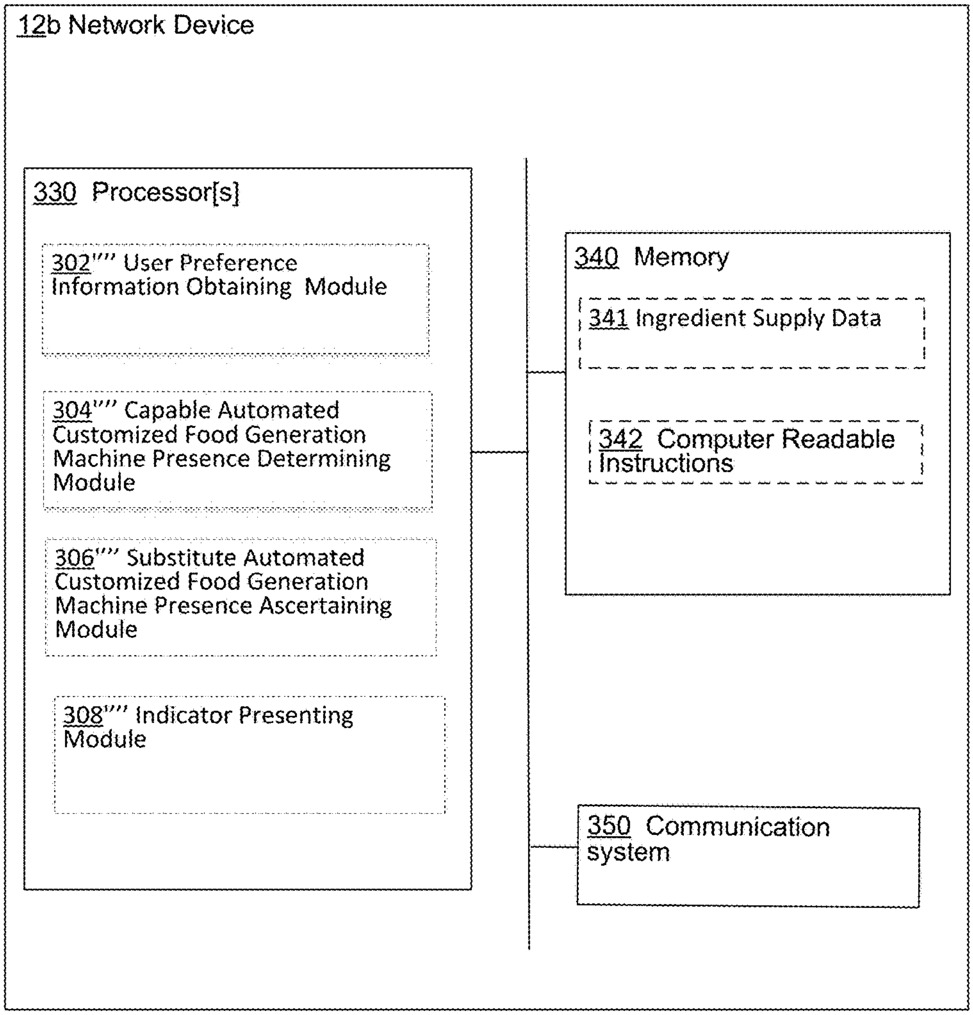
FIG. 3E shows a block diagram of a particular implementation of the network device 12* of FIG. 1B, 1C, or 1D illustrated as network device 12*b*.

In order to determine whether any automated customized food generation machines 10* that are located in the nearby vicinity of the user 13 are capable automated customized food generation machines that are able to currently generate one or more customized food items 22 in full compliance with the one or more customized food preferences of the user 13, the network device 12* may query those nearby automated customized food generation machines (e.g., automated customized food generation machines 10" and 10'") that are determined to be within the nearby vicinity of the user 13 as to whether such machines have the capability (e.g., having the appropriate ingredients in sufficient quantities) to generate one or more customized food items that are in full compliance with the one or more customized food preferences of the user 13. Alternatively, such a determination may be based on ingredient supply status data previously provided by the nearby automated customized food generation machines (e.g., automated customized food generation machines 10" and 10'") and stored in a memory 340 (see FIG. 3D or 3E, which illustrate two different implementations of the network device 12* of FIGS. 1B, 1C, and 1D—a hard implementation as illustrated in FIG. 3D in which all of the logic modules are implemented using hardware, and a soft implementation as illustrated in FIG. 3E, in which all of the logic modules are implemented using software executed by one or more processors 330).

The network device 12* may also query the nearby automated customized food generation machines (e.g., automated customized food generation machines 10" and 10'") that are determined to be within the nearby vicinity of the user 13 as to whether such machines have the capability (e.g., having the appropriate ingredients in sufficient quantities) to generate one or more "substitute" customized food items that are only in partial compliance with the one or more customized food preferences of the user 13. Alternatively, such a determination may be based on status data previously provided by the nearby automated customized food generation machines (e.g., automated customized food generation machines 10" and 10'") and stored in a memory 340.

In some cases, if no capable automated customized food generation machines is found in the nearby vicinity of the user 13, then the network device 12*, via the "interfacing" automated customized food generation machine 10', may direct the user 13 to one or more of the substitute customized food generation machines 10" and 10'", which were identified by the network device 12* as being able to currently generate one or more substitute customized food items. As will be further described herein, in various embodiments, various information may be provided to the user 13 in addition to the simple identification of the substitute customized food generation machines 10" and 10'" including, for example, the distances and directions to the substitute customized food generation machines 10" and 10'" from the current location of the user 13 and the deficiencies, relative to the one or more customized food preferences of the user 13, of the substitute customized food items that such machines may be able to currently generate.

Figure 1C:
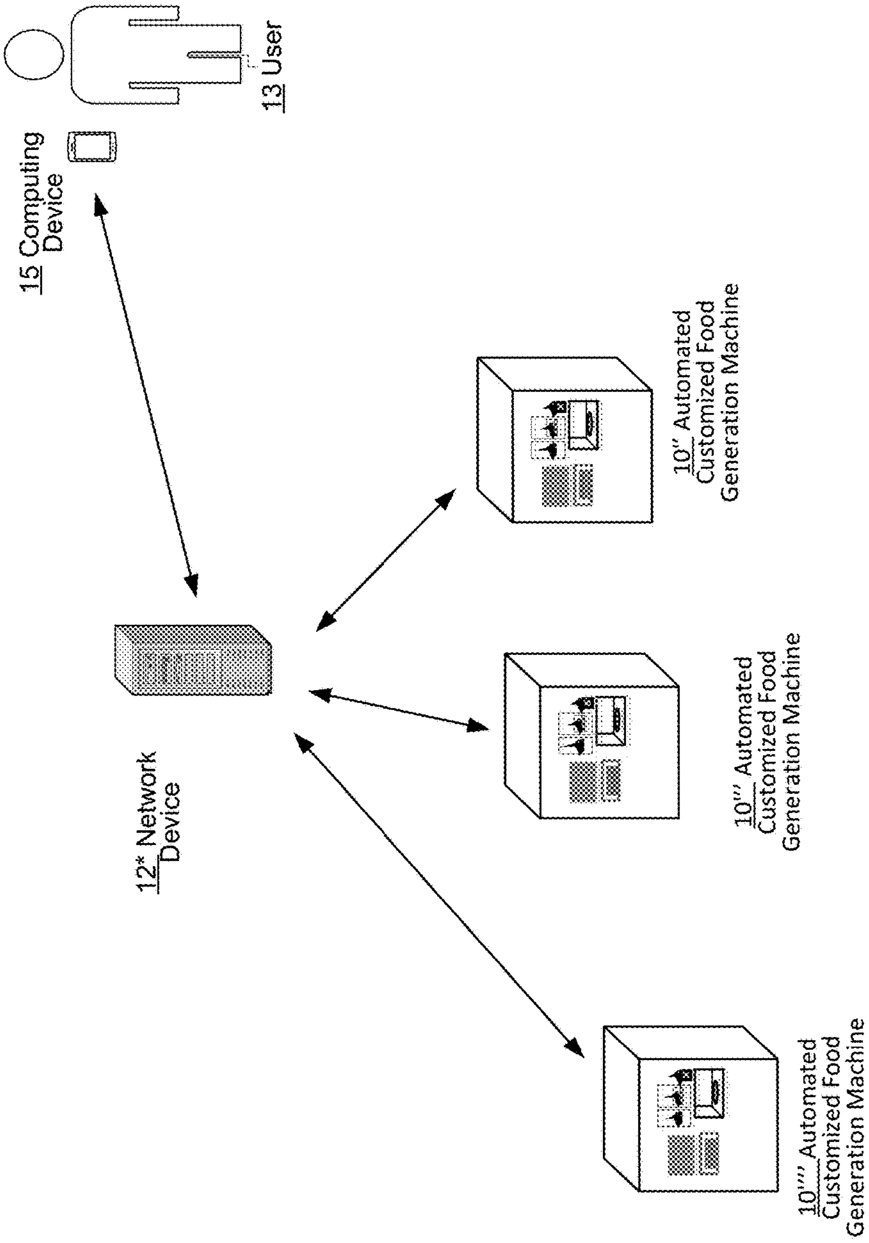
FIG. 1C shows a user 13 in another example environment that includes multiple automated customized food generation machines.

Turning now to FIG. 1C, which illustrates another scenario that is a slight variation from the scenario illustrated in FIG. 1B. In this example scenario of FIG. 1C, a user 13 is shown interacting with a network device 12* via a computing device 15 (e.g., a Smartphone, a tablet computer, a workstation, a laptop, and so forth). In this scenario, the user 13 is in direct communication with the network device 12* via the computing device 15 so that the network device 12* may direct, via the computing device 15, the user 13 to one or more capable automated customized food generation machines, and if no capable automated customized food generation machines (e.g., the automated customized food generation machine 10"" of FIG. 1C) are detected in the nearby vicinity (e.g., within one mile or within three miles) of the user 13, the network device 12* may direct the user 13 to one or more substitute automated customized food generation machines (e.g., automated customized food generation machines 10" and 10'").

That is, upon obtaining user preference information indicating one or more customized food preferences of the user 13 from the computing device 15 or from other sources (based on user identification information provided through the computing device 15), the network device 12* may determine whether there are any capable automated customized food generation machines in the nearby vicinity of the user 13. Further, the network device 12* may be designed to identify, in the nearby vicinity of the user 13, the presence of one or more substitute customized food generation machines that are currently capable of generating one or more substitute customized food items that are in partial compliance with the one or more customized food preferences of the user 13. In order to make such determinations/identifications, the network device 12* may query those automated customized food generation machines 10* (e.g., "nearby machines") that are located in the nearby vicinity of the user 13 in order to determine whether any of the nearby machines have the capabilities to currently generate one or more compliant customized food items that are in compliance with the one or more customized food preferences of the user 13 and/or to determine whether any of the nearby machines having the capabilities to currently generate one or more substitute customized food items that are only in partial compliance with the one or more customized food preferences of the user. In some embodiments, if no capable automated customized food generation machines are found in the nearby vicinity of the user 13, then the network device 12*, via the computing device 15, may direct the user 13 to one or more substitute automated customized food generation machines that are in the nearby vicinity of the user 13.

Note again that in the example scenario of FIG. 1C, as well as for purposes of the following discussions related to the various operations to be described herein, the automated customized food generation machine 10"" of FIG. 1C is a capable automated customized food generation machine that is able to currently generate one or more compliant customized food items that are in full compliance with the one or more customized food preferences of the user 13 but which is not in the nearby vicinity of the user 13 and, therefore, not a viable machine. And as before, the automated customized food generation machines 10" and 10'" are two substitute automated customized food generation machines that are able to currently generate one or more substitute customized food items that are in partial compliance with the one or more customized food preferences of the user 13 and that are located in the nearby vicinity of the user 13.

As illustrated in FIG. 1C, the network device 12* may be in communication with a plurality of automated customized food generation machines 10* (e.g., automated customized food generation machine 10", automated customized food generation machine 10'", and automated customized food generation machine 10""). Though not explicitly illustrated, the network device 12* may communicate with the automated customized food generation machines 10* and the computing device 15 via wireless and/or wired networks in order to determine, for example, whether there are any capable automated customized food generation machines near the user 13 and whether there are any substitute automated customized food generation machines near the user 13.

Figure 1D:
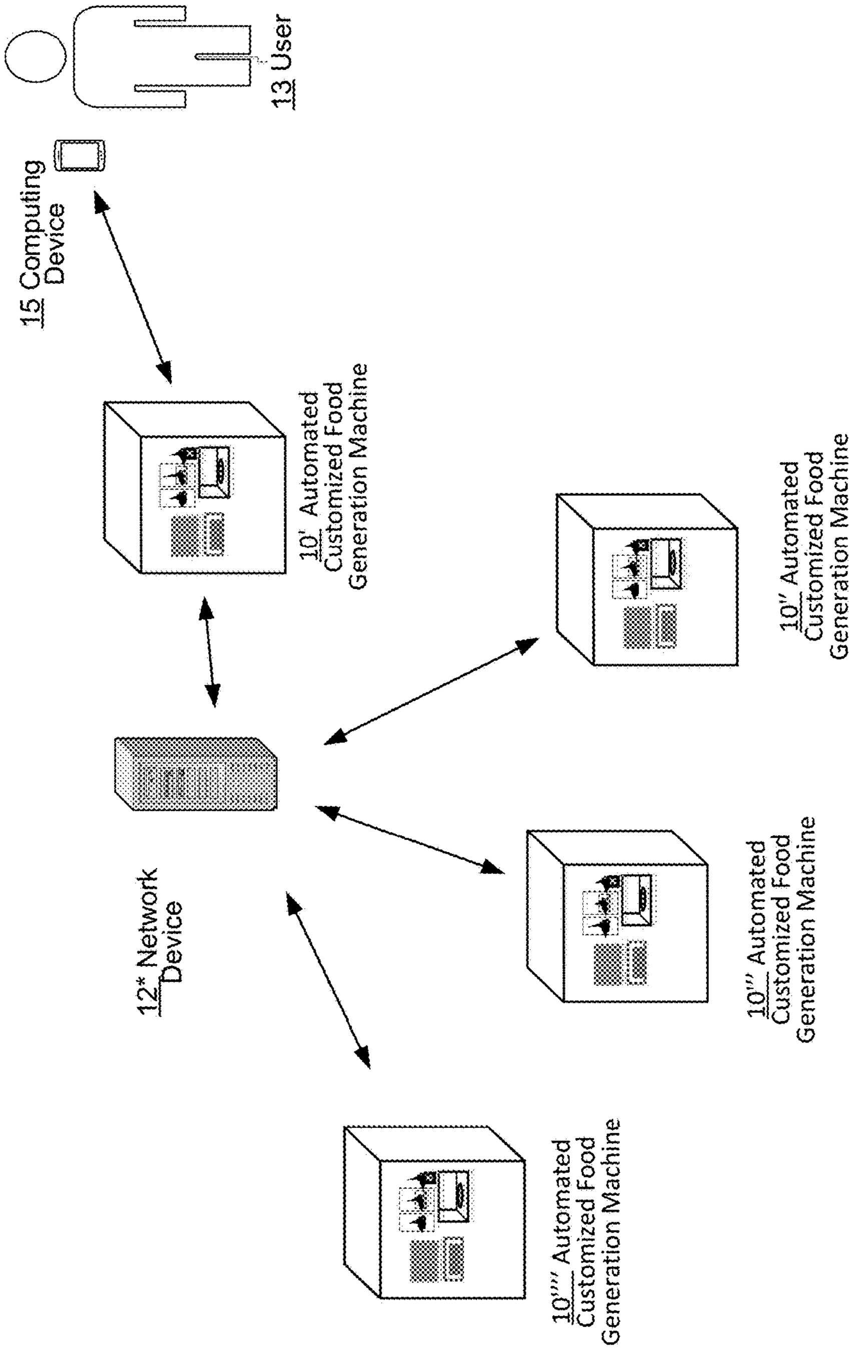
FIG. 1D shows a user 13 in another example environment that includes multiple automated customized food generation machines.

Turning now to FIG. 1D, which illustrates a scenario that is a slight variation from the scenario illustrated in FIG. 1B. The only difference between the scenario illustrated in FIG. 1B and the scenario illustrated in FIG. 1D is that in the scenario illustrated in FIG. 1D the user 13 communicates with the automated customized food generation machine 10' through a computing device 15 (e.g., a Smartphone, a cellular telephone, a tablet computer, a laptop, a desktop computer, and so forth). Thus, rather than the user 13 inputting user information (e.g., user preference information, user ID/password, and so forth) directly into the "interfacing" automated customized food generation machine 10', the user 13 may provide user input through the computing device 15, and to receive output information (e.g., identification of one or more substitute automated customized food generation machines 10" and 10'").

Figure 1E:
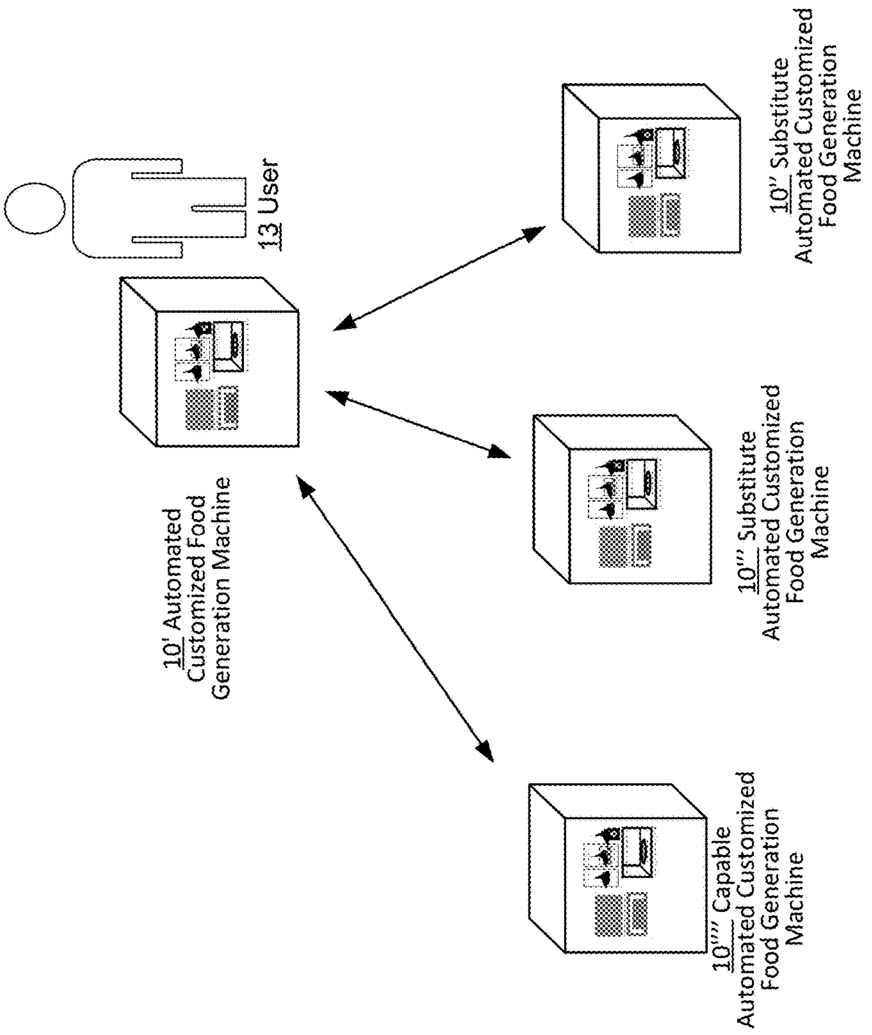
FIG. 1E shows a user 13 in another example environment that includes multiple automated customized food generation machines.

Referring now to FIG. 1E, which illustrates a scenario that is a hybrid scenario of the scenario illustrated in FIG. 1B and the scenario illustrated in FIG. 1C. In the scenario of FIG. 1E, the user 13 directly interacts with the automated customized food generation machine 10' (e.g., "interfacing" automated customized food generation machine). Upon the automated customized food generation machine 10' determining that it is unable to successfully generate one or more customized food items 22 in compliance with the one or more customized food preferences of the user 13, the automated customized food generation machine 10' may execute the same or similar operations that the network device 12* of 10*b* and 10*c* is able to execute including, for example, determining whether there are any capable automated customized food generation machines in the nearby vicinity of the user 13 and determining whether there are any substitute automated customized food generation machines in the nearby vicinity of the user 13. If no capable automated customized food generation machines are detected in the nearby vicinity of the user 13 then the automated customized food generation machine 10' may direct the user 12 to one or more substitute automated customized food generation machines (e.g., automated customized food generation machines 10" and 10'") that are determined to be in the nearby vicinity (e.g., within 30 minutes of walking, mass transit, and/or automatable traveling distance) of the user 13.

It should be noted that although in the above description of the various scenarios, the operation to determine whether there are any capable automated customized food generation machine present in the nearby vicinity of the user and the operation to identify presence of any substitute automated customized food generation machines in the nearby vicinity of the user were described as two separate operations, in alternative embodiments such operations may be performed through a single common operation. That is, an operation to determine the manufacturing capabilities of all automated customized food generation machines present in the nearby vicinity of the user 13 may perform both of the these operations (e.g., an operation to determine whether there are any capable automated customized food generation machine present in the nearby vicinity of the user 13 and the operation to identify presence of any substitute automated customized food generation machines in the nearby vicinity of the user 13).

Figure 2A:
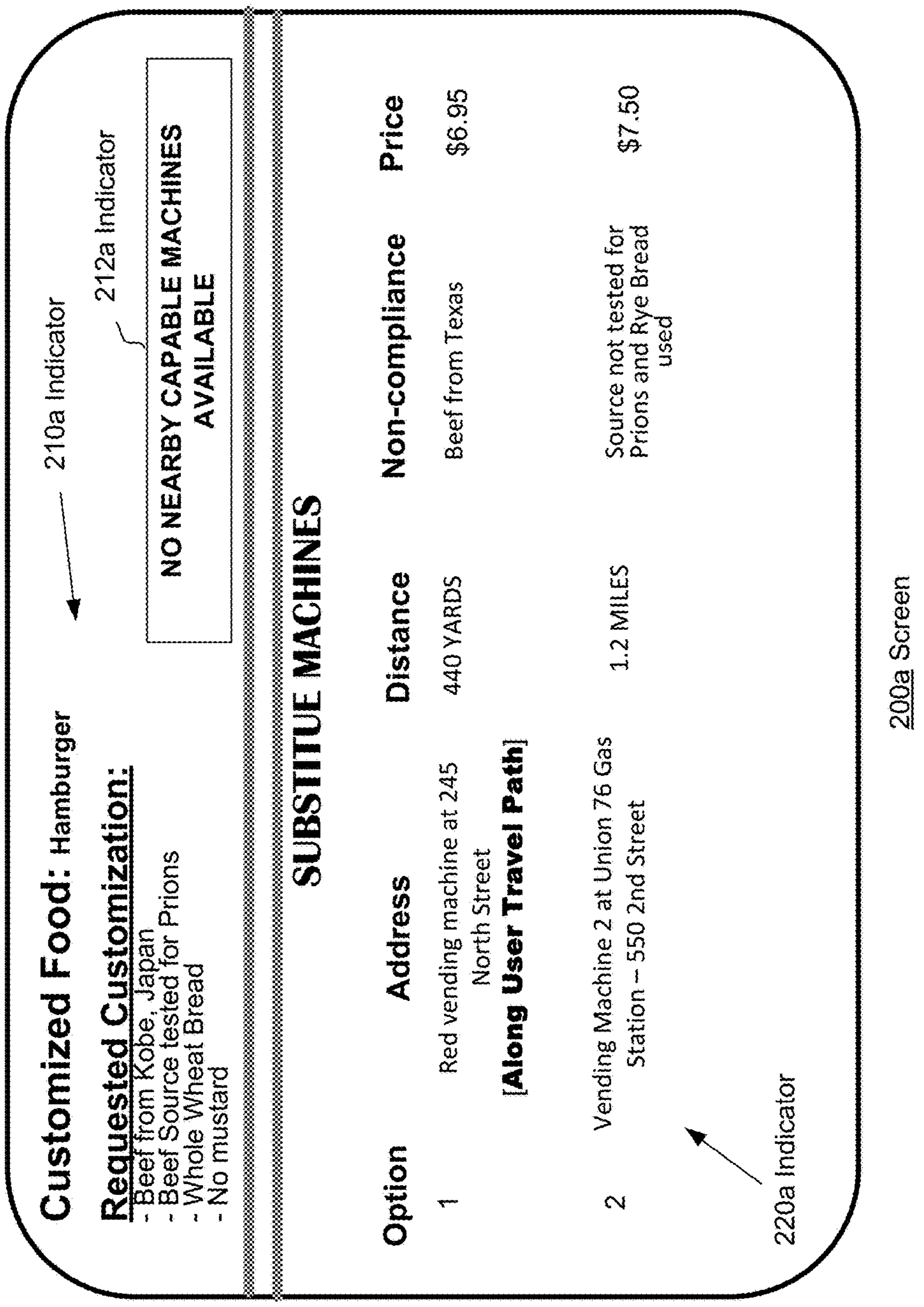
FIG. 2A illustrates an exemplary screen that identifies substitute automated customized food generation machines.
Figure 2B:
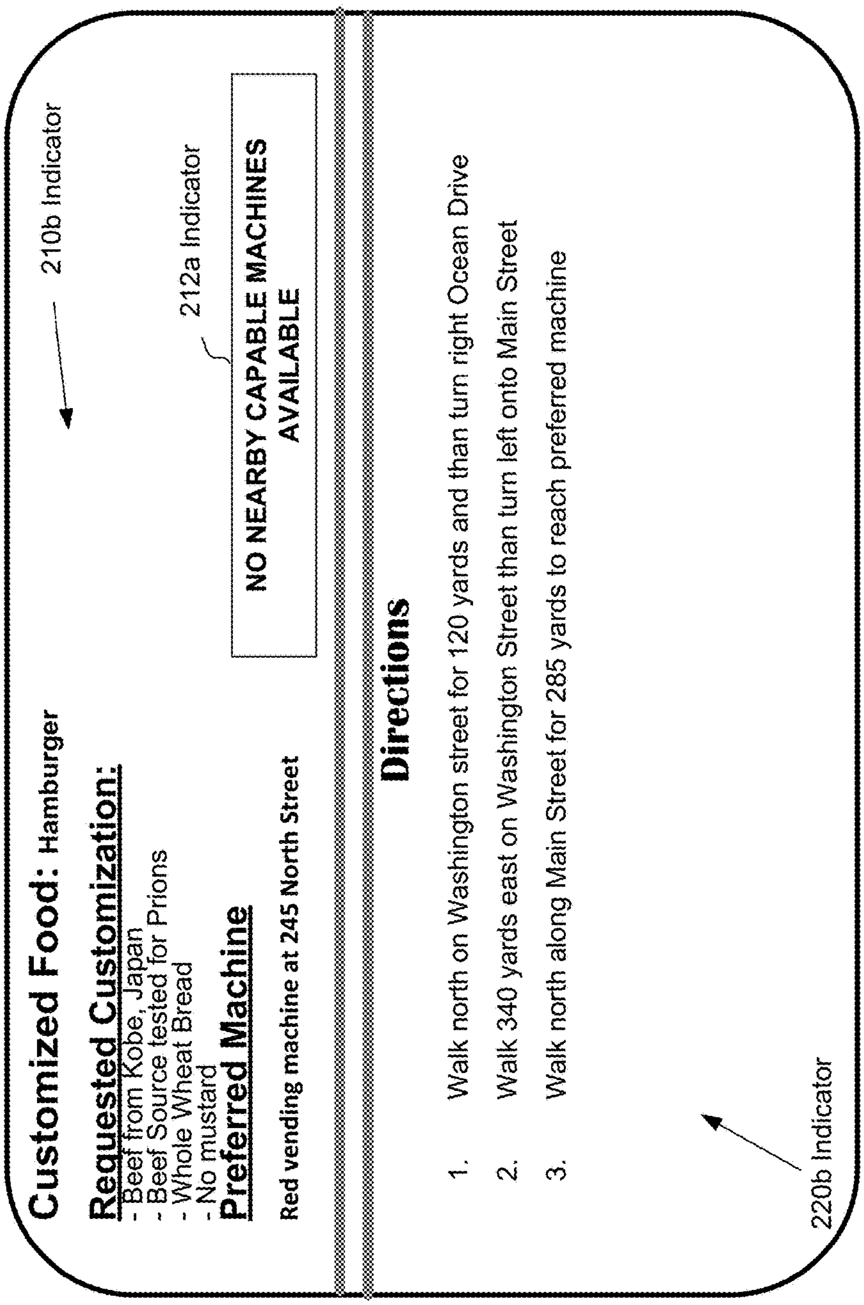
FIG. 2B illustrates an exemplary screen that provides directions to a substitute automated customized food generation machine.
Figure 2C:
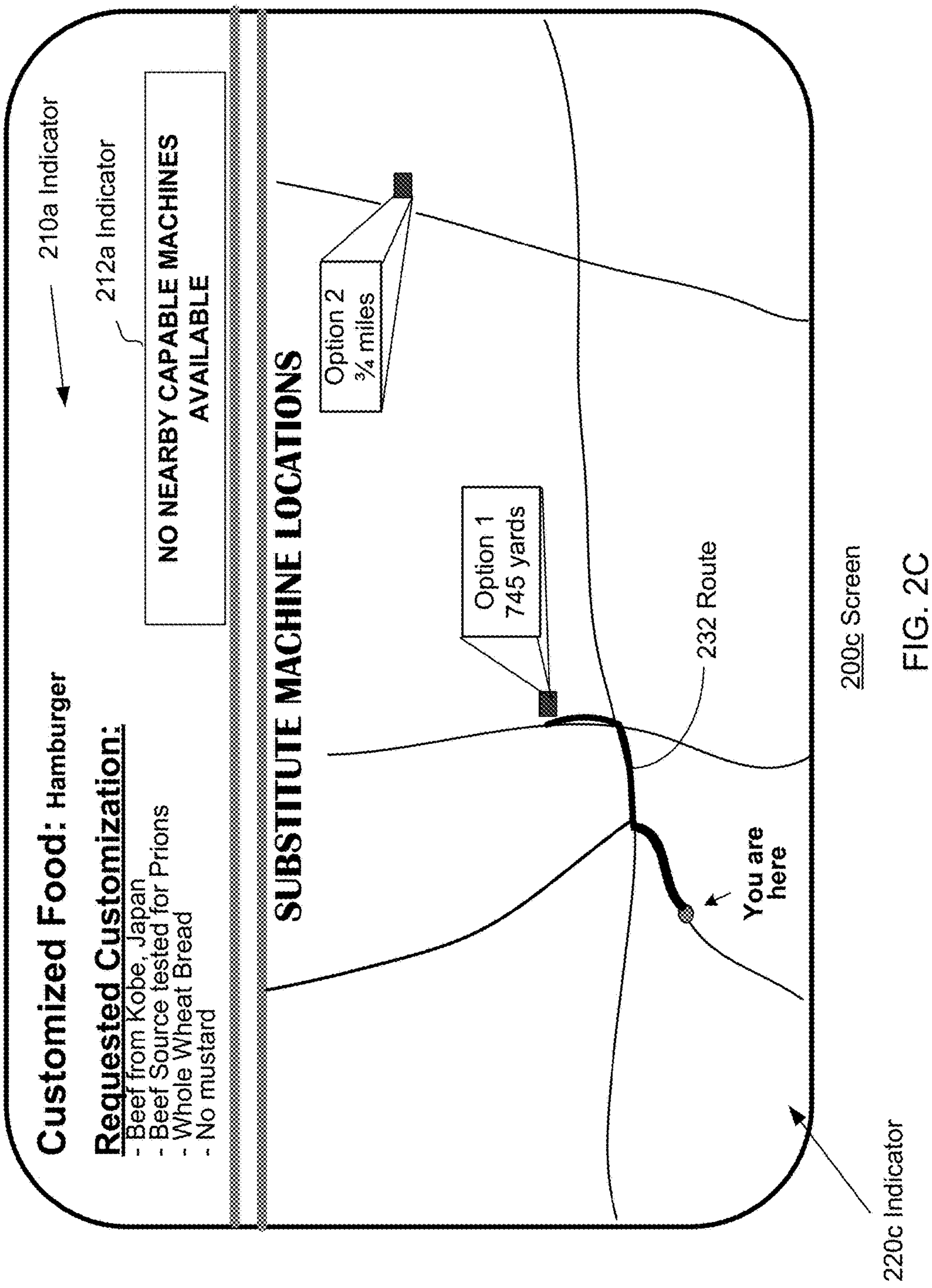
FIG. 2C illustrates an exemplary screen that shows locations of substitute automated customized food generation machines on a map.

Referring now to FIGS. 2A, 2B, and 2C, which illustrate exemplary screens that may be displayed through a computing device 15 (see, for example, FIG. 1C or 1D) or through an automated customized food generation machine 10' (see, for example, FIG. 1C or 1E) and that provides indicators that direct a user 13 to one or more substitute automated customized food generation machines in accordance with various embodiments. Turning particularly now to FIG. 2A, which illustrates an exemplary screen 200*a* that includes indicator 210*a* that provides information that identifies the customized food being requested (e.g., hamburger) and the customized food preferences (e.g., Beef from Kobe, Japan, source for the beef tested for prions, and so forth) of the user 13. Exemplary screen 200*a* also includes indicator 220*a* that identifies substitute automated customized food generation machines (e.g., the automated customized food generation machines of FIGS. 1B, 1C, 1D, and 1E) that are determined to be able to currently generate one or more substitute customized food items that are only in partial compliance with one or more customized food preferences of the user 13. Indicator 220*a* identifies the substitute automated customized food generation machines by machine identifier (e.g., "Red vending machine" and "Vending machine 2"), by address (e.g., "235 Main Street" and "550 2$^{nd}$ Street), and by name of location (e.g., "Union 76 Gas Station"). Indicator 220*a* also indicates the distances to the substitute automated customized food generation machines from the current location of the user 13. Indicator 220*a* additionally indicates the non-compliance (e.g., deficiency or deficiencies relative to the one or more customized food preferences of the user 13 of the substitute customized food items that the substitute automated customized food generation machines may be able to generate) of the substitute customized food items that the substitute automated customized food generation machines are able to generate. Indicator 220*a* further indicates the prices of the substitute customized food items that can be generated by the substitute automated customized food generation machines. Indicator 220*a*, as illustrated, ranks the different machines automated customized food generation machines based on their distances from the user 13 (e.g., Option 1 is ranked first because it is only 745 yards away). Note also, that indicator 220*a* indicates that the first listed substitute automated customized food generation machine (e.g., option 1) is located along a past travel path of the user 13 (e.g., a travel route or path that the user 13 has previously used). Exemplary screen 200*a* also includes indicator 212*a* that indicates that there are no capable automated customized food generation machines located in the nearby vicinity of the user 13.

FIG. 2B illustrates an exemplary screen 200*b* that may be displayed upon the user 13 selecting "option 1" of screen 200*a* of FIG. 2A. As a result of electing option 1, screen 200*b* is displayed that shows directions (e.g., instructions) for traveling to the corresponding substitute automated customized food generation machine (e.g., automated customized food generation machine 10'" or 10"" of FIG. 1B, 1C, 1D, or 1E) as indicated by indicator 220*b*. In contrast, indicator 210*b* of FIG. 2B identifies the substitute automated customized food generation machine that was selected by the user 13 (e.g., "Red vending machine at 245 North Street") and the original user preference information (e.g., name of the food requested—hamburger and customization preferences—beef from Kobe, Japan, ingredient source tested for prions, and so forth).

Turning now to FIG. 2C, which illustrates an exemplary screen 200*c* that includes indicator 220*c* that identifies the locations of the two substitute automated customized food generation machines relative to the current location of the user 13 on a map. In particular, indicator 220*c* includes black squares that indicate locations of substitute automated customized food generation machines superimposed on top of a map. Indicator 220*c* further includes route 232 that shows a route that the user 13 may take in order to get to the location of one of the substitute automated customized food generation machines from the current location of the user 13. A more detailed discussion related to the exemplary screens 200*a*, 200*b*, and 200*c* of FIGS. 2A, 2B, and 2C will be provided below with respect to the various operations and processes to be described herein.

Referring now to FIGS. 3A and 3B, which as briefly described above, illustrate two block diagrams of two different implementations of the automated customized food generation machine 10* of FIG. 1A when the automated customized food generation machine 10* is a standalone device with all of the necessary logic to perform the various operations to be described below with respect to the flow process of FIG. 5. In particular, and as will be further described herein, FIG. 3A illustrates an automated customized food generation machine 10*a* that is the "hardwired" or "hard" implementation of a standalone automated customized food generation system that can implement the operations and processes to be described herein. The automated customized food generation machine 10*a* may comprise certain logic modules including, for example, a user preference information obtaining module 302', a capable automated customized food generation machine presence determining module 304', a substitute automated customized food generation machine presence ascertaining module 306', and/or an indicator presenting module 308' that are implemented using purely hardware or circuitry components (e.g., application specific integrated circuit or "ASIC"). In contrast, FIG. 3B illustrates a standalone automated customized food generation machine 10*b* that is the "soft" implementation of an automated customized food generation system that can implement the operations and processes to be described herein. In various embodiments, the automated customized food generation machine 10*b* may also include certain logic modules including, for example, a user preference information obtaining module 302", a capable automated customized food generation machine presence determining module 304", a substitute automated customized food generation machine presence ascertaining module 306", and/or an indicator presenting module 308" that are implemented using electronic circuitry (e.g., one or more processors 330 including one or more microprocessors, controllers, etc.) executing one or more programming instructions (e.g., software in the form of computer readable instructions 342—see FIG. 3B).

The embodiments of the standalone automated customized food generation machine 10* illustrated in FIGS. 3A and 3B are two extreme implementations of a standalone automated customized food generation system in which all of the logic modules (e.g., the user preference information obtaining module 302', the capable automated customized food generation machine presence determining module 304', the substitute automated customized food generation machine presence ascertaining module 306', and the indicator presenting module 308') are implemented using purely hardware solutions (e.g., circuitry such as ASIC) as illustrated in, for example, FIG. 3A or in which all of the logic modules (e.g., the user preference information obtaining module 302", the capable automated customized food generation machine presence determining module 304", the substitute automated customized food generation machine presence ascertaining module 306", and the indicator presenting module 308") are implemented using software solutions (e.g., programmable instructions in the form of computer readable instructions 342 being executed by hardware such as one or more processors 330) as illustrated in, for example, FIG. 3B. Since there are many ways of combining hardware, software, and/or firmware in order to implement the various logic modules (e.g., the user preference information obtaining module 302*, the capable automated customized food generation machine presence determining module 304*, the substitute automated customized food generation machine presence ascertaining module 306*, and the indicator presenting module 308*), only the two extreme implementations (e.g., the purely hardware solution as illustrated in FIG. 3A and the software solution of FIG. 3B) are illustrated here. It should be noted here that with respect to the "soft" implementation illustrated in FIG. 3B, hardware in the form of circuitry such as one or more processors 330 are still needed in order to execute the software. Further details related to the two implementations of the standalone automated customized food generation machine 10* illustrated in FIGS. 3A and 3B will be provided in greater detail below.

In still other implementations, the automated customized food generation machine 10* of FIG. 1A may not actually include the various logic modules (e.g., the user preference information obtaining module 302*, the capable automated customized food generation machine presence determining module 304*, the substitute automated customized food generation machine presence ascertaining module 306*, and the indicator presenting module 308*) that implement the various operations/processes described herein. For example, the automated customized food generation machine 10*c* of FIG. 3C illustrates such a device that does not have the various logic modules (e.g., a user preference information obtaining module 302*, a capable automated customized food generation machine presence determining module 304*, a substitute automated customized food generation machine presence ascertaining module 306*, and an indicator presenting module 308*) included in the automated customized food generation machine 10*a* and 10*b* of FIGS. 3A and 3B. Instead, such logic modules may be located in a remote device such as at a network device 12* as illustrated, for example, in FIGS. 3D and 3E. In such implementations, the other device (e.g., network device 12*) may be endowed with the various logic modules (e.g., a user preference information obtaining module 302*, a capable automated customized food generation machine presence determining module 304*, a substitute automated customized food generation machine presence ascertaining module 306*, and an indicator presenting module 308*) in order to be able to perform at least some of the processes and operations to be described herein. In various implementations, the network device 12* may be a network computing device (e.g., a server or a workstation) or a plurality of network devices (e.g., the cloud).

FIGS. 3D and 3E illustrates two extreme implementations of the network device 12* of FIGS. 1B, 1C, and 1D in which all of the logic modules (e.g., the user preference information obtaining module 302'", the capable automated customized food generation machine presence determining module 304'", the substitute automated customized food generation machine presence ascertaining module 306'", and the indicator presenting module 308'") are implemented using purely hardware solutions (e.g., circuitry such as ASIC) as illustrated in, for example, FIG. 3D, or in which all of the logic modules (e.g., the user preference information obtaining module 302"", the capable automated customized food generation machine presence determining module 304"", the substitute automated customized food generation machine presence ascertaining module 306"", and the indicator presenting module 308"") are implemented using software solutions (e.g., programmable instructions in the form of computer readable instructions 342 being executed by hardware such as one or more processors 330) as illustrated in, for example, FIG. 3E. Again, although there are many ways to combine hardware, software, and/or firmware in order to implement the various logic modules (e.g., the user preference information obtaining module 302*, the capable automated customized food generation machine presence determining module 304*, the substitute automated customized food generation machine presence ascertaining module 306*, and the indicator presenting module 308*), for ease of illustration only the two extreme implementations (e.g., the purely hardware solution as illustrated in FIG. 3D and the software solution of FIG. 3E) are illustrated here.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring back to FIG. 3A, which illustrates a block diagram of an automated customized food generation machine 10*a* that includes a user preference information obtaining module 302', a capable automated customized food generation machine presence determining module 304', a substitute automated customized food generation machine presence ascertaining module 306', and an indicator presenting module 308', memory 340, a communication system 350 (e.g., a network interface card, a transceiver, and so forth), a user interface 360 (e.g., a display, a speaker, and so forth), one or more processors 330 (e.g., one or more microprocessors), and a customized food item production system 320. In some embodiments, the memory 340 may store ingredient supply data 341 that indicates ingredient supply information of one or more automated customized food generation machines 10* (which in this case, may also indicate the supply information of the automated customized food generation machine 10*a*). In various embodiments, the customized food item production system 320 may include one or more ingredient supplies, and components for manufacturing customized food items including, for example, robotic components, 3-D printing components, heating and/or cooling components, ingredient mixing components, molding components, and so forth for producing or manufacturing one or more customized food items in accordance with customized food preferences of one or more users. In some embodiments, the user interface 360 may include a display screen 30 such as a touchscreen, a keypad 32, and so forth.

In various embodiments, the user preference information obtaining module 302' of the automated customized food generation machine 10*a* of FIG. 3A is a logic module that may be designed to, among other things, obtain user preference information of a user, the user preference information to be obtained indicating one or more customized food preferences of the user 13 including at least one or more ingredient integrity preferences related to integrity of one or more ingredients. In contrast, the capable automated customized food generation machine presence determining module 304' of FIG. 3A is a logic module that may be configured to determine that there is no capable automated customized food generation machine present in nearby vicinity of the user 13 that is able to currently generate one or more customized food items 22 in compliance with the one or more customized food preferences of the user 13. The substitute automated customized food generation machine presence ascertaining module 306' is a logic module that may be configured to, among other things, ascertain in the nearby vicinity of the user 13 presence of one or more substitute automated customized food generation machines that are able to currently generate at least one substitute customized food item that is only in partial compliance with the one or more customized food preferences of the user 13. The indicator presenting module 308' of FIG. 3A, on the other hand, is a logic module that may be configured to, among other things, present one or more indicators 220* that identify the one or more substitute automated customized food generation machines in response, at least in part, to the ascertainment of the presence of the one or more substitute automated customized food generation machines in the nearby vicinity of the user 13.

Turning now to FIG. 3B, which illustrates a block diagram of another automated customized food generation machine 10*b* that can implement the operations and processes to be described herein. As indicated earlier, the automated customized food generation machine 10*b* in FIG. 3B is merely the "soft" version of the automated customized food generation machine 10*a* of FIG. 3A because the various logic modules: the user preference information obtaining module 302", the capable automated customized food generation machine presence determining module 304", the substitute automated customized food generation machine presence ascertaining module 306", and the indicator presenting module 308" are implemented using one or more processors 330 (e.g., one or more microprocessors or controllers) executing software (e.g., computer readable instructions 342) rather than being implemented using purely hardware (e.g., ASIC) solutions as was the case in the automated customized food generation machine 10*a* of FIG. 3A. Thus, the user preference information obtaining module 302", the capable automated customized food generation machine presence determining module 304", the substitute automated customized food generation machine presence ascertaining module 306", and the indicator presenting module 308" of FIG. 3B may be designed to execute the same or similar functions as the user preference information obtaining module 302', the capable automated customized food generation machine presence determining module 304', the substitute automated customized food generation machine presence ascertaining module 306', and the indicator presenting module 308' of FIG. 3A. The automated customized food generation machine 10*b*, as illustrated in FIG. 3B, may include other components (e.g., the user interface 360, the communication system 350, the memory 340 that stores the ingredient supply data 341 and the computer readable instructions 342, the customized food item production system 320, and so forth) that are the same or similar to the other components that may be included in the automated customized food generation machine 10*a* of FIG. 3A. Note that in the embodiment of the automated customized food generation machine 10*b* illustrated in FIG. 3B, the various logic modules (e.g., the user preference information obtaining module 302", the capable automated customized food generation machine presence determining module 304", the substitute automated customized food generation machine presence ascertaining module 306", and the indicator presenting module 308") may be implemented by the one or more processors 330 (or other types of circuitry such as field programmable gate arrays or FPGAs) executing one or more computer readable instructions 342 stored in memory 340.

In various embodiments, the memory 340 of the automated customized food generation machine 10*a* of FIG. 3A and the automated customized food generation machine 10*b* of FIG. 3B may comprise one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 5:
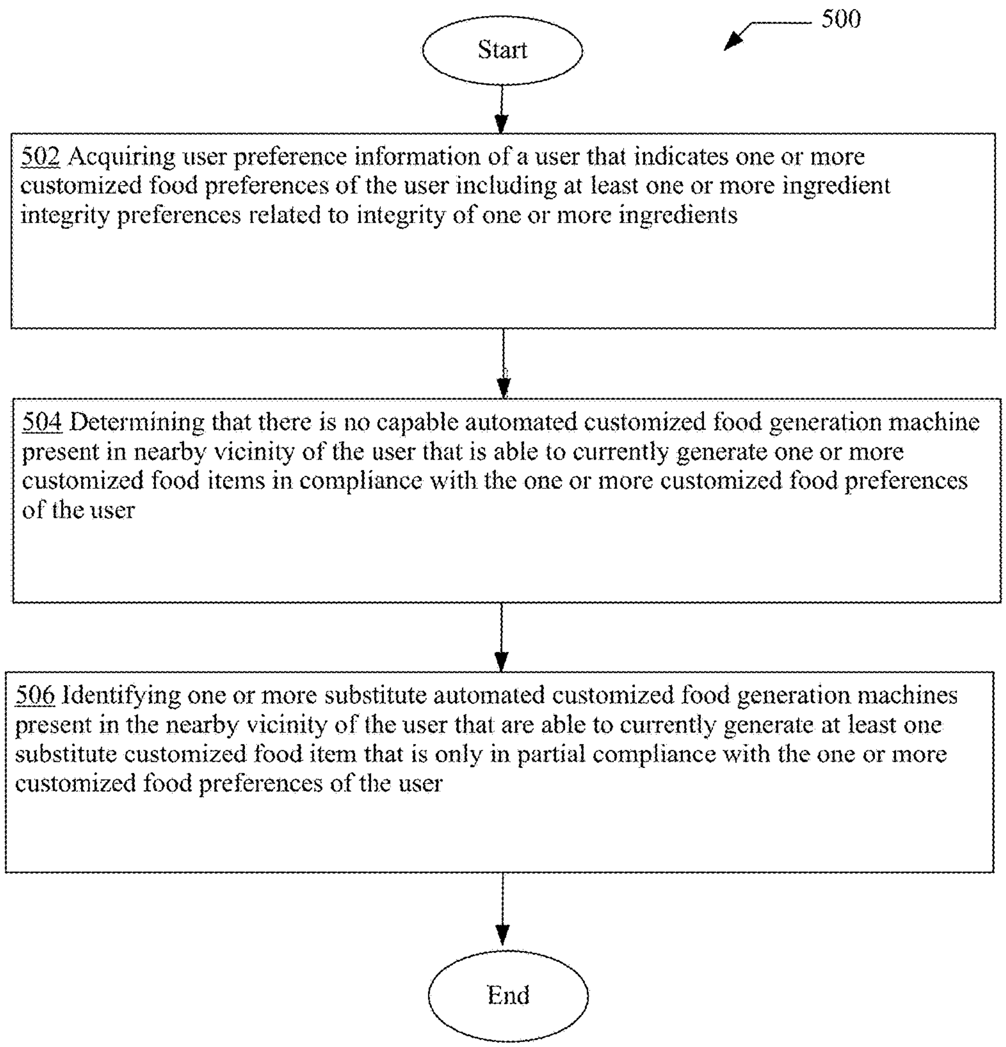
FIG. 5 is a high-level logic flowchart of a process, e.g., operational flow 500, according to some embodiments.
Figure 9:
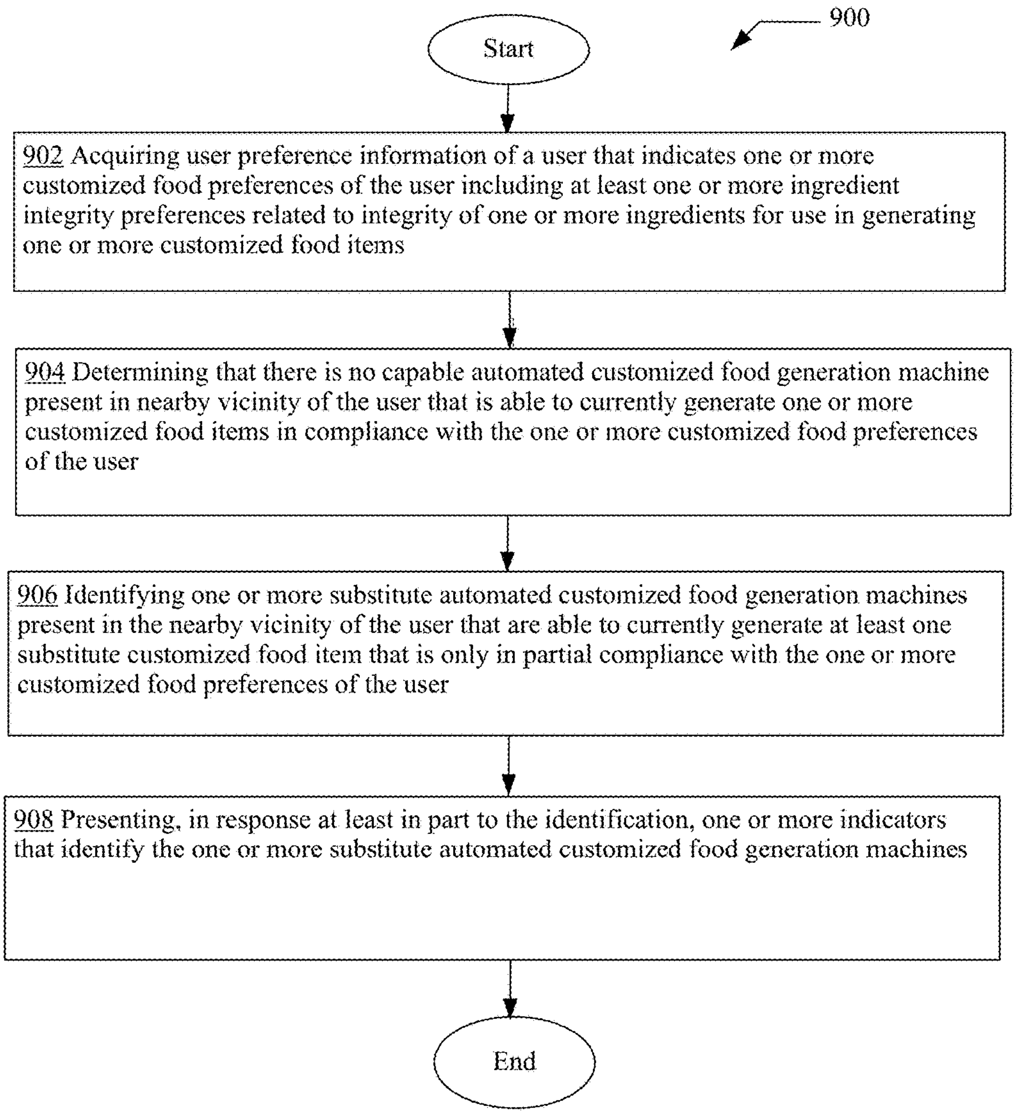
FIG. 9 is a high-level logic flowchart of another process, e.g., operational flow 900, according to some embodiments.

FIG. 3C illustrates the automated customized food generation machine 10* of FIG. 1A (e.g., illustrated in FIG. 3C as automated customized food generation machine 10*c*) when the automated customized food generation machine 10* of FIG. 1A is not a standalone device but instead, relies on another device (e.g., the network device 12* of FIG. 1C or 1D) to provide the various logic needed in order to, for example, execute the various operations to be described herein (e.g., see FIG. 5 or 9). In contrast, FIGS. 3D and 3E illustrate two extreme implementations (e.g., in which all of the logic modules are implemented using hardware solutions as illustrated in the network device 12*a* of FIG. 3D or in which all of the logic modules are implemented using software solutions as illustrated in the network device 12*b* of FIG. 3E) of the network device 12* of FIGS. 1B, 1C, and 1D. Note that both the network device 12*a* of FIG. 3D and the network device 12*b* of FIG. FIG. 3E have the same logic modules as those logic modules included in the customized food preparation systems 10*a* and 10*b* of FIGS. 3A and 3B performing the same or similar functionalities.

Figure 4A:
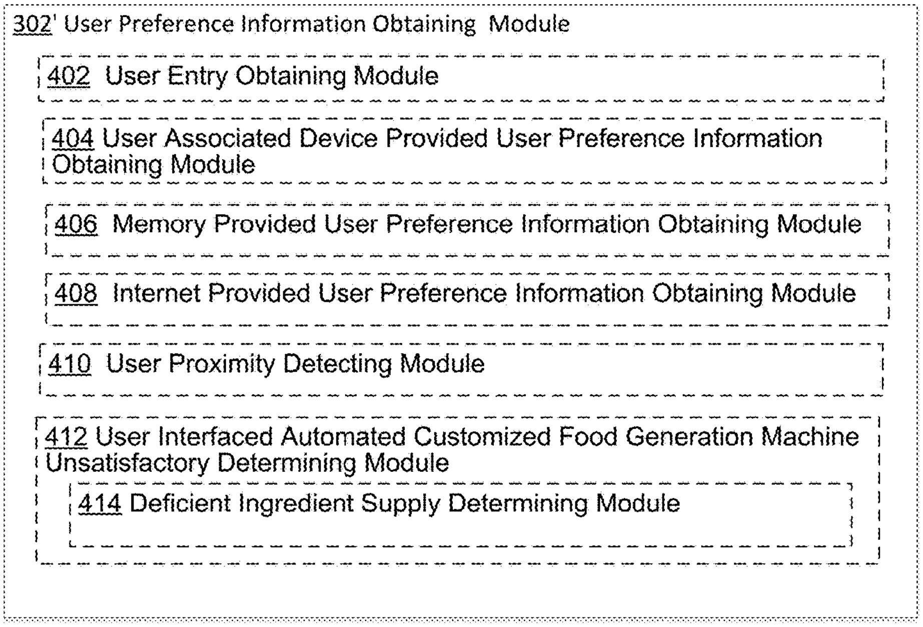
FIG. 4A shows another perspective of the user preference information obtaining module 302* of FIG. 3A, 3B, 3D, or 3E (e.g., the user preference information obtaining module 302' of FIG. 3A, the user preference information obtaining module 302" of FIG. 3B, the user preference information obtaining module 302' of FIG. 3D, or the user preference information obtaining module 302"" of FIG. 3E) in accordance with various implementations.

Turning now to FIG. 4A illustrating a particular implementation of the user preference information obtaining module 302* (e.g., the user preference information obtaining module 302', the user preference information obtaining module 302", the user preference information obtaining module 302'", or the user preference information obtaining module 302"") of FIG. 3A, 3B, 3D, or 3E. As illustrated, the user preference information obtaining module 302* may include one or more sub-logic modules in various alternative implementations. For example, in various embodiments, the user preference information obtaining module 302* may include a user entry obtaining module 402, a user associated device provided user preference information obtaining module 404, a memory provided user preference information obtaining module 406, an internet provided user preference information obtaining module 408, a user proximity detecting module 410, and/or a user interfaced automated customized food generation machine unsatisfactory determining module 412 (which may further include a deficient ingredient supply determining module 414). Specific details related to the user preference information obtaining module 302* as well as the above-described sub-modules of the user preference information obtaining module 302* will be provided below with respect to the operations and processes to be described herein.

Turning now to FIG. 4B illustrating a particular implementation of the capable automated customized food generation machine presence determining module 304* (e.g., the capable automated customized food generation machine presence determining module 304', the capable automated customized food generation machine presence determining module 304", the capable automated customized food generation machine presence determining module 304'", or the capable automated customized food generation machine presence determining module 304"") of FIG. 3A, 3B, 3D, or 3E. As illustrated, the capable automated customized food generation machine presence determining module 304* may include one or more sub-logic modules in various alternative implementations. For example, in various embodiments, the capable automated customized food generation machine presence determining module 304* may include an automated customized food generation machine querying module 416, a preparation preference capable automated customized food generation machine presence determining module 418, a taste/flavor preference capable automated customized food generation machine presence determining module 420, an ingredient preference capable automated customized food generation machine presence determining module 422, an ingredient purity preference capable automated customized food generation machine presence determining module 424, an ingredient source preference capable automated customized food generation machine presence determining module 426, and/or an ingredient source location preference capable automated customized food generation machine presence determining module 428. Specific details related to the capable automated customized food generation machine presence determining module 304* as well as the above-described sub-modules of the capable automated customized food generation machine presence determining module 304* will be provided below with respect to the operations and processes to be described herein.

Turning now to FIG. 4C illustrating a particular implementation of the substitute automated customized food generation machine presence ascertaining module 306* (e.g., the substitute automated customized food generation machine presence ascertaining module 306', the substitute automated customized food generation machine presence ascertaining module 306", the substitute automated customized food generation machine presence ascertaining module 306", or the substitute automated customized food generation machine presence ascertaining module 306"") of FIG. 3A, 3B, 3D, or 3E. As illustrated, the substitute automated customized food generation machine presence ascertaining module 306* may include one or more sub-logic modules in various alternative implementations. For example, in various embodiments, the substitute automated customized food generation machine presence ascertaining module 306* may include a substitute automated customized food generation machine description ascertaining module 430, a substitute automated customized food generation machine location ascertaining module 432, a user/substitute machine distance ascertaining module 434, a travel route ascertaining module 436, an automated customized food generation machine querying module 438, and/or a preferred ingredient deficient substitute automated customized food generation machine presence ascertaining module 440 (which may further include a substitute ingredient stocked substitute automated customized food generation machine presence ascertaining module 442). Specific details related to the substitute automated customized food generation machine presence ascertaining module 306* as well as the above-described submodules of the substitute automated customized food generation machine presence ascertaining module 306* will be provided below with respect to the operations and processes to be described herein.

Referring to FIG. 4D, which illustrates a particular implementation of the indicator presenting module 308* (e.g., the indicator presenting module 308', the indicator presenting module 308", the indicator presenting module 308'", or the indicator presenting module 308"") of FIG. 3A, 3B, 3D, or 3E. As illustrated, the indicator presenting module 308* may include one or more sub-logic modules in various alternative implementations. For example, in various embodiments, the indicator presenting module 308* may include an electronic indicator communicating module 444, a textual indicator presenting module 446, a graphical indicator presenting module 448, a distance indicator presenting module 450, and/or a substitute customized food item deficiency indicator presenting module 452. Specific details related to the indicator presenting module 308* as well as the above-described sub-modules of the indicator presenting module 308* will be provided below with respect to the operations and processes to be described herein.

In the following, various operations are presented in accordance with various embodiments that may be implemented by the automated customized food generation machine 10* of FIG. 3A, 3B, or 3C, or that may be implemented by the network device 12* of FIG. 3D or 3E. FIG. 5, for example, illustrates an operational flow 500 representing example computationally-implemented operations that may be implemented for, among other things, acquiring user preference information of a user that indicates one or more customized food preferences of the user, determining that there is no capable automated customized food generation machine present near the user that is capable of currently generating one or more customized food items in total or complete compliance with the one or more customized food preferences of the user, and identifying one or more substitute automated customized food generation machines in the nearby vicinity of the user that are able to generate at least one substitute customized food item that is in partial compliance with the one or more customized food preferences of the user. In some implementations, at least some portions of these operations may be implemented via an automated customized food generation machine 10* (e.g., the automated customized food generation machine 10*a*, automated customized food generation machine 10*b*, or the automated customized food generation machine 10*c*) of, for example, FIG. 3A, 3B, or 3C or via a network device 12* (e.g., the network device 12*a* or the network device 12*b*) of FIG. 3D or 3E.

In FIG. 5 and in the following figures that include various examples of operational flows, discussions and explanations will be provided with respect to the automated customized food generation machine 10* or the network device 12* described above and as illustrated in FIGS. 3A, 3B, 3C, 3D, 3E, 4A, 4B, 4C, and 4D, and/or with respect to other examples (e.g., as provided in FIGS. 1A, 1B, 1C, 1D, 1E, 2A, 2B, and 2C) and contexts. However, it should be understood that the operational flows may be executed in a number of other environments and contexts, and/or in modified versions of FIGS. 1A, 1B, 1C, 1D, 1E, 2A, 2B, 2C, 3B, 3C, 3D, 3E, 4A, 4B, 4C, and 4D. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a user preference information acquiring operation 502 for acquiring user preference information of a user that indicates one or more customized food preferences of the user including at least one or more ingredient integrity preferences related to integrity of one or more ingredients. For instance, and as illustration, the user preference information obtaining module 302* of the automated customized food generation machine 10* of FIG. 3A or 3B (e.g., the user preference information obtaining module 302' of FIG. 3A or the user preference information obtaining module 302" of FIG. 3B) or of the network device 12* of FIG. 3D or 3E (e.g., the user preference information obtaining module 302'" of FIG. 3D or the user preference information obtaining module 302"" of FIG. 3E) acquiring or obtaining user preference information (e.g., user dietary information, user dietary preferences, user dietary restrictions, ingredient preference, food preference, and so forth) of a user 13 that indicates one or more customized food preferences of the user 13 including at least one or more ingredient integrity preferences (e.g., purity preferences and/or sourcing preferences) related to integrity of one or more ingredients (e.g., meats, dairy products, vegetables, processed ingredients such as flour or sugar, and so forth) that may be used for generating one or more customized food items 22 (e.g., customized energy bars, customized sandwiches, customized shakes or smoothies, customized stews, and so forth).

Operational flow 500 may also include a capable automated customized food generation machine presence determining operation 504 for determining that there is no capable automated customized food generation machine present in nearby vicinity of the user that is able to currently generate one or more customized food items in compliance with the one or more customized food preferences of the user. For instance, the capable automated customized food generation machine presence determining module 304* of the automated customized food generation machine 10* of FIG. 3A or 3B (e.g., the capable automated customized food generation machine presence determining module 304' of FIG. 3A or the capable automated customized food generation machine presence determining module 304" of FIG. 3B) or of the network device 12* of FIG. 3D or 3E (e.g., the capable automated customized food generation machine presence determining module 304'" of FIG. 3D or the capable automated customized food generation machine presence determining module 304"" of FIG. 3E) determining or ascertaining that there is no capable automated customized food generation machine (e.g., there are no "capable" automated customized food generation machine 10"" of, for example, FIGS. 1B, 1C, 1D, and 1E) present in nearby vicinity (e.g., within half a mile) of the user 13 that is able to currently (e.g., at the time of the determination) generate one or more customized food items 22 in full or complete compliance with the one or more customized food preferences (e.g., preference for aspartame as a sweetener, preference that beef ingredients that are to be used not be from Britain, and so forth) of the user 13.

Operational flow 500 may further include a substitute automated customized food generation machine presence identifying operation 506 for identifying one or more substitute automated customized food generation machines present in the nearby vicinity of the user that are able to currently generate at least one substitute customized food item that is only in partial compliance with the one or more customized food preferences of the user. For instance, the substitute automated customized food generation machine presence ascertaining module 306* of the automated customized food generation machine 10* of FIG. 3A or 3B (e.g., the substitute automated customized food generation machine presence ascertaining module 306' of FIG. 3A or the substitute automated customized food generation machine presence ascertaining module 306" of FIG. 3B) or of the network device 12* of FIG. 3D or 3E (e.g., the substitute automated customized food generation machine presence ascertaining module 306'" of FIG. 3D or the substitute automated customized food generation machine presence ascertaining module 306"" of FIG. 3E) identifying or ascertaining one or more substitute automated customized food generation machines (e.g., automated customized food generation machines 10" and 10'") present in the nearby vicinity (e.g., within one mile) of the user 13 that are able to currently (e.g., at the time of the identifying) generate at least one substitute customized food item that is only in partial compliance (as opposed to complete or full compliance) with the one or more customized food preferences of the user 13.

For example, identifying or ascertaining at least one substitute automated customized food generation machine 10" or 10'" that is capable of generating, at least at the time of identification, a substitute customized food item 22 that is in partial compliance with the customization preferences of the user 13. Thus, references in the following to a "substitute automated customized food generation machine" or to "one or more substitute automated customized food generation machines" (as opposed to one or more "capable automated customized food generation machines") may be in reference to one or more automated customized food generation machines (e.g., the automated customized food generation machines 10" and 10'" of FIGS. 1B, 1C, 1D, and 1E) that can currently (e.g., at the time of identification or ascertainment) generate one or more substitute customized food items (e.g., customized food items 22) that are only in partial compliance with one or more customized food preferences of a user 13 as they related to one or more particular food items (e.g., customization preferences as they relate to energy bars, sandwiches, shakes, soups, and so forth).

In contrast, references in the following to a "capable automated customized food generation machine" or to "one or more capable automated customized food generation machines" may be in reference to one or more automated customized food generation machines (e.g., capable automated customized food generation machine 10"" of FIGS. 1B, 1C, 1D, and 1E) that can currently generate one or more compliant customized food items (e.g., customized food item 22 of FIG. 1A) that are in full or complete compliance with one or more customized food preferences of the user 13 as they related to one or more particular food items. In various embodiments, the ability of a capable automated customized food generation machine to be able to currently generate one or more compliant customized food items may be as a result of having current access to (e.g., having supplies of) the necessary or preferred ingredients in sufficient quantities in order to generate one or more compliant customized food items that are in full compliance with one or more preferences of a user 13. In contrast, the inability of a substitute automated customized food generation machine (e.g., the substitute automated customized food generation machine 10" or 10'" of FIG. 1B, 1C, 1D, or 1E) to be able to currently generate one or more substitute customized food items may be as a result of not having at least current access to the necessary or preferred ingredients in sufficient quantities that are needed in order to currently generate one or more compliant customized food items that are in full compliance with one or more preferences of a user 13. For purposes of the following description, a "compliant customized food item" is a customized food item that is generated in complete or total compliance with one or more customized food preferences of a user 13. In contrast, a substitute customized food item is a customized food item that is generated in partial compliance with one or more customized food preferences of a user and that is generated in order to substitute for a compliant customized food item.

Figure 6A:
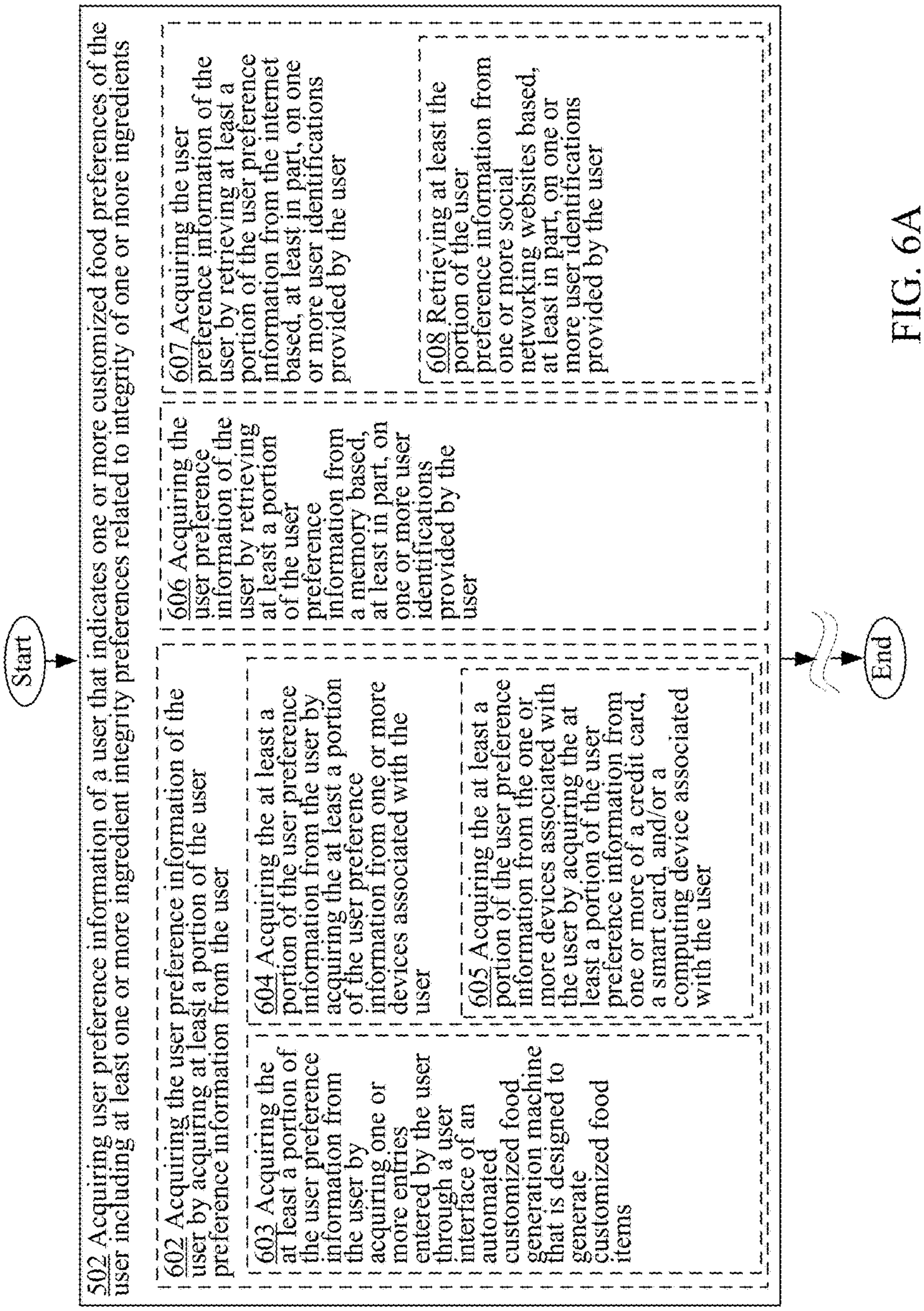
FIG. 6A is a high-level logic flowchart of a process depicting alternate implementations of the user preference information acquiring operation 502 of FIG. 5.

As will be described below, the user preference information acquiring operation 502, the capable automated customized food generation machine presence determining operation 504, and the substitute automated customized food generation machine presence identifying operation 506 may be executed in a variety of different ways in various alternative implementations. FIGS. 6A, 6B, 6C, and 6D, for example, illustrate at least some of the alternative ways that the user preference information acquiring operation 502 of FIG. 5 may be implemented in various alternative implementations. In some cases, for example, the user preference information acquiring operation 502 may include an operation 602 for acquiring the user preference information of the user by acquiring at least a portion of the user preference information from the user as illustrated in FIG. 6A. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 by acquiring or obtaining at least a portion of the user preference information from the user 13 (e.g., preference information such as user ID, food item selection, and so forth as entered by the user 13).

In various implementations, operation 602 may further include one or more additional operations including, in some cases, an operation 603 for acquiring the at least a portion of the user preference information from the user by acquiring one or more entries entered by the user through a user interface of an automated customized food generation machine that is designed to generate customized food items. For instance, the user preference information obtaining module 302* including the user entry obtaining module 402 (see FIG. 4A) of the automated customized food generation machine 10*a* or 10*b* of FIG. 3A or 3B (or of the network device 12*a* or 12*b* of FIG. 3D or 3E) acquiring the at least a portion of the user preference information from the user 13 by having the user entry obtaining module 402 acquire or obtain one or more entries entered by the user 13 through a user interface 360 of an automated customized food generation machine 10* that is designed to generate customized food items 22 in accordance with user customization preferences.

In some implementations, operation 602 may further include an operation 604 for acquiring the at least a portion of the user preference information from the user by acquiring the at least a portion of the user preference information from one or more devices associated with the user. For instance, the user preference information obtaining module 302* including the user associated device provided user preference information obtaining module 404 (see FIG. 4A) of the automated customized food generation machine 10*a* or 10*b* of FIG. 3A or 3B (or of the network device 12*a* or 12*b* of FIG. 3D or 3E) acquiring the at least a portion of the user preference information from the user 13 by having the user associated device provided user preference information obtaining module 404 acquire or obtain the at least a portion of the user preference information from one or more devices 15 (e.g., mobile computing devices such as Smartphones, tablet computer, and so forth) associated with the user 13.

In some cases, operation 604 may include an operation 605 for acquiring the at least a portion of the user preference information from the one or more devices associated with the user by acquiring the at least a portion of the user preference information from one or more of a credit card, a smart card, and/or a computing device associated with the user. For instance, the user associated device provided user preference information obtaining module 404 (see FIG. 4A) of the automated customized food generation machine 10*a* or 10*b* of FIG. 3A or 3B (or of the network device 12*a* or 12*b* of FIG. 3D or 3E) acquiring the at least a portion of the user preference information from the one or more devices 15 associated with the user 13 by acquiring or obtaining the at least a portion of the user preference information from one or more of a credit card, a smart card, and/or a computing device (e.g., mobile device, desktop or laptop computer, etc.) associated with the user 13.

In some implementations, the user preference information acquiring operation 502 may actually include an operation 606 for acquiring the user preference information of the user by retrieving at least a portion of the user preference information from a memory based, at least in part, on one or more user identifications provided by the user. For instance, the user preference information obtaining module 302* including the memory user preference information obtaining module 406 (see FIG. 4A) of the automated customized food generation machine 10*a* or 10*b* of FIG. 3A or 3B (or of the network device 12*a* or 12*b* of FIG. 3D or 3E) acquiring the user preference information of the user 13 by having the memory user preference information obtaining module 406 retrieve or obtain at least a portion of the user preference information from a memory 340 based, at least in part, on one or more user identifications (e.g., username, password, credit card number, and so forth) directly or indirectly provided by the user 13. For example, the user 13 may directly input user identification information via a user interface 360 of an automated customized food generation machine 10* or via a computing device 15, which may already have such user identification information stored in memory 340. Based on the obtained user identification information, user preference information may be retrieved.

In various implementations, the user preference information acquiring operation 502 may actually include an operation 607 for acquiring the user preference information of the user by retrieving at least a portion of the user preference information from the internet based, at least in part, on one or more user identifications provided by the user. For instance, the user preference information obtaining module 302* including the internet user preference information obtaining module 408 (see FIG. 4A) of the automated customized food generation machine 10*a* or 10*b* of FIG. 3A or 3B (or of the network device 12*a* or 12*b* of FIG. 3D or 3E) acquiring the user preference information of the user 13 by having the internet user preference information obtaining module 408 retrieve or obtain at least a portion of the user preference information from the internet based, at least in part, on one or more user identifications (e.g., username, email address, password, and so forth) provided by the user 13.

In some cases, operation 607 may further include an operation 608 for retrieving at least the portion of the user preference information from one or more social networking websites based, at least in part, on one or more user identifications provided by the user. For instance, the internet user preference information obtaining module 408 of the automated customized food generation machine 10*a* or 10*b* of FIG. 3A or 3B (or of the network device 12*a* or 12*b* of FIG. 3D or 3E) retrieving or obtaining at least the portion of the user preference information from one or more social networking websites (e.g., Facebook, Twitter, and so forth) based, at least in part, on one or more user identifications directly or indirectly provided by the user 13.

Figure 6B:
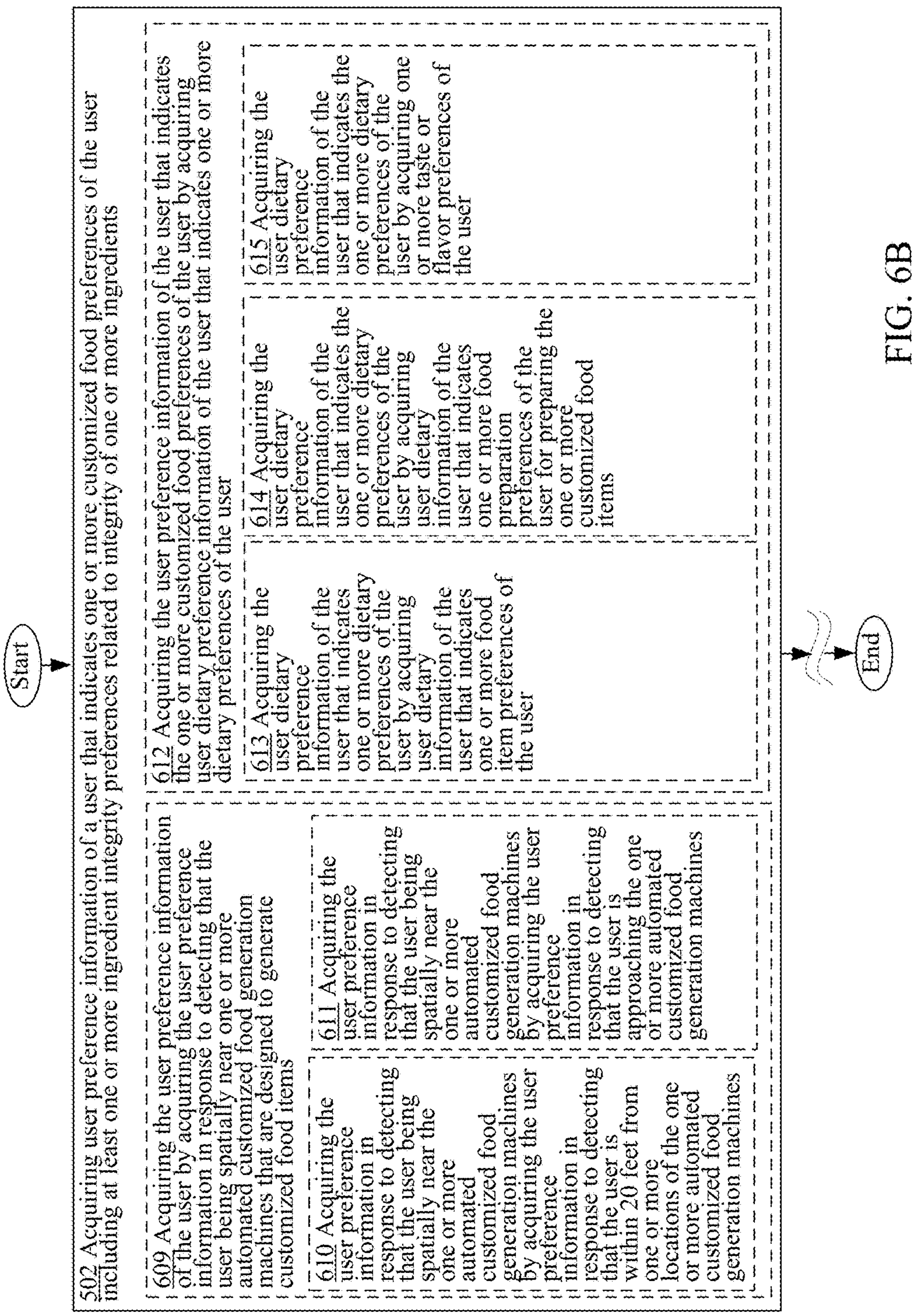
FIG. 6B is a high-level logic flowchart of a process depicting alternate implementations of the user preference information acquiring operation 502 of FIG. 5.

Referring now to FIG. 6B, in various implementations, the user preference information acquiring operation 502 may include an operation 609 for acquiring the user preference information of the user by acquiring the user preference information in response to detecting that the user being spatially near one or more automated customized food generation machines that are designed to generate customized food items. For instance, the user preference information obtaining module 302* including the user proximity detecting module 410 (see FIG. 4A) of the automated customized food generation machine 10*a* or 10*b* of FIG. 3A or 3B (or of the network device 12*a* or 12*b* of FIG. 3D or 3E) acquiring the user preference information of the user 13 by automatically acquiring the user preference information in response to, for example, the user proximity detecting module 410 detecting that the user 13 being spatially near one or more automated customized food generation machines 10* that are designed to generate customized food items 22. In some cases, the user 13 may be detected as being near the one or more customized food generation machines 10* based on locational data (e.g., GPS provided data) provided by the computing device 15 (e.g., Smartphone or tablet computer) of the user 13.

As further illustrated in FIG. 6B, operation 609 may further include an operation 610 for acquiring the user preference information in response to detecting that the user being spatially near the one or more automated customized food generation machines by acquiring the user preference information in response to detecting that the user is within 20 feet from one or more locations of the one or more automated customized food generation machines. For instance, the user preference information obtaining module 302* including the user proximity detecting module 410 of the automated customized food generation machine 10*a* or 10*b* of FIG. 3A or 3B (or of the network device 12*a* or 12*b* of FIG. 3D or 3E) acquiring the user preference information in response to detecting that the user 13 being spatially near the one or more automated customized food generation machines 10* by acquiring the user preference information in response to, for example, the user proximity detecting module 410 detecting that the user 13 is within 20 feet from one or more locations of the one or more automated customized food generation machines 10*.

In some implementations, operation 609 may include an operation 611 for acquiring the user preference information in response to detecting that the user being spatially near the one or more automated customized food generation machines by acquiring the user preference information in response to detecting that the user is approaching the one or more automated customized food generation machines. For instance, the user preference information obtaining module 302* including the user proximity detecting module 410 of the automated customized food generation machine 10*a* or 10*b* of FIG. 3A or 3B (or of the network device 12*a* or 12*b* of FIG. 3D or 3E) acquiring the user preference information in response to detecting that the user 13 being spatially near the one or more automated customized food generation machines 10* by acquiring the user preference information in response to, for example, the user proximity detecting module 410 detecting that the user 13 is approaching or nearing the one or more automated customized food generation machines 10*.

In various implementations, the user preference information acquired through the user preference information acquiring operation 502 may include a variety of user information. For example, in some cases, the user preference information acquiring operation 502 may include an operation 612 for acquiring the user preference information of the user that indicates the one or more customized food preferences of the user by acquiring user dietary preference information of the user that indicates one or more dietary preferences of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 that indicates the one or more customized food preferences of the user 13 by acquiring or obtaining user dietary preference information of the user 13 that indicates one or more dietary preferences (e.g., beef rather than chicken, spicy, low-fat milk, and so forth) of the user 13.

As further illustrated in FIG. 6B, in some implementations, operation 612 may actually include an operation 613 for acquiring the user dietary preference information of the user that indicates one or more dietary preferences of the user by acquiring user dietary information of the user that indicates one or more food item preferences of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user dietary preference information of the user 13 that indicates one or more dietary preferences of the user 13 by acquiring or obtaining user dietary information of the user 13 that indicates one or more food item preferences (e.g., a user selection for a particular food item such as a hamburger, a peanut-chocolate chip energy bar, a chocolate shake, and so forth) of the user 13.

In the same or alternative implementations, operation 612 may additionally or alternatively include an operation 614 for acquiring the user dietary preference information of the user that indicates the one or more dietary preferences of the user by acquiring user dietary information of the user that indicates one or more food preparation preferences of the user for preparing the one or more customized food items. For instance, the user preference information obtaining module 302* of the automated customized food generation machine 10*a* or 10*b* of FIG. 3A or 3B (or of the network device 12*a* or 12*b* of FIG. 3D or 3E) acquiring the user dietary preference information of the user 13 that indicates the one or more dietary preferences of the user 13 by acquiring or obtaining user dietary information of the user 13 that indicates one or more food preparation (e.g., heating or cooling) preferences of the user 13 for preparing the one or more customized food items 22.

In the same or alternative implementations, operation 612 may additionally or alternatively include an operation 615 for acquiring the user dietary preference information of the user that indicates the one or more dietary preferences of the user by acquiring one or more taste or flavor preferences of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user dietary preference information of the user 13 that indicates the one or more dietary preferences of the user 13 by acquiring or obtaining one or more taste or flavor preferences (e.g., spicy preferences, sweetness preferences, tartness preferences, and so forth) of the user 13.

Figure 6C:
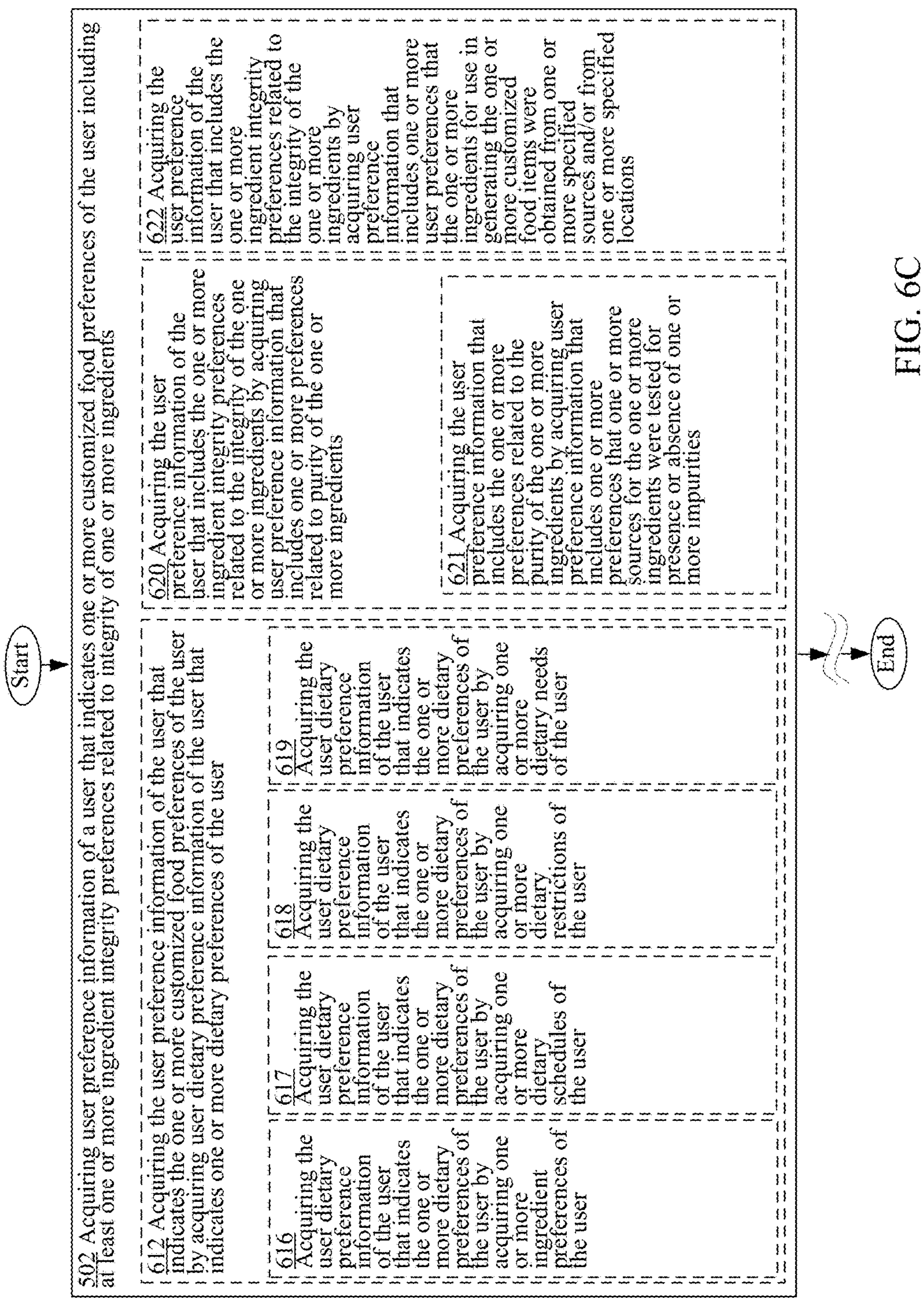
FIG. 6C is a high-level logic flowchart of a process depicting alternate implementations of the user preference information acquiring operation 502 of FIG. 5.

In the same or alternative implementations, operation 612 may additionally or alternatively include an operation 616 for acquiring the user dietary preference information of the user that indicates the one or more dietary preferences of the user by acquiring one or more ingredient preferences of the user as illustrated in FIG. 6C. For instance, the user preference information obtaining module 302* of the automated customized food generation machine 10*a* or 10*b* of FIG. 3A or 3B (or of the network device 12*a* or 12*b* of FIG. 3D or 3E) acquiring the user dietary preference information of the user 13 that indicates the one or more dietary preferences of the user 13 by acquiring or obtaining one or more ingredient preferences (e.g., preference that beef ingredient to be used be from a source that has been tested to be free of prions or from other impurities, preference that chicken ingredient to be used be from Tyson farms, preference for whole milk ingredients, and so forth) of the user 13.

In the same or alternative implementations, operation 612 may additionally or alternatively include an operation 617 for acquiring the user dietary preference information of the user that indicates the one or more dietary preferences of the user by acquiring one or more dietary schedules of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user dietary preference information of the user 13 that indicates the one or more dietary preferences of the user 13 by acquiring or obtaining one or more dietary schedules (e.g., diet plans) of the user 13. In some cases, the obtained dietary schedule or schedules may indicate the food preference and the customization preference of the user 13.

In the same or alternative implementations, operation 612 may additionally or alternatively include an operation 618 for acquiring the user dietary preference information of the user that indicates the one or more dietary preferences of the user by acquiring one or more dietary restrictions of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user dietary preference information of the user 13 that indicates the one or more dietary preferences of the user 13 by acquiring or obtaining one or more dietary restrictions (e.g., no peanuts, no dairy products, no pork, and so forth) of the user 13.

In the same or alternative implementations, operation 612 may additionally or alternatively include an operation 619 for acquiring the user dietary preference information of the user that indicates the one or more dietary preferences of the user by acquiring one or more dietary needs of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user dietary preference information of the user 13 that indicates the one or more dietary preferences of the user 13 by acquiring or obtaining one or more dietary needs (e.g., need for high iron ingredients, need for vitamin enriched ingredients, and so forth) of the user 13.

In various implementations, the user preference information acquiring operation 502 may include an operation 620 for acquiring the user preference information of the user that includes the one or more ingredient integrity preferences related to the integrity of the one or more ingredients by acquiring user preference information that includes one or more preferences related to purity of the one or more ingredients. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 that includes the one or more ingredient integrity preferences related to the integrity of the one or more ingredients by acquiring or obtaining user preference information that includes one or more preferences related to purity (e.g., free of impurities) of the one or more ingredients.

As further illustrated in FIG. 6C, in some cases, operation 620 may further include an operation 621 for acquiring the user preference information that includes the one or more preferences related to the purity of the one or more ingredients by acquiring user preference information that includes one or more preferences that one or more sources for the one or more ingredients were tested for presence or absence of one or more impurities. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information that includes the one or more preferences related to the purity of the one or more ingredients by acquiring or obtaining user preference information that includes one or more preferences that one or more sources (e.g., farms, cattle herds, domesticated animals, harvest crops, and so forth) for the one or more ingredients (e.g., meat ingredients, dairy products, vegetable ingredients, and so forth) were tested for presence or absence of one or more impurities (e.g., viral or bacterial agents including, for example, prions, pesticides, antibiotics, heavy metals, and so forth).

In the same or alternative implementations, the user preference information acquiring operation 502 may additionally or alternatively include an operation 622 for acquiring the user preference information of the user that includes the one or more ingredient integrity preferences related to the integrity of the one or more ingredients by acquiring user preference information that includes one or more user preferences that the one or more ingredients for use in generating the one or more customized food items were obtained from one or more specified sources and/or from one or more specified locations. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 that includes the one or more ingredient integrity preferences related to the integrity of the one or more ingredients by acquiring or obtaining user preference information that includes one or more user preferences that the one or more ingredients for use in generating the one or more customized food items were obtained from one or more specified sources (e.g., Oscar Meyer, Jolly Green Giant, Dole, and so forth) and/or from one or more specified locations (e.g., Kobe-Japan, Florida, and so forth).

Figure 6D:
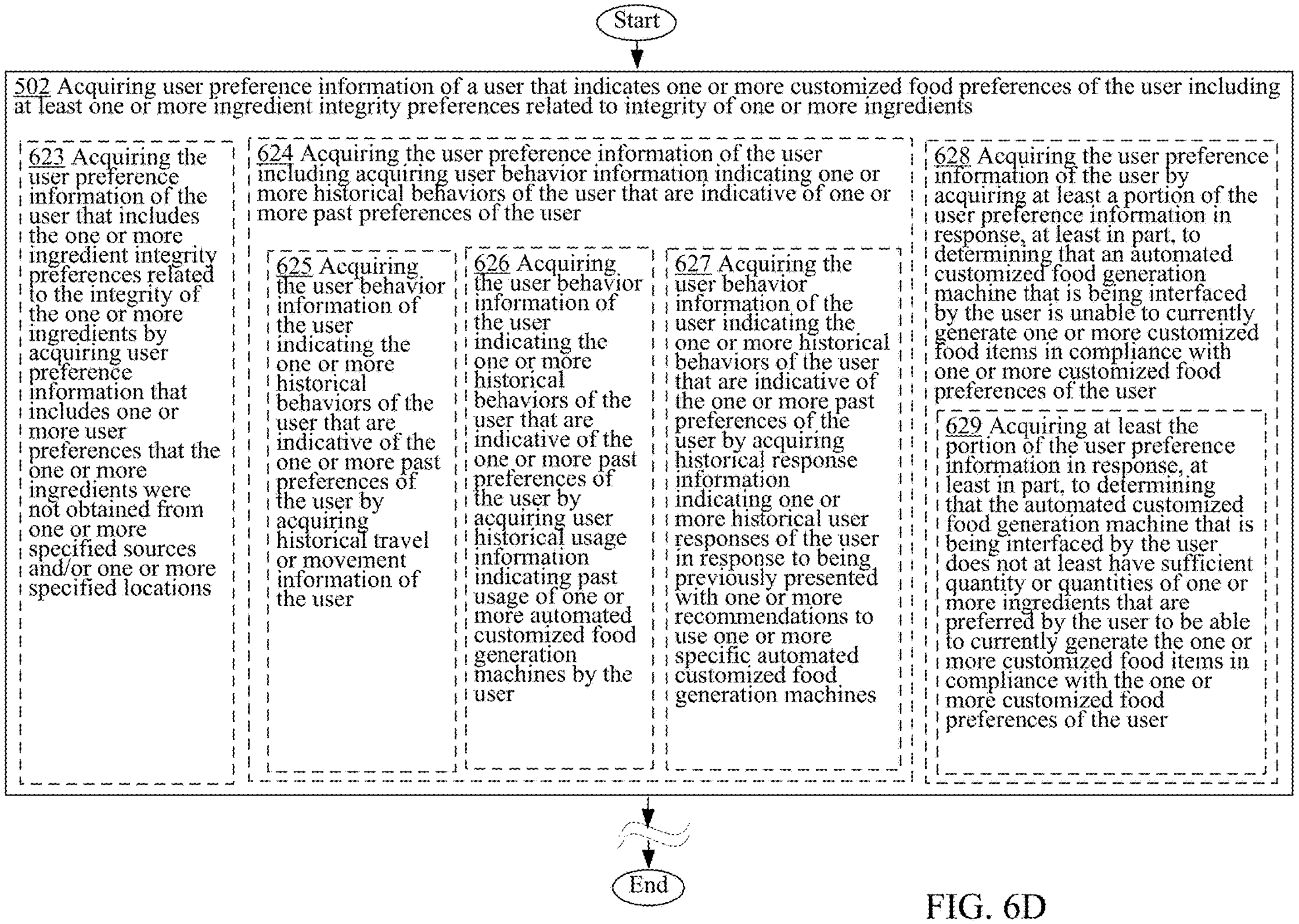
FIG. 6D is a high-level logic flowchart of a process depicting alternate implementations of the user preference information acquiring operation 502 of FIG. 5.

In the same or alternative implementations, the user preference information acquiring operation 502 may additionally or alternatively include an operation 623 for acquiring the user preference information of the user that includes the one or more ingredient integrity preferences related to the integrity of the one or more ingredients by acquiring user preference information that includes one or more user preferences that the one or more ingredients were not obtained from one or more specified sources and/or one or more specified locations as illustrated in FIG. 6D. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 that includes the one or more ingredient integrity preferences related to the integrity of the one or more ingredients by acquiring or obtaining user preference information that includes one or more user preferences that the one or more ingredients were not obtained from one or more specified sources (e.g., Tyson's chicken, Kirkland brand, Del Monte, and so forth) and/or one or more specified locations (e.g., Britain, Mexico, and so forth).

In the same or alternative implementations, the user preference information acquiring operation 502 may additionally or alternatively include an operation 624 for acquiring the user preference information of the user including acquiring user behavior information indicating one or more historical behaviors of the user that are indicative of one or more past preferences of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user preference information of the user 13 including acquiring or obtaining user behavior information indicating one or more historical behaviors (e.g., past purchasing information related to customized food items, past usage information of automated customized food generation machines, and so forth) of the user 13 that are indicative of one or more past preferences of the user 13.

In some implementations, operation 624 may actually include an operation 625 for acquiring the user behavior information of the user indicating the one or more historical behaviors of the user that are indicative of the one or more past preferences of the user by acquiring historical travel or movement information of the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user behavior information of the user 13 indicating the one or more historical behaviors of the user 13 that are indicative of the one or more past preferences of the user 13 by acquiring or obtaining historical travel or movement information of the user 13. In some cases, the acquisition of such information may be helpful in determining which automated customized food generation machines will the user 13 prefer to use or will be willing to use.

In the same or alternative implementations, operation 624 may additionally or alternatively include an operation 626 for acquiring the user behavior information of the user indicating the one or more historical behaviors of the user that are indicative of the one or more past preferences of the user by acquiring user historical usage information indicating past usage of one or more automated customized food generation machines by the user. For instance, the user preference information obtaining module 302* of the automated customized food generation machine 10*a* or 10*b* of FIG. 3A or 3B (or of the network device 12*a* or 12*b* of FIG. 3D or 3E) acquiring the user behavior information of the user 13 indicating the one or more historical behaviors of the user 13 that are indicative of the one or more past preferences of the user 13 by acquiring or obtaining user historical usage information indicating past usage of one or more automated customized food generation machines 10* by the user 13. In some cases, obtaining such information may be helpful in predicting which automated customized food generation machine machines 10* will the user 13 likely employ if directed to such machines.

In the same or alternative implementations, operation 624 may additionally or alternatively include an operation 627 for acquiring the user behavior information of the user indicating the one or more historical behaviors of the user that are indicative of the one or more past preferences of the user by acquiring historical response information indicating one or more historical user responses of the user in response to being previously presented with one or more recommendations to use one or more specific automated customized food generation machines. For instance, the user preference information obtaining module 302* of the automated customized food generation machine 10*a* or 10*b* of FIG. 3A or 3B (or of the network device 12*a* or 12*b* of FIG. 3D or 3E) acquiring the user behavior information of the user 13 indicating the one or more historical behaviors of the user 13 that are indicative of the one or more past preferences of the user 13 by acquiring or obtaining historical response information indicating one or more historical user responses of the user 13 in response to being previously presented with one or more recommendations to use one or more specific automated customized food generation machines 10*. For example, if a user 13 has previously been directed to use a particular automated customized food generation machine 10* but chose not to use the particular automated customized food generation machine 10*, then such past behavior may indicate that the user 13 prefer not to use the particular automated customized food generation machine 10*

In various implementations, the acquisition of at least a portion of the user preference information may be in response to a number of factors. For example, in some cases, the user preference information acquiring operation 502 may include an operation 628 for acquiring the user preference information of the user by acquiring at least a portion of the user preference information in response, at least in part, to determining that an automated customized food generation machine that is being interfaced by the user is unable to currently generate one or more customized food items in compliance with one or more customized food preferences of the user. For instance, the user preference information obtaining module 302* including the user interfaced automated customized food generation machine unsatisfactory determining module 412 (see FIG. 4A) of the automated customized food generation machine 10*a* or 10*b* of FIG. 3A or 3B (or of the network device 12*a* or 12*b* of FIG. 3D or 3E) acquiring the user preference information of the user 13 by acquiring or obtaining at least a portion of the user preference information in response, at least in part, to the user interfaced automated customized food generation machine unsatisfactory determining module 412, for example, determining that an automated customized food generation machine 10' (see, for example, FIG. 1B or 1D) that is being interfaced by the user 13 is unable to currently generate one or more customized food items 22 in full or total compliance with one or more customized food preferences of the user 13.

In some cases, operation 628 may further include an operation 629 for acquiring at least the portion of the user preference information in response, at least in part, to determining that the automated customized food generation machine that is being interfaced by the user does not at least have sufficient quantity or quantities of one or more ingredients that are preferred by the user to be able to currently generate the one or more customized food items in compliance with the one or more customized food preferences of the user. For instance, the user preference information obtaining module 302* including the deficient ingredient supply determining module 414 (see FIG. 4A) of the automated customized food generation machine 10*a* or 10*b* of FIG. 3A or 3B (or of the network device 12*a* or 12*b* of FIG. 3D or 3E) acquiring at least the portion of the user preference information in response, at least in part, to the deficient ingredient supply determining module 414, for example, determining that the automated customized food generation machine 10' (see, for example, FIG. 1B or 1D) that is being interfaced by the user 13 does not at least have sufficient quantity or quantities of one or more ingredients that are preferred by the user 13 to be able to currently generate the one or more customized food items 22 in full or total compliance with the one or more customized food preferences of the user 13.

Figure 7A:
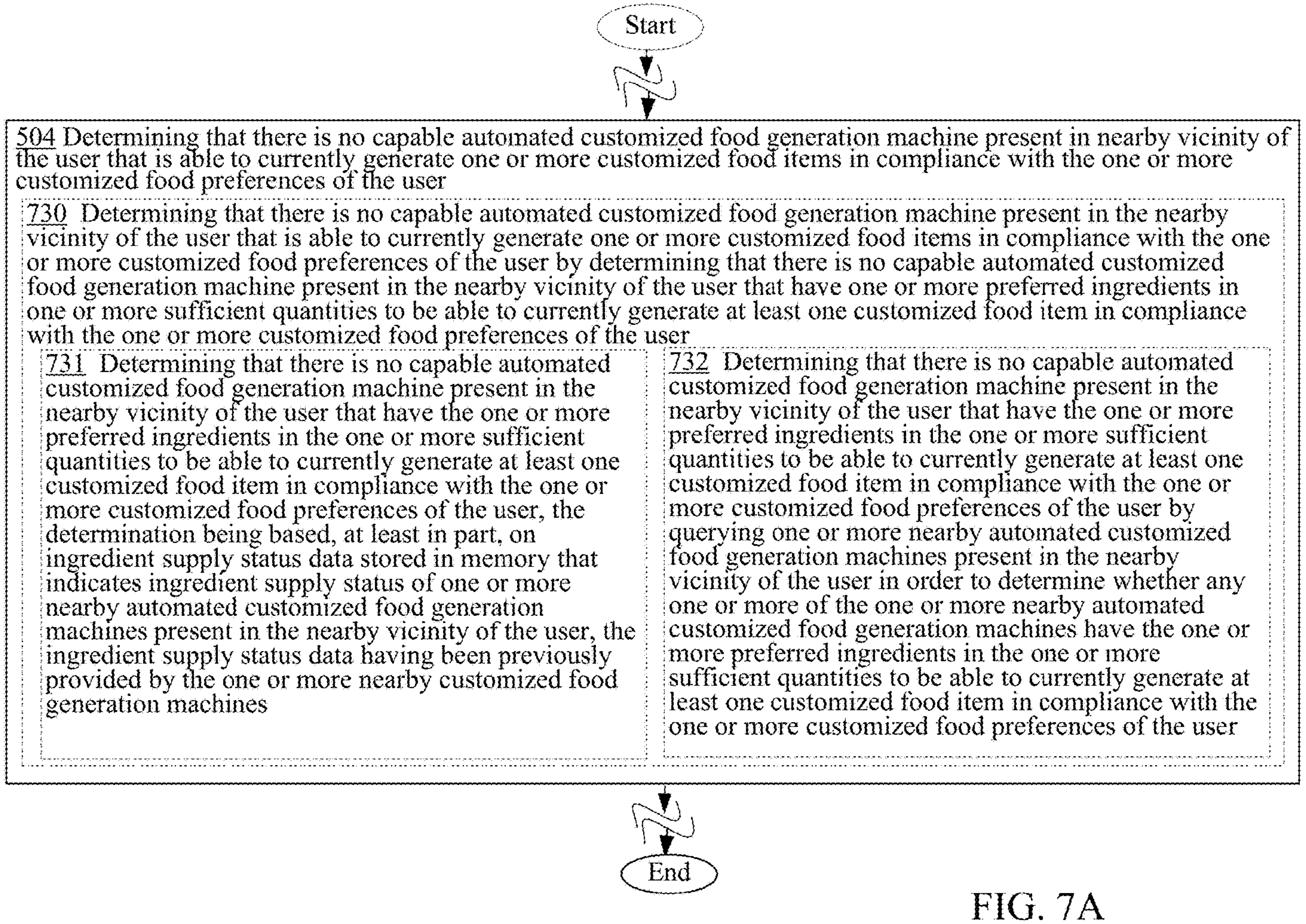
FIG. 7A is a high-level logic flowchart of a process depicting alternate implementations of the capable automated customized food generation machine presence determining operation 504 of FIG. 5.

Referring back to the capable automated customized food generation machine presence determining operation 504 of FIG. 5, the capable automated customized food generation machine presence determining operation 504 similar to the user preference information acquiring operation 502 of FIG. 5 may be executed in a number of different ways in various alternative embodiments as illustrated, for example, in FIGS. 7A, 7B, 7C, and 7D. In some cases, for example, the capable automated customized food generation machine presence determining operation 504 may actually include or involve an operation 730 for determining that there is no capable automated customized food generation machine present in the nearby vicinity of the user that is able to currently generate one or more customized food items in compliance with the one or more customized food preferences of the user by determining that there is no capable automated customized food generation machine present in the nearby vicinity of the user that have one or more preferred ingredients in one or more sufficient quantities to be able to currently generate at least one customized food item in compliance with the one or more customized food preferences of the user as illustrated in FIG. 7A. For instance, the capable automated customized food generation machine presence determining module 304* of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customized food preferences of the user 13 by determining that there is no capable automated customized food generation machine (e.g., no "capable" automated customized food generation machine 10"" of, for example, FIGS. 1B, 1C, 1D, and 1E) present in the nearby vicinity of the user 13 that have one or more preferred ingredients in one or more sufficient quantities to be able to currently (e.g., at the time of the determination) generate at least one customized food item 22 in compliance with the one or more customized food preferences of the user 13.

As further illustrated in FIG. 7A, operation 730 may further include an operation 731 for determining that there is no capable automated customized food generation machine present in the nearby vicinity of the user that have the one or more preferred ingredients in the one or more sufficient quantities to be able to currently generate at least one customized food item in compliance with the one or more customized food preferences of the user, the determination being based, at least in part, on ingredient supply status data stored in memory that indicates ingredient supply status of one or more nearby automated customized food generation machines present in the nearby vicinity of the user, the ingredient supply status data having been previously provided by the one or more nearby customized food generation machines. For instance, the capable automated customized food generation machine presence determining module 304* of the automated customized food generation machine 10*a* or 10*b* of FIG. 3A or 3B (or of the network device 12*a* or 12*b* of FIG. 3D or 3E) determining that there is no capable automated customized food generation machine (e.g., no "capable" automated customized food generation machine 10"" of, for example, FIGS. 1B, 1C, 1D, and 1E) present in the nearby vicinity of the user 13 that have the one or more preferred ingredients in the one or more sufficient quantities to be able to currently generate at least one customized food item 22 in compliance with the one or more customized food preferences of the user 13, the determination being based, at least in part, on ingredient supply status data stored in memory 340 (see FIG. 3A, 3B, 3C, 3D, or 3E) that indicates ingredient supply status of one or more nearby automated customized food generation machines 10* present in the nearby vicinity of the user 13, the ingredient supply status data having been previously provided by the one or more nearby customized food generation machines 10*.

In the same or alternative implementations, operation 730 may additionally or alternative include an operation 732 for determining that there is no capable automated customized food generation machine present in the nearby vicinity of the user that have the one or more preferred ingredients in the one or more sufficient quantities to be able to currently generate at least one customized food item in compliance with the one or more customized food preferences of the user by querying one or more nearby automated customized food generation machines present in the nearby vicinity of the user in order to determine whether any one or more of the one or more nearby automated customized food generation machines have the one or more preferred ingredients in the one or more sufficient quantities to be able to currently generate at least one customized food item in compliance with the one or more customized food preferences of the user. For instance, the capable automated customized food generation machine presence determining module 304* including the automated customized food generation machine querying module 416 (see FIG. 4B) of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that have the one or more preferred ingredients in the one or more sufficient quantities to be able to currently generate at least one customized food item 22 in full or total compliance with the one or more customized food preferences of the user 13 by having the automated customized food generation machine querying module 416, for example, querying one or more nearby automated customized food generation machines 10* present in the nearby vicinity of the user 13 in order to determine whether any one or more of the one or more nearby automated customized food generation machines 10* have the one or more preferred ingredients in the one or more sufficient quantities to be able to currently generate at least one customized food item 22 in full or complete compliance with the one or more customized food preferences of the user 13.

Figure 7B:
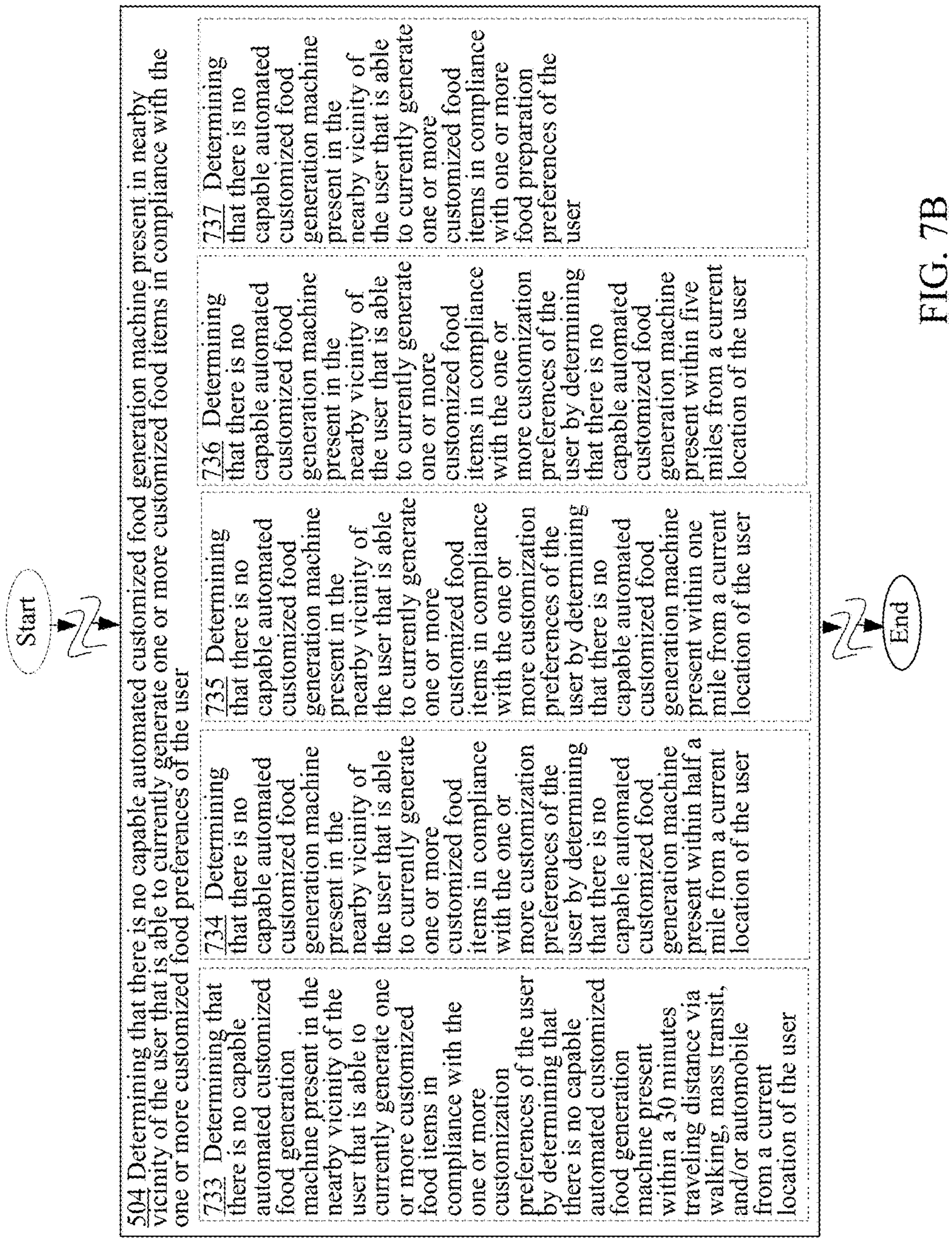
FIG. 7B is a high-level logic flowchart of a process depicting alternate implementations of the capable automated customized food generation machine presence determining operation 504 of FIG. 5.

Turning now to FIG. 7B, in various implementations, the capable automated customized food generation machine presence determining operation 504 may include an operation 733 for determining that there is no capable automated customized food generation machine present in the nearby vicinity of the user that is able to currently generate one or more customized food items in compliance with the one or more customization preferences of the user by determining that there is no capable automated customized food generation machine present within a 30 minutes traveling distance via walking, mass transit, and/or automobile from a current location of the user. For instance, the capable automated customized food generation machine presence determining module 304* of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customization preferences of the user 13 by determining that there is no capable automated customized food generation machine (e.g., no "capable" automated customized food generation machine 10"' of, for example, FIGS. 1B, 1C, 1D, and 1E) present within a 30 minutes traveling distance via walking, mass transit, and/or automobile from a current location of the user 13 (e.g., within a distance that may be traveled by the user 13 by walking, mass transit (e.g., buses or commuter trains) and/or automobile.

In some implementations, the + capable automated customized food generation machine presence determining operation 504 may include an operation 734 for determining that there is no capable automated customized food generation machine present in the nearby vicinity of the user that is able to currently generate one or more customized food items in compliance with the one or more customization preferences of the user by determining that there is no capable automated customized food generation machine present within half a mile from a current location of the user. For instance, the capable automated customized food generation machine presence determining module 304* of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customization preferences of the user 13 by determining that there is no capable automated customized food generation machine (e.g., no "capable" automated customized food generation machine 10"" of, for example, FIGS. 1B, 1C, 1D, and 1E) present within half a mile from a current location (e.g., user location at the time of the determination) of the user 13.

In some alternative implementations, the capable automated customized food generation machine presence determining operation 504 may include an operation 735 for determining that there is no capable automated customized food generation machine present in the nearby vicinity of the user that is able to currently generate one or more customized food items in compliance with the one or more customization preferences of the user by determining that there is no capable automated customized food generation machine present within one mile from a current location of the user. For instance, the capable automated customized food generation machine presence determining module 304* of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customization preferences of the user 13 by determining that there is no capable automated customized food generation machine (e.g., no "capable" automated customized food generation machine 10"" of, for example, FIGS. 1B, 1C, 1D, and 1E) present within one mile from a current location of the user 13.

In still other implementations, the capable automated customized food generation machine presence determining operation 504 may include an operation 736 for determining that there is no capable automated customized food generation machine present in the nearby vicinity of the user that is able to currently generate one or more customized food items in compliance with the one or more customization preferences of the user by determining that there is no capable automated customized food generation machine present within five miles from a current location of the user. For instance, the capable automated customized food generation machine presence determining module 304* of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customization preferences of the user 13 by determining that there is no capable automated customized food generation machine (e.g., there is no "capable" automated customized food generation machine 10"" of, for example, FIGS. 1B, 1C, 1D, and 1E) present within five miles from a current location of the user 13.

In some implementations, the capable automated customized food generation machine presence determining operation 504 may include an operation 737 for determining that there is no capable automated customized food generation machine present in the nearby vicinity of the user that is able to currently generate one or more customized food items in compliance with one or more food preparation preferences of the user. For instance, the preparation preference capable automated customized food generation machine presence determining module 418 (see FIG. 4B) of the automated customized food generation machine 10*a* or 10*b* of FIG. 3A or 3B (or of the network device 12*a* or 12*b* of FIG. 3D or 3E) determining that there is no capable automated customized food generation machine (e.g., no "capable" automated customized food generation machine 10"" of, for example, FIGS. 1B, 1C, 1D, and 1E) present in the nearby vicinity of the user 13 that is able to currently generate one or more customized food items 22 in compliance with one or more food preparation (e.g., heating and/or cooling) preferences of the user 13.

Figure 7C:
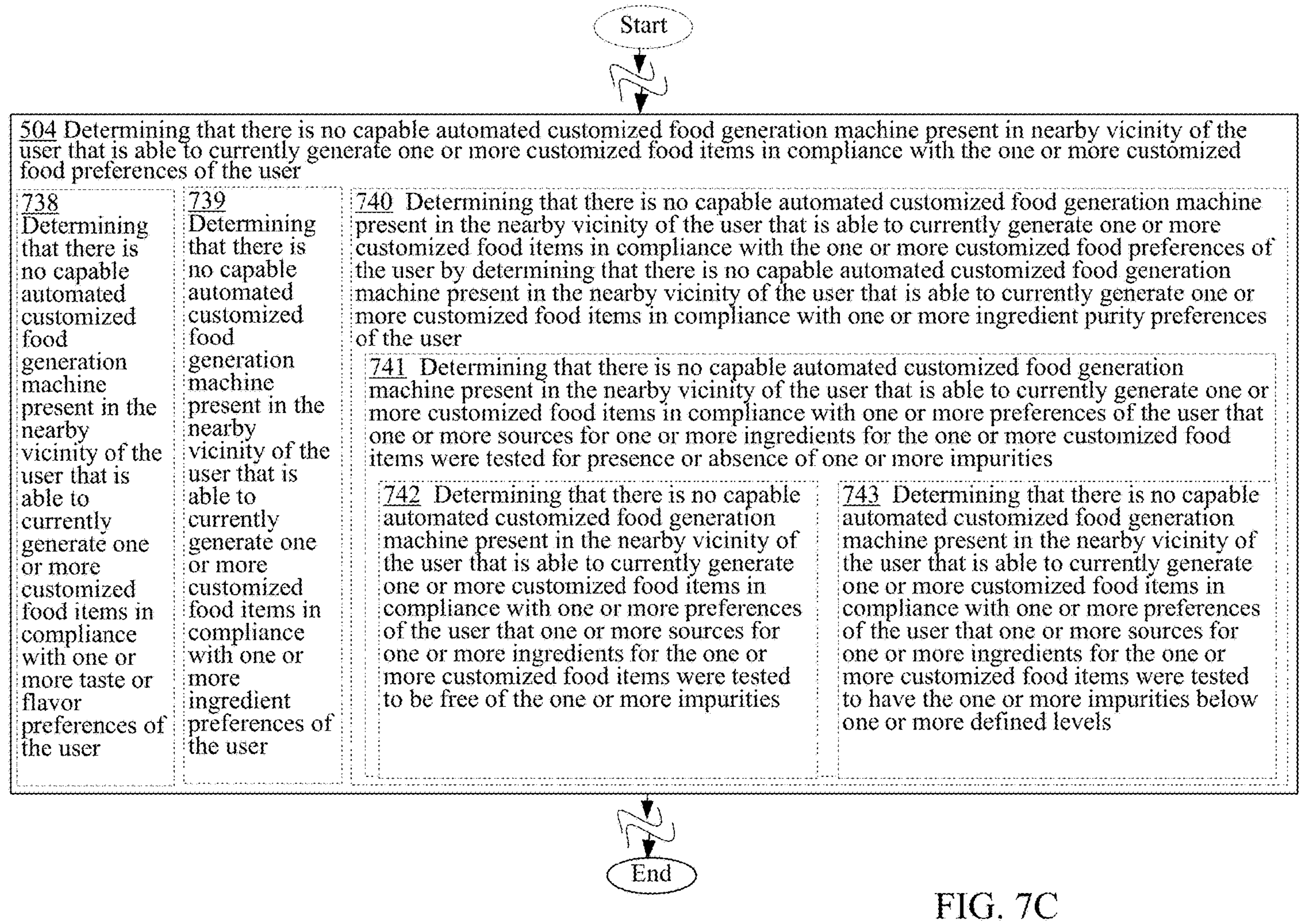
FIG. 7C is a high-level logic flowchart of a process depicting alternate implementations of the capable automated customized food generation machine presence determining operation 504 of FIG. 5.

Referring to FIG. 7C, in the same or alternative implementations, the capable automated customized food generation machine presence determining operation 504 may additionally or alternatively include an operation 738 for determining that there is no capable automated customized food generation machine present in the nearby vicinity of the user that is able to currently generate one or more customized food items in compliance with one or more taste or flavor preferences of the user. For instance, the taste/flavor preference capable automated customized food generation machine presence determining module 420 (see FIG. 4B) of the automated customized food generation machine 10*a* or 10*b* of FIG. 3A or 3B (or of the network device 12*a* or 12*b* of FIG. 3D or 3E) determining that there is no capable automated customized food generation machine (e.g., no "capable" automated customized food generation machine 10" of, for example, FIGS. 1B, 1C, 1D, and 1E) present in the nearby vicinity of the user 13 that is able to currently generate one or more customized food items 22 in compliance with one or more taste or flavor preferences (e.g., spicy preferences, sweetness preference, beef flavor preferences, and so forth) of the user 13.

In the same or alternative implementations, the capable automated customized food generation machine presence determining operation 504 may additionally or alternatively include an operation 739 for determining that there is no capable automated customized food generation machine present in the nearby vicinity of the user that is able to currently generate one or more customized food items in compliance with one or more ingredient preferences of the user. For instance, the ingredient preference capable automated customized food generation machine presence determining module 422 (see FIG. 4B) of the automated customized food generation machine 10*a* or 10*b* of FIG. 3A or 3B (or of the network device 12*a* or 12*b* of FIG. 3D or 3E) determining that there is no capable automated customized food generation machine (e.g., no "capable" automated customized food generation machine 10"" of, for example, FIGS. 1B, 1C, 1D, and 1E) present in the nearby vicinity of the user 13 that is able to currently generate one or more customized food items 22 in compliance with one or more ingredient preferences (e.g., preference for beef rather than chicken, preference for low fat milk, preference for aspartame as a sweetener, and so forth) of the user 13.

In the same or alternative implementations, the capable automated customized food generation machine presence determining operation 504 may additionally or alternatively include an operation 740 for determining that there is no capable automated customized food generation machine present in the nearby vicinity of the user that is able to currently generate one or more customized food items in compliance with the one or more customized food preferences of the user by determining that there is no capable automated customized food generation machine present in the nearby vicinity of the user that is able to currently generate one or more customized food items in compliance with one or more ingredient purity preferences of the user. For instance, the ingredient purity preference capable automated customized food generation machine presence determining module 424 (see FIG. 4B) of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customized food preferences of the user 13 by determining that there is no capable automated customized food generation machine (e.g., no "capable" automated customized food generation machine 10"" of, for example, FIGS. 1B, 1C, 1D, and 1E) present in the nearby vicinity of the user 13 that is able to currently generate one or more customized food items 22 in compliance with one or more ingredient purity preferences (e.g., preferences that sources for ingredients to be used were tested to be free of impurities such as bacteria or viruses) of the user 13.

As further illustrated in FIG. 7C, operation 740 may further include an operation 741 for determining that there is no capable automated customized food generation machine present in the nearby vicinity of the user that is able to currently generate one or more customized food items in compliance with one or more preferences of the user that one or more sources for one or more ingredients for the one or more customized food items were tested for presence or absence of one or more impurities in various implementations. For instance, the ingredient purity preference capable automated customized food generation machine presence determining module 424 of the automated customized food generation machine 10*a* or 10*b* of FIG. 3A or 3B (or of the network device 12*a* or 12*b* of FIG. 3D or 3E) determining that there is no capable automated customized food generation machine (e.g., no "capable" automated customized food generation machine 10"" of, for example, FIGS. 1B, 1C, 1D, and 1E) present in the nearby vicinity of the user 13 that is able to currently generate one or more customized food items 22 in compliance with one or more preferences of the user 13 that prefer that one or more sources (e.g., farm, cattle herd, harvest crop, and so forth) for one or more ingredients for the one or more customized food items 22 were tested for presence or absence of one or more impurities (e.g., prions, bacterial agents, viral agents, heavy metals, pesticides, and so forth).

In some cases, operation 741 may, in turn, further include an operation 742 for determining that there is no capable automated customized food generation machine present in the nearby vicinity of the user that is able to currently generate one or more customized food items in compliance with one or more preferences of the user that one or more sources for one or more ingredients for the one or more customized food items were tested to be free of the one or more impurities. For instance, the ingredient purity preference capable automated customized food generation machine presence determining module 424 of the automated customized food generation machine 10*a* or 10*b* of FIG. 3A or 3B (or of the network device 12*a* or 12*b* of FIG. 3D or 3E) determining that there is no capable automated customized food generation machine (e.g., no "capable" automated customized food generation machine 10"" of, for example, FIGS. 1B, 1C, 1D, and 1E) present in the nearby vicinity of the user 13 that is able to currently generate one or more customized food items 22 in compliance with one or more preferences of the user 13 that prefer that one or more sources (e.g., cattle, harvest crop, and so forth) for one or more ingredients for the one or more customized food items 22 were tested to be free of the one or more impurities (e.g., prions, heavy metals, pesticides, and so forth).

In some cases, operation 741 may include an operation 743 for determining that there is no capable automated customized food generation machine present in the nearby vicinity of the user that is able to currently generate one or more customized food items in compliance with one or more preferences of the user that one or more sources for one or more ingredients for the one or more customized food items were tested to have the one or more impurities below one or more defined levels. For instance, the ingredient purity preference capable automated customized food generation machine presence determining module 424 of the automated customized food generation machine 10*a* or 10*b* of FIG. 3A or 3B (or of the network device 12*a* or 12*b* of FIG. 3D or 3E) determining that there is no capable automated customized food generation machine (e.g., no "capable" automated customized food generation machine 10"" of, for example, FIGS. 1B, 1C, 1D, and 1E) present in the nearby vicinity of the user 13 that is able to currently generate one or more customized food items 22 in compliance with one or more preferences of the user 13 that one or more sources (e.g., cattle herd) for one or more ingredients (e.g., beef) for the one or more customized food items 22 were tested to have the one or more impurities (e.g., antibiotics) below one or more defined levels.

Figure 7D:
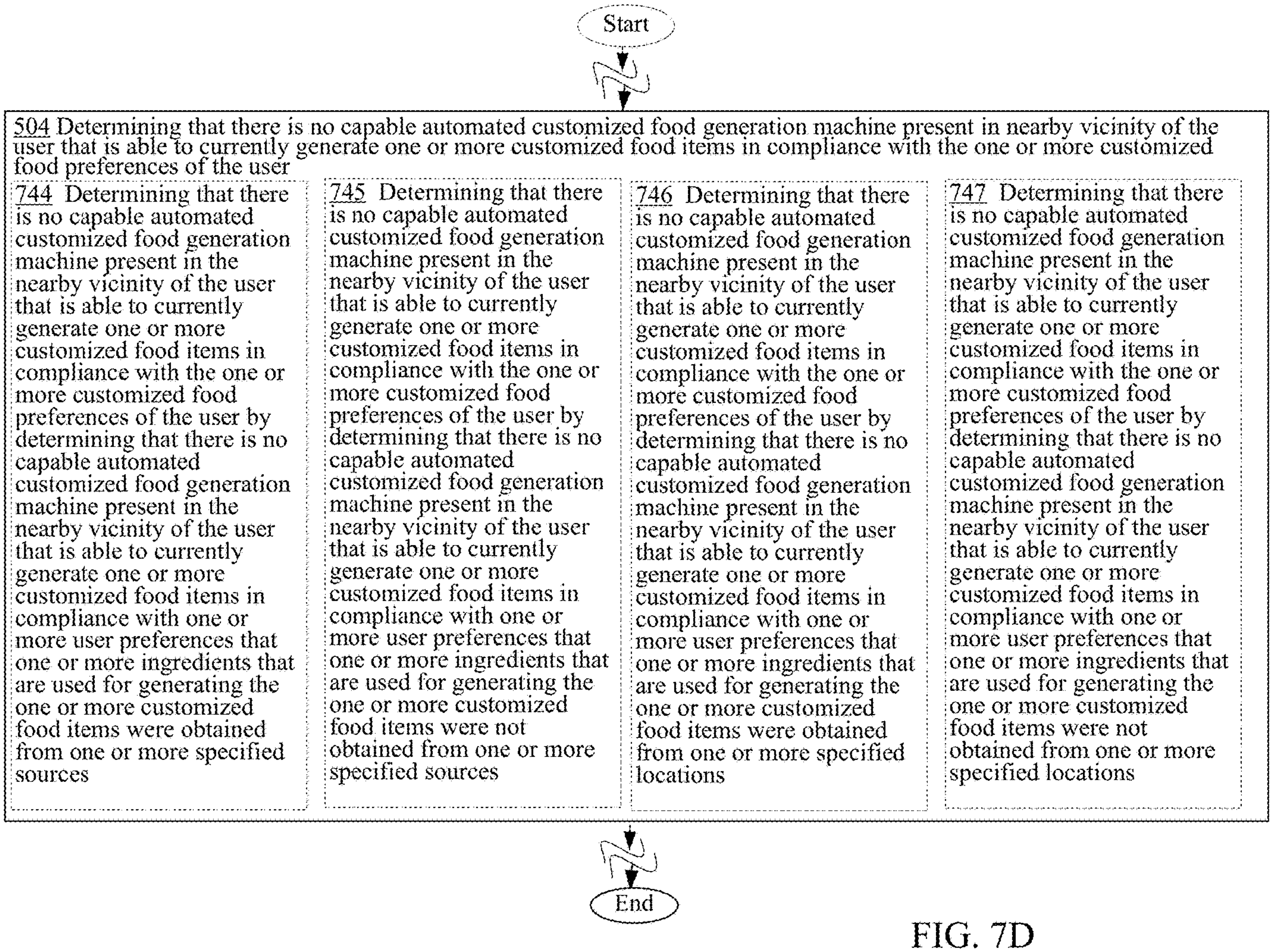
FIG. 7D is a high-level logic flowchart of a process depicting alternate implementations of the capable automated customized food generation machine presence determining operation 504 of FIG. 5.

Turning now to FIG. 7D, in various implementations, the capable automated customized food generation machine presence determining operation 504 may include an operation 744 for determining that there is no capable automated customized food generation machine present in the nearby vicinity of the user that is able to currently generate one or more customized food items in compliance with the one or more customized food preferences of the user by determining that there is no capable automated customized food generation machine present in the nearby vicinity of the user that is able to currently generate one or more customized food items in compliance with one or more user preferences that one or more ingredients that are used for generating the one or more customized food items were obtained from one or more specified sources. For instance, the capable automated customized food generation machine presence determining module 304* including the ingredient source preference capable automated customized food generation machine presence determining module 426 (see FIG. 4B) of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customized food preferences of the user 13 by having, for example, the ingredient source preference capable automated customized food generation machine presence determining module 426 determine that there is no capable automated customized food generation machine (e.g., no "capable" automated customized food generation machine 10"" of, for example, FIGS. 1B, 1C, 1D, and 1E) present in the nearby vicinity of the user 13 that is able to currently generate one or more customized food items 22 in full compliance with one or more user preferences that one or more ingredients (e.g., sausage) that are used for generating the one or more customized food items 22 were obtained from one or more specified sources (e.g., Oscar Meyer).

In some implementations, the capable automated customized food generation machine presence determining operation 504 may include an operation 745 for determining that there is no capable automated customized food generation machine present in the nearby vicinity of the user that is able to currently generate one or more customized food items in compliance with the one or more customized food preferences of the user by determining that there is no capable automated customized food generation machine present in the nearby vicinity of the user that is able to currently generate one or more customized food items in compliance with one or more user preferences that one or more ingredients that are used for generating the one or more customized food items were not obtained from one or more specified sources. For instance, the capable automated customized food generation machine presence determining module 304* including the ingredient source preference capable automated customized food generation machine presence determining module 426 of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customized food preferences of the user 13 by having, for example, the ingredient source preference capable automated customized food generation machine presence determining module 426 determine that there is no capable automated customized food generation machine (e.g., no "capable" automated customized food generation machine 10"" of, for example, FIGS. 1B, 1C, 1D, and 1E) present in the nearby vicinity of the user 13 that is able to currently generate one or more customized food items 22 in full compliance with one or more user preferences that one or more ingredients (e.g., Chicken meat) that are used for generating the one or more customized food items 22 were not obtained from one or more specified sources (e.g., Tyson farms).

In some implementations, the capable automated customized food generation machine presence determining operation 504 may include an operation 746 for determining that there is no capable automated customized food generation machine present in the nearby vicinity of the user that is able to currently generate one or more customized food items in compliance with the one or more customized food preferences of the user by determining that there is no capable automated customized food generation machine present in the nearby vicinity of the user that is able to currently generate one or more customized food items in compliance with one or more user preferences that one or more ingredients that are used for generating the one or more customized food items were obtained from one or more specified locations. For instance, the capable automated customized food generation machine presence determining module 304* including the ingredient source location preference capable automated customized food generation machine presence determining module 428 (see FIG. 4B) of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customized food preferences of the user 13 by having, for example, the ingredient source location preference capable automated customized food generation machine presence determining module 428 determine that there is no capable automated customized food generation machine (e.g., there is no "capable" automated customized food generation machine 10"" of, for example, FIGS. 1B, 1C, 1D, and 1E) present in the nearby vicinity of the user 13 that is able to currently generate one or more customized food items 22 in compliance with one or more user preferences that one or more ingredients (e.g., beef ingredient) that are used for generating the one or more customized food items 22 were obtained from one or more specified locations (e.g., Kobe, Japan).

In some implementations, the capable automated customized food generation machine presence determining operation 504 may include an operation 747 for determining that there is no capable automated customized food generation machine present in the nearby vicinity of the user that is able to currently generate one or more customized food items in compliance with the one or more customized food preferences of the user by determining that there is no capable automated customized food generation machine present in the nearby vicinity of the user that is able to currently generate one or more customized food items in compliance with one or more user preferences that one or more ingredients that are used for generating the one or more customized food items were not obtained from one or more specified locations. For instance, the capable automated customized food generation machine presence determining module 304* including the ingredient source location preference capable automated customized food generation machine presence determining module 428 of the automated customized food generation machine 10*a* or 10*b* of FIG. 3A or 3B (or of the network device 12*a* or 12*b* of FIG. 3D or 3E) determining that there is no capable automated customized food generation machine present in the nearby vicinity of the user 13 that is able to currently generate one or more customized food items 22 in compliance with the one or more customized food preferences of the user 13 by having, for example, the ingredient source location preference capable automated customized food generation machine presence determining module 428 determine that there is no capable automated customized food generation machine (e.g., there is no "capable" automated customized food generation machine 10"" of, for example, FIGS. 1B, 1C, 1D, and 1E) present in the nearby vicinity of the user 13 that is able to currently generate one or more customized food items 22 in compliance with one or more user preferences that one or more ingredients (e.g., beef ingredient) that are used for generating the one or more customized food items 22 were not obtained from one or more specified locations (e.g., Britain where there was an outbreak of mad cow disease).

Figure 8A:
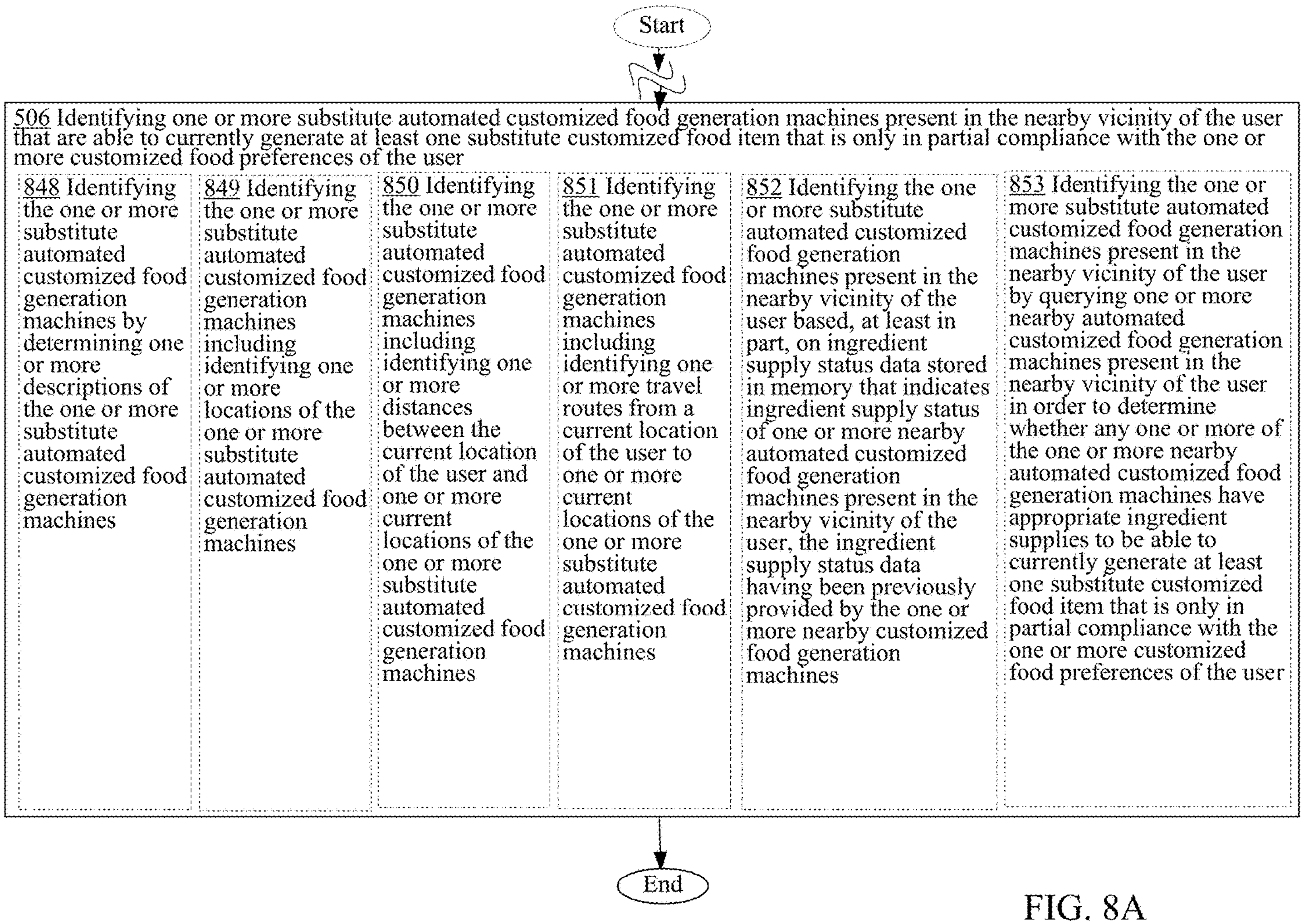
FIG. 8A is a high-level logic flowchart of a process depicting alternate implementations of the substitute automated customized food generation machine presence identifying operation 506 of FIG. 5.

Referring back to the substitute automated customized food generation machine presence identifying operation 506 of FIG. 5, the substitute automated customized food generation machine presence identifying operation 506 similar to the user preference information acquiring operation 502 and the capable automated customized food generation machine presence determining operation 504 of FIG. 5 may be executed in a number of different ways in various alternative embodiments as illustrated, for example, in FIGS. 8A, 8B, 8C, 8D, and 8E. In some cases, for example, the substitute automated customized food generation machine presence identifying operation 506 may actually include or involve an operation 848 for identifying the one or more substitute automated customized food generation machines by determining one or more descriptions of the one or more substitute automated customized food generation machines as illustrated in FIG. 8A. For instance, the substitute automated customized food generation machine presence ascertaining module 306* including the substitute automated customized food generation machine description ascertaining module 430 (see FIG. 4C) of the automated customized food generation machine 10*a* or 10*b* of FIG. 3A or 3B (or of the network device 12*a* or 12*b* of FIG. 3D or 3E) identifying the one or more substitute automated customized food generation machines by having the substitute automated customized food generation machine description ascertaining module 430 determine or ascertain one or more descriptions (e.g., machine number, specific location of the substitute machine in a store, machine color, and so forth) of the one or more substitute automated customized food generation machines (e.g., the "substitute" customized food generation machines 10'' and 10''' of FIGS. 1B, 1C, 1D, and 1E).

As further illustrated in FIG. 8A, in the same or alternative implementations the substitute automated customized food generation machine presence identifying operation 506 may additionally or alternatively include an operation 849 for identifying the one or more substitute automated customized food generation machines including identifying one or more locations of the one or more substitute automated customized food generation machines. For instance, the substitute automated customized food generation machine presence ascertaining module 306* including the substitute automated customized food generation machine location ascertaining module 432 (see FIG. 4C) of the automated customized food generation machine 10*a* or 10*b* of FIG. 3A or 3B (or of the network device 12*a* or 12*b* of FIG. 3D or 3E) identifying the one or more substitute automated customized food generation machines including identifying or ascertaining, by the substitute automated customized food generation machine location ascertaining module 432, of one or more locations of the one or more substitute automated customized food generation machines (e.g., the "substitute" customized food generation machines 10'' and 10''' of FIGS. 1B, 1C, 1D, and 1E).

In the same or alternative implementations, the substitute automated customized food generation machine presence identifying operation 506 may additionally or alternatively include an operation 850 for identifying the one or more substitute automated customized food generation machines including identifying one or more distances between the current location of the user and one or more current locations of the one or more substitute automated customized food generation machines. For instance, the substitute automated customized food generation machine presence ascertaining module 306* including the user/substitute machine distance ascertaining module 434 (see FIG. 4C) of the automated customized food generation machine 10*a* or 10*b* of FIG. 3A or 3B (or of the network device 12*a* or 12*b* of FIG. 3D or 3E) identifying the one or more substitute automated customized food generation machines including identifying or ascertaining, by the user/substitute machine distance ascertaining module 434, of one or more distances between the current location of the user 13 and one or more current locations of the one or more substitute automated customized food generation machines (e.g., the "substitute" customized food generation machines 10'' and 10''' of FIGS. 1B, 1C, 1D, and 1E).

In the same or alternative implementations, the substitute automated customized food generation machine presence identifying operation 506 may additionally or alternatively include an operation 851 for identifying the one or more substitute automated customized food generation machines including identifying one or more travel routes from a current location of the user to one or more current locations of the one or more substitute automated customized food generation machines. For instance, the substitute automated customized food generation machine presence ascertaining module 306* including the travel route ascertaining module 436 (see FIG. 4C) of the automated customized food generation machine 10*a* or 10*b* of FIG. 3A or 3B (or of the network device 12*a* or 12*b* of FIG. 3D or 3E) identifying the one or more substitute automated customized food generation machines including identifying or ascertaining, by the travel route ascertaining module 436, of one or more travel routes from a current location of the user 13 to one or more current locations of the one or more substitute automated customized food generation machines (e.g., the "substitute" customized food generation machines 10'' and 10''' of FIGS. 1B, 1C, 1D, and 1E).

In the same or alternative implementations, the substitute automated customized food generation machine presence identifying operation 506 may additionally or alternatively include an operation 852 for identifying the one or more substitute automated customized food generation machines present in the nearby vicinity of the user based, at least in part, on ingredient supply status data stored in memory that indicates ingredient supply status of one or more nearby automated customized food generation machines present in the nearby vicinity of the user, the ingredient supply status data having been previously provided by the one or more nearby customized food generation machines. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying the one or more substitute automated customized food generation machines present in the nearby vicinity of the user 13 based, at least in part, on ingredient supply status data stored in memory 340 that indicates ingredient supply status of one or more nearby automated customized food generation machines (e.g., the customized food generation machines 10', 10'' and 10''' of FIGS. 1B, 1C, 1D, and/or 1E) present in the nearby vicinity (e.g., within three miles) of the user 13, the ingredient supply status data having been previously provided by the one or more nearby customized food generation machines (e.g., the customized food generation machines 10', 10'' and 10''' of FIGS. 1B, 1C, 1D, and/or 1E).

In the same or alternative implementations, the substitute automated customized food generation machine presence identifying operation 506 may additionally or alternatively include an operation 853 for identifying the one or more substitute automated customized food generation machines present in the nearby vicinity of the user by querying one or more nearby automated customized food generation machines present in the nearby vicinity of the user in order to determine whether any one or more of the one or more nearby automated customized food generation machines have appropriate ingredient supplies to be able to currently generate at least one substitute customized food item that is only in partial compliance with the one or more customized food preferences of the user. For instance, the substitute automated customized food generation machine presence ascertaining module 306* including the automated customized food generation machine querying module 438 (see FIG. 4C) of the automated customized food generation machine 10*a* or 10*b* of FIG. 3A or 3B (or of the network device 12*a* or 12*b* of FIG. 3D or 3E) identifying the one or more substitute automated customized food generation machines present in the nearby vicinity of the user 13 by having, for example, the automated customized food generation machine querying module 438 query one or more nearby automated customized food generation machines (e.g., the customized food generation machines 10', 10'' and 10''' of FIGS. 1B, 1C, 1D, and/or 1E) present in the nearby vicinity (e.g., within five miles) of the user 13 in order to determine whether any one or more of the one or more nearby automated customized food generation machines (e.g., the customized food generation machines 10', 10" and 10''' of FIGS. 1B, 1C, 1D, and/or 1E) have appropriate ingredient supplies to be able to currently generate at least one substitute customized food item (e.g., customized food item 22 of, for example, FIG. 1A) that is only in partial compliance with the one or more customized food preferences of the user 13.

Figure 8B:
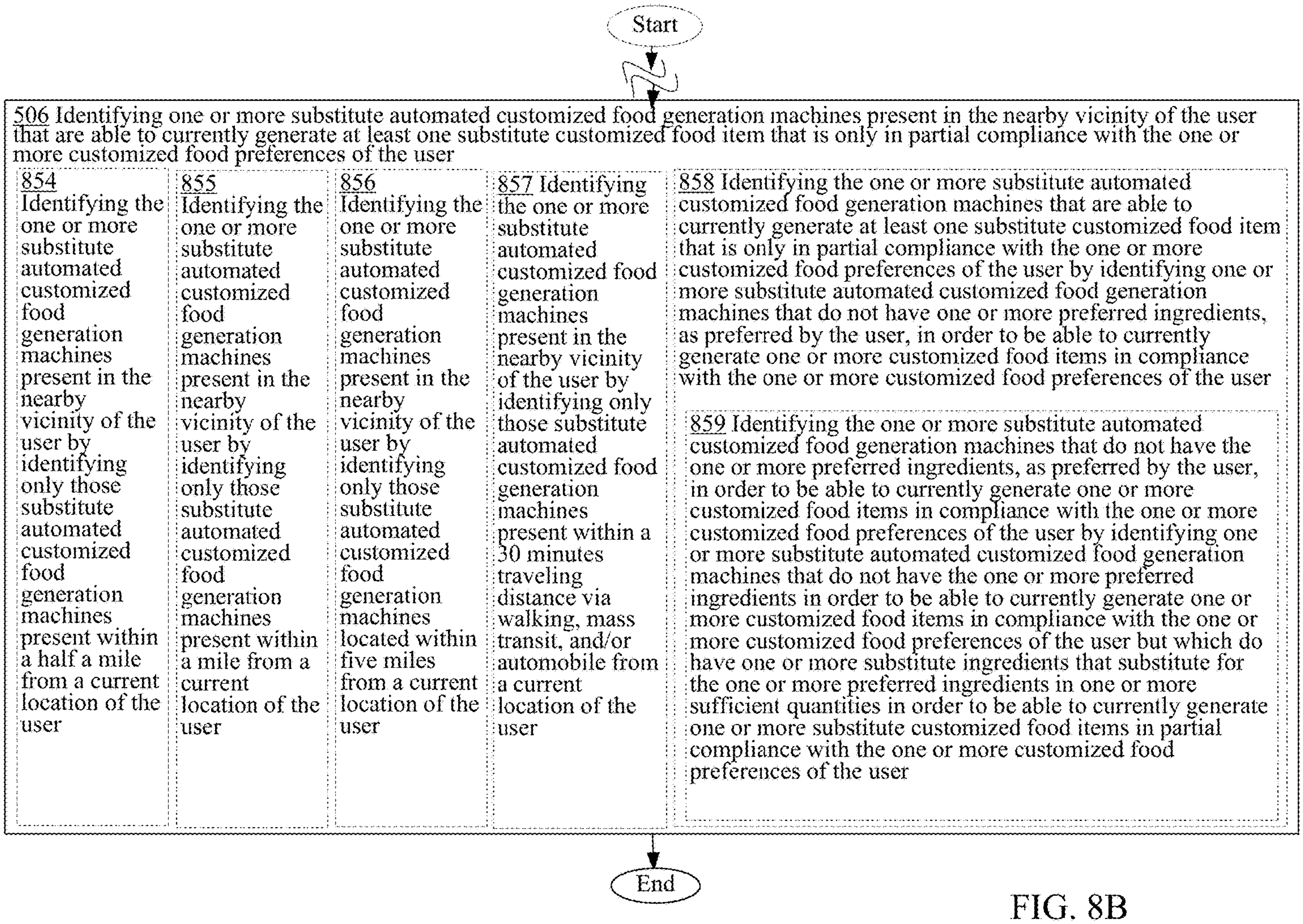
FIG. 8B is a high-level logic flowchart of a process depicting alternate implementations of the substitute automated customized food generation machine presence identifying operation 506 of FIG. 5.

In some implementations, the substitute automated customized food generation machine presence identifying operation 506 may include an operation 854 for identifying the one or more substitute automated customized food generation machines present in the nearby vicinity of the user by identifying only those substitute automated customized food generation machines present within a half a mile from a current location of the user as illustrated in FIG. 8B. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying the one or more substitute automated customized food generation machines present in the nearby vicinity of the user 13 by identifying or ascertaining only those substitute automated customized food generation machines (e.g., the customized food generation machines 10" and 10''' of FIGS. 1B, 1C, 1D, and/or 1E) present within a half a mile from a current location of the user 13.

In some implementations, the substitute automated customized food generation machine presence identifying operation 506 may include an operation 855 for identifying the one or more substitute automated customized food generation machines present in the nearby vicinity of the user by identifying only those substitute automated customized food generation machines present within a mile from a current location of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying the one or more substitute automated customized food generation machines present in the nearby vicinity of the user 13 by identifying or ascertaining only those substitute automated customized food generation machines (e.g., the automated customized food generation machines 10" and 10''' of FIGS. 1B, 1C, 1D, and/or 1E) present within a mile from a current location of the user 13.

In some implementations, the substitute automated customized food generation machine presence identifying operation 506 may include an operation 856 for identifying the one or more substitute automated customized food generation machines present in the nearby vicinity of the user by identifying only those substitute automated customized food generation machines located within five miles from a current location of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying the one or more substitute automated customized food generation machines present in the nearby vicinity of the user 13 by identifying or ascertaining only those substitute automated customized food generation machines (e.g., the automated customized food generation machines 10" and 10''' of FIGS. 1B, 1C, 1D, and/or 1E) located within five miles from a current location of the user 13.

In some implementations, the substitute automated customized food generation machine presence identifying operation 506 may include an operation 857 for identifying the one or more substitute automated customized food generation machines present in the nearby vicinity of the user by identifying only those substitute automated customized food generation machines present within a 30 minutes traveling distance via walking, mass transit, and/or automobile from a current location of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying the one or more substitute automated customized food generation machines present in the nearby vicinity of the user 13 by identifying or ascertaining only those substitute automated customized food generation machines (e.g., the automated customized food generation machines 10" and 10''' of FIGS. 1B, 1C, 1D, and/or 1E) present within a 30 minutes traveling distance via walking, mass transit, and/or automobile from a current location of the user 13.

In some implementations, the substitute automated customized food generation machine presence identifying operation 506 may include an operation 858 for identifying the one or more substitute automated customized food generation machines that are able to currently generate at least one substitute customized food item that is only in partial compliance with the one or more customized food preferences of the user by identifying one or more substitute automated customized food generation machines that do not have one or more preferred ingredients, as preferred by the user, in order to be able to currently generate one or more customized food items in compliance with the one or more customized food preferences of the user. For instance, the substitute automated customized food generation machine presence ascertaining module 306* including the preferred ingredient deficient substitute automated customized food generation machine presence ascertaining module 440 (see FIG. 4C) of the automated customized food generation machine 10*a* or 10*b* of FIG. 3A or 3B (or of the network device 12*a* or 12*b* of FIG. 3D or 3E) identifying the one or more substitute automated customized food generation machines that are able to currently generate at least one substitute customized food item (e.g., customized food item 22 of, for example, FIG. 1A) that is only in partial compliance with the one or more customized food preferences of the user 13 by having, for example, the preferred ingredient deficient substitute automated customized food generation machine presence ascertaining module 440 identify or ascertain one or more substitute automated customized food generation machines (e.g., the automated customized food generation machines 10" and 10''' of FIGS. 1B, 1C, 1D, and/or 1E) that do not have one or more preferred ingredients, as preferred by the user 13, in order to be able to currently generate one or more customized food items 22 in full compliance with the one or more customized food preferences of the user 13.

As further illustrated in FIG. 8B, operation 858 may further include, in some cases, an operation 859 for identifying the one or more substitute automated customized food generation machines that do not have the one or more preferred ingredients, as preferred by the user, in order to be able to currently generate one or more customized food items in compliance with the one or more customized food preferences of the user by identifying one or more substitute automated customized food generation machines that do not have the one or more preferred ingredients in order to be able to currently generate one or more customized food items in compliance with the one or more customized food preferences of the user but which do have one or more substitute ingredients that substitute for the one or more preferred ingredients in one or more sufficient quantities that only allows the one or more substitute automated customized food generation machines to be able to currently generate one or more substitute customized food items that is only in partial compliance with the one or more customized food preferences of the user. For instance, the preferred ingredient deficient substitute automated customized food generation machine presence ascertaining module 440 including the substitute ingredient stocked substitute automated customized food generation machine presence ascertaining module 442 (see FIG. 4C) of the automated customized food generation machine 10*a* or 10*b* of FIG. 3A or 3B (or of the network device 12*a* or 12*b* of FIG. 3D or 3E) identifying the one or more substitute automated customized food generation machines that do not have the one or more preferred ingredients, as preferred by the user 13, in order to be able to currently generate one or more customized food items 22 in full or complete compliance with the one or more customized food preferences of the user 13 by having, for example, the substitute ingredient stocked substitute automated customized food generation machine presence ascertaining module 442 identify or ascertain one or more substitute automated customized food generation machines (e.g., the automated customized food generation machines 10" and 10'" of FIGS. 1B, 1C, 1D, and/or 1E) that do not have the one or more preferred ingredients in order to be able to currently generate one or more customized food items in full or complete compliance with the one or more customized food preferences of the user 13 but which do have one or more substitute ingredients that substitute for the one or more preferred ingredients in one or more sufficient quantities in order to be able to currently generate one or more substitute customized food items (e.g., customized food items 22) in partial compliance with the one or more customized food preferences of the user 13.

Figure 8C:
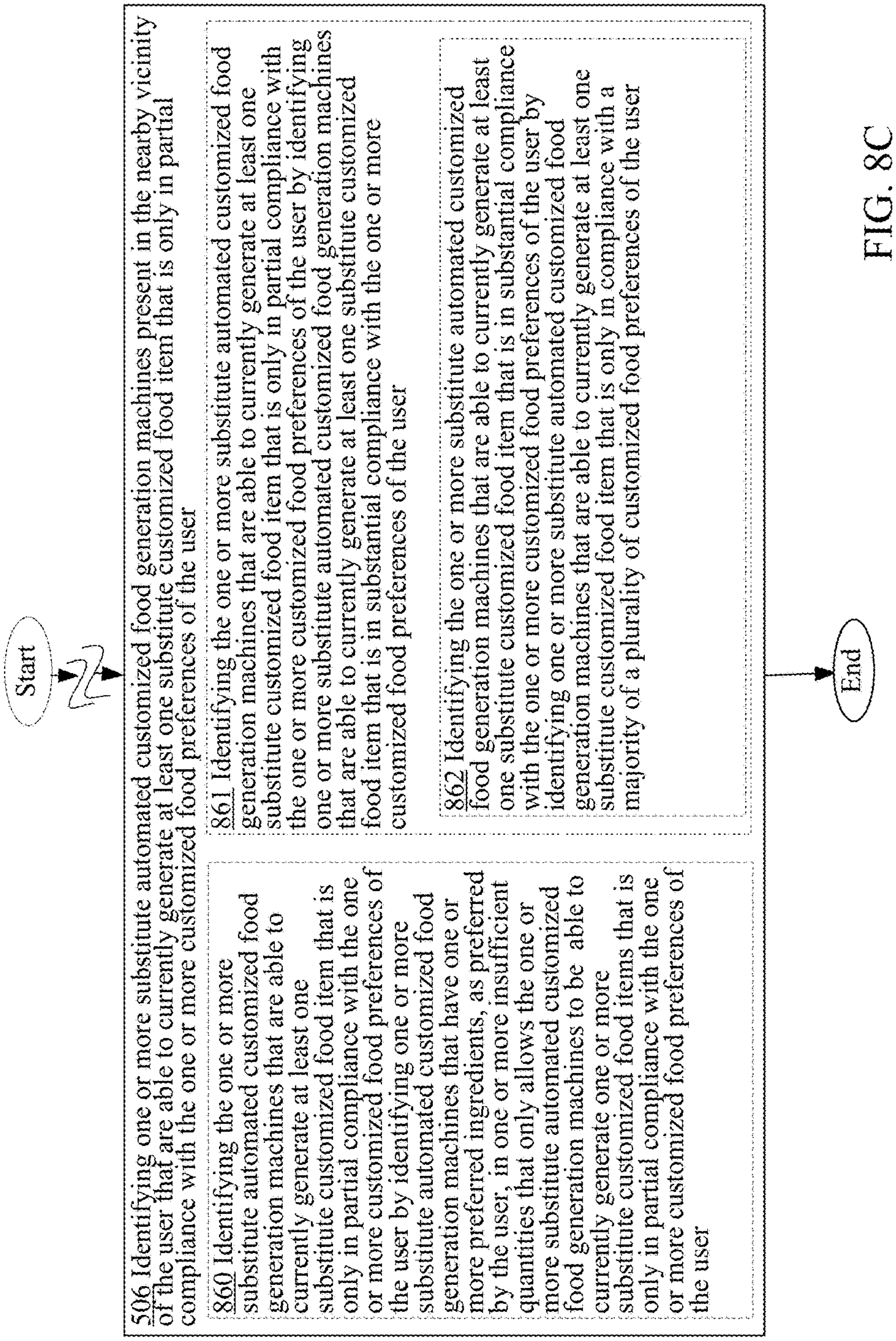
FIG. 8C is a high-level logic flowchart of a process depicting alternate implementations of the substitute automated customized food generation machine presence identifying operation 506 of FIG. 5.

Referring now to FIG. 8C, in various implementations, the substitute automated customized food generation machine presence identifying operation 506 may include an operation 860 for identifying the one or more substitute automated customized food generation machines that are able to currently generate at least one substitute customized food item that is only in partial compliance with the one or more customized food preferences of the user by identifying one or more substitute automated customized food generation machines that have one or more preferred ingredients, as preferred by the user, in one or more insufficient quantities that only allows the one or more substitute automated customized food generation machines to be able to currently generate one or more substitute customized food items that is only in partial compliance with the one or more customized food preferences of the user. For instance, the substitute automated customized food generation machine presence ascertaining module 306* including the preferred ingredient deficient substitute automated customized food generation machine presence ascertaining module 440 of the automated customized food generation machine 10*a* or 10*b* of FIG. 3A or 3B (or of the network device 12*a* or 12*b* of FIG. 3D or 3E) identifying the one or more substitute automated customized food generation machines that are able to currently generate at least one substitute customized food item that is only in partial compliance with the one or more customized food preferences of the user 13 by having, for example, the preferred ingredient deficient substitute automated customized food generation machine presence ascertaining module 440 identify or ascertain one or more substitute automated customized food generation machines (e.g., the automated customized food generation machines 10" and 10'" of FIGS. 1B, 1C, 1D, and/or 1E) that have one or more preferred ingredients, as preferred by the user 13, in one or more insufficient quantities that only allows the one or more substitute automated customized food generation machines to be able to currently generate one or more substitute customized food items (e.g., customized food items 22) that is only in partial compliance with the one or more customized food preferences of the user 13.

In some implementations, the substitute automated customized food generation machine presence identifying operation 506 may include an operation 861 for identifying the one or more substitute automated customized food generation machines that are able to currently generate at least one substitute customized food item that is only in partial compliance with the one or more customized food preferences of the user by identifying one or more substitute automated customized food generation machines that are able to currently generate at least one substitute customized food item that is in substantial compliance with the one or more customized food preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying the one or more substitute automated customized food generation machines that are able to currently generate at least one substitute customized food item that is only in partial compliance with the one or more customized food preferences of the user 13 by identifying or ascertaining one or more substitute automated customized food generation machines (e.g., the automated customized food generation machines 10" and 10'" of FIGS. 1B, 1C, 1D, and/or 1E) that are able to currently generate at least one substitute customized food item (e.g., customized food item 22 of, for example, FIG. 1A) that is only in substantial compliance with the one or more customized food preferences of the user 13.

In some cases, operation 861 may further include an operation 862 for identifying the one or more substitute automated customized food generation machines that are able to currently generate at least one substitute customized food item that is in substantial compliance with the one or more customized food preferences of the user by identifying one or more substitute automated customized food generation machines that are able to currently generate at least one substitute customized food item that is only in compliance with a majority of a plurality of customized food preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying the one or more substitute automated customized food generation machines that are able to currently generate at least one substitute customized food item that is only in substantial compliance with the one or more customized food preferences of the user 13 by identifying or ascertaining one or more substitute automated customized food generation machines (e.g., the automated customized food generation machines 10" and 10'" of FIGS. 1B, 1C, 1D, and/or 1E) that are able to currently generate at least one substitute customized food item (e.g., customized food item 22) that is only in compliance with a majority of a plurality of customized food preferences of the user 13.

Figure 8D:
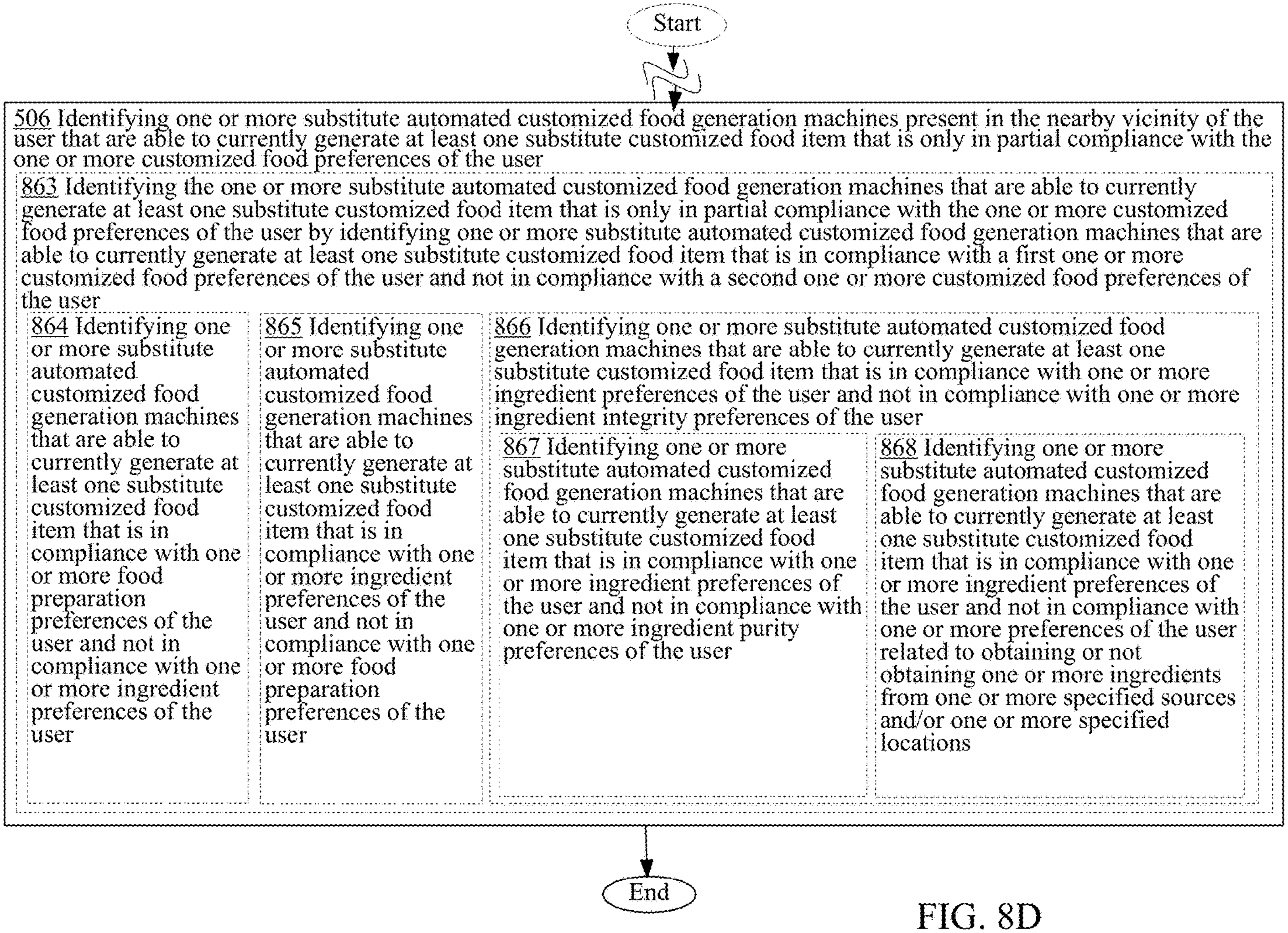
FIG. 8D is a high-level logic flowchart of a process depicting alternate implementations of the substitute automated customized food generation machine presence identifying operation 506 of FIG. 5.

Turning now to FIG. 8D, in various implementations, the substitute automated customized food generation machine presence identifying operation 506 may include an operation 863 for identifying the one or more substitute automated customized food generation machines that are able to currently generate at least one substitute customized food item that is only in partial compliance with the one or more customized food preferences of the user by identifying one or more substitute automated customized food generation machines that are able to currently generate at least one substitute customized food item that is in compliance with a first one or more customized food preferences of the user and not in compliance with a second one or more customized food preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying the one or more substitute automated customized food generation machines that are able to currently generate at least one substitute customized food item that is only in partial compliance with the one or more customized food preferences of the user 13 by identifying or ascertaining one or more substitute automated customized food generation machines (e.g., the automated customized food generation machines 10" and 10"' of FIGS. 1B, 1C, 1D, and/or 1E) that are able to currently generate at least one substitute customized food item (e.g., customized food item 22 of, for example, FIG. 1A) that is in compliance with a first one or more customized food preferences (e.g., ingredient purity preference) of the user 13 and not in compliance with a second one or more customized food preferences (e.g., ingredient source preference) of the user 13.

As further illustrated in FIG. 8D, operation 863 may include one or more additional operations in various alternative implementations. For example, in some implementations, operation 863 may further include an operation 864 for identifying one or more substitute automated customized food generation machines that are able to currently generate at least one substitute customized food item that is in compliance with one or more food preparation preferences of the user and not in compliance with one or more ingredient preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10" and 10"' of FIGS. 1B, 1C, 1D, and/or 1E) that are able to currently generate at least one substitute customized food item (e.g., customized food item 22 of, for example, FIG. 1A) that is in compliance with one or more food preparation (e.g., heating and/or cooling) preferences of the user 13 and not in compliance with one or more ingredient preferences (e.g., preference for non-fat dairy ingredients) of the user 13.

In some implementations, operation 863 may include an operation 865 for identifying one or more substitute automated customized food generation machines that are able to currently generate at least one substitute customized food item that is in compliance with one or more ingredient preferences of the user and not in compliance with one or more food preparation preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10" and 10"' of FIGS. 1B, 1C, 1D, and/or 1E) that are able to currently generate at least one substitute customized food item (e.g., customized food item 22 of, for example, FIG. 1A) that is in compliance with one or more ingredient preferences (e.g., preference for beef ingredient) of the user 13 and not in compliance with one or more food preparation preferences (e.g., preference for cooking beef with minimal heat) of the user 13.

In some implementations, operation 863 may include an operation 866 for identifying one or more substitute automated customized food generation machines that are able to currently generate at least one substitute customized food item that is in compliance with one or more ingredient preferences of the user and not in compliance with one or more ingredient integrity preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10" and 10"' of FIGS. 1B, 1C, 1D, and/or 1E) that are able to currently generate at least one substitute customized food item that is in compliance with one or more ingredient preferences (e.g., preference for a particular vegetable ingredient such as alfalfa sprouts) of the user 13 and not in compliance with one or more ingredient integrity preferences (e.g., preference that source for vegetable ingredients, such as a farm or harvest crop, was tested to be free of certain bacteria) of the user 13.

In some implementations, operation 866 may further include an operation 867 for identifying one or more substitute automated customized food generation machines that are able to currently generate at least one substitute customized food item that is in compliance with one or more ingredient preferences of the user and not in compliance with one or more ingredient purity preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10" and 10"' of FIGS. 1B, 1C, 1D, and/or 1E) that are able to currently generate at least one substitute customized food item that is in compliance with one or more ingredient preferences (e.g., preference for beef ingredient) of the user 13 and not in compliance with one or more ingredient purity preferences (e.g., preference that source of beef ingredient was tested to be free of prions) of the user 13.

In the same or alternative implementations, operation 866 may additionally or alternatively include an operation 868 for identifying one or more substitute automated customized food generation machines that are able to currently generate at least one substitute customized food item that is in compliance with one or more ingredient preferences of the user and not in compliance with one or more preferences of the user related to obtaining or not obtaining one or more ingredients from one or more specified sources and/or one or more specified locations. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10'' and 10''' of FIGS. 1B, 1C, 1D, and/or 1E) that are able to currently generate at least one substitute customized food item that is in compliance with one or more ingredient preferences (e.g., preference for beef) of the user 13 and not in compliance with one or more preferences of the user 13 related to obtaining or not obtaining one or more ingredients from one or more specified sources and/or one or more specified locations (e.g., preference for beef ingredients that are from Kobe, Japan).

Figure 8E:
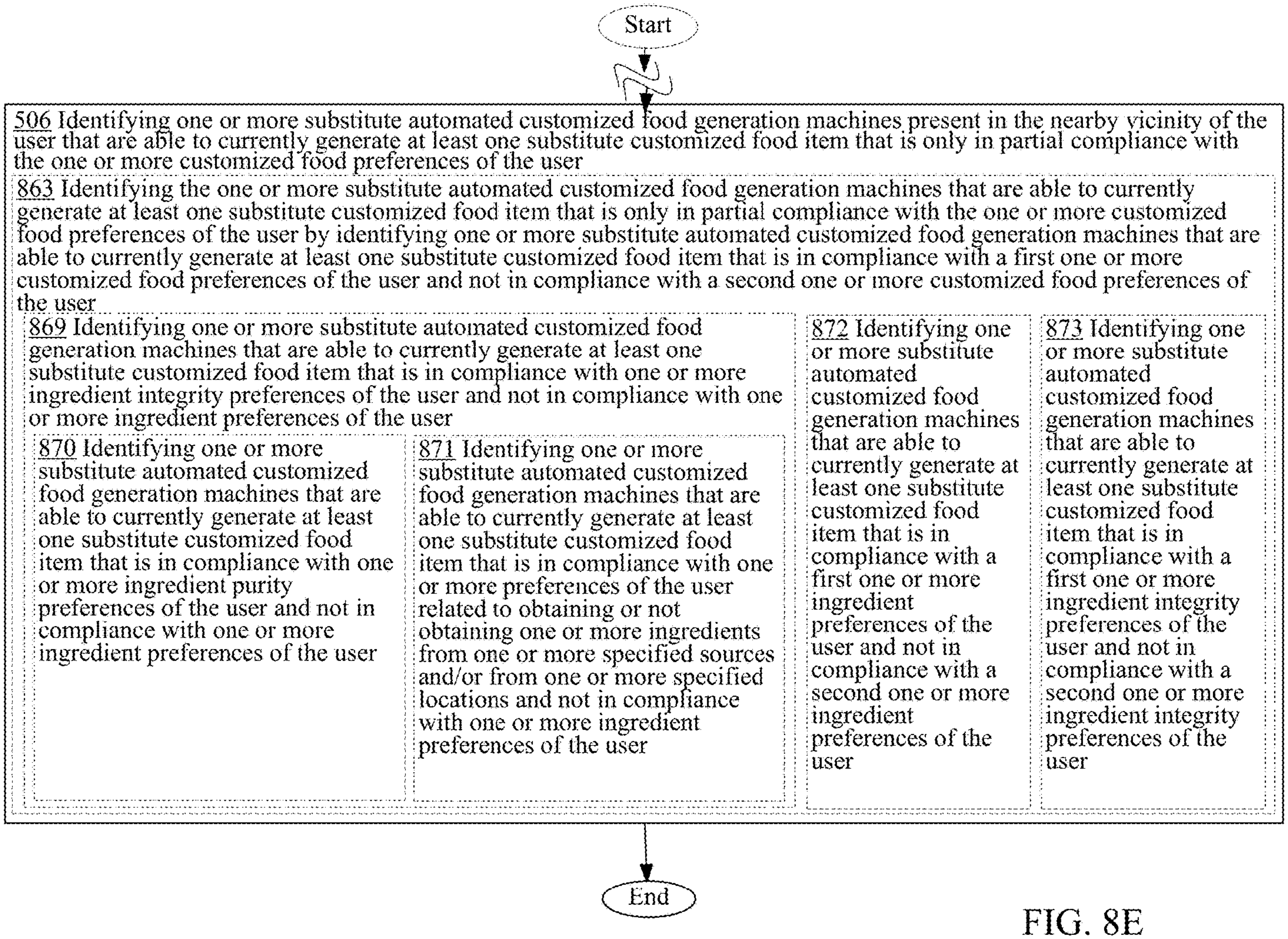
FIG. 8E is a high-level logic flowchart of a process depicting alternate implementations of the substitute automated customized food generation machine presence identifying operation 506 of FIG. 5.

In some implementations, operation 863 may include an operation 869 for identifying one or more substitute automated customized food generation machines that are able to currently generate at least one substitute customized food item that is in compliance with one or more ingredient integrity preferences of the user and not in compliance with one or more ingredient preferences of the user as illustrated in FIG. 8E. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10'' and 10''' of FIGS. 1B, 1C, 1D, and/or 1E) that are able to currently generate at least one substitute customized food item that is in compliance with one or more ingredient integrity preferences (e.g., preferences that vegetable ingredients to be used were provided by a particular source such as Del Monte) of the user 13 and not in compliance with one or more ingredient preferences (e.g., preference that alfalfa sprouts be used) of the user 13.

In some implementations, operation 869 may further include an operation 870 for identifying one or more substitute automated customized food generation machines that are able to currently generate at least one substitute customized food item that is in compliance with one or more ingredient purity preferences of the user and not in compliance with one or more ingredient preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10'' and 10''' of FIGS. 1B, 1C, 1D, and/or 1E) that are able to currently generate at least one substitute customized food item that is in compliance with one or more ingredient purity preferences (e.g., the sources for vegetable ingredients were tested to be free of *salmonella*) of the user 13 and not in compliance with one or more ingredient preferences (e.g., preference that alfalfa sprouts be used) of the user 13.

In some implementations, operation 869 may actually include an operation 871 for identifying one or more substitute automated customized food generation machines that are able to currently generate at least one substitute customized food item that is in compliance with one or more preferences of the user related to obtaining or not obtaining one or more ingredients from one or more specified sources and/or from one or more specified locations and not in compliance with one or more ingredient preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10'' and 10''' of FIGS. 1B, 1C, 1D, and/or 1E) that are able to currently generate at least one substitute customized food item that is in compliance with one or more preferences of the user 13 related to obtaining or not obtaining one or more ingredients from one or more specified sources and/or from one or more specified locations (e.g., preference that meat ingredients not be obtained from Britain) and not in compliance with one or more ingredient preferences (e.g., preference for beef ingredients instead of chicken ingredients) of the user 13.

In some implementations, operation 863 may include an operation 872 for identifying one or more substitute automated customized food generation machines that are able to currently generate at least one substitute customized food item that is in compliance with a first one or more ingredient preferences of the user and not in compliance with a second one or more ingredient preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10'' and 10''' of FIGS. 1B, 1C, 1D, and/or 1E) that are able to currently generate at least one substitute customized food item that is in compliance with a first one or more ingredient preferences (e.g., preference for pecans) of the user 13 and not in compliance with a second one or more ingredient preferences (e.g., preference for using aspartame as a sweetener) of the user 13.

In some implementations, operation 863 may include an operation 873 for identifying one or more substitute automated customized food generation machines that are able to currently generate at least one substitute customized food item that is in compliance with a first one or more ingredient integrity preferences of the user and not in compliance with a second one or more ingredient integrity preferences of the user. For instance, the substitute automated customized food generation machine presence ascertaining module 306* of the automated customized food generation machine 10*a* or 10*b* of FIG. 3A or 3B (or of the network device 12*a* or 12*b* of FIG. 3D or 3E) identifying or ascertaining one or more substitute automated customized food generation machines (e.g., the automated customized food generation machines 10'' and 10''' of FIGS. 1B, 1C, 1D, and/or 1E) that are able to currently generate at least one substitute customized food item that is in compliance with a first one or more ingredient integrity preferences (e.g., preference that a source for a beef ingredient was tested to be free of one or more specific viral agents) of the user 13 and not in compliance with a second one or more ingredient integrity preferences (e.g., preference that a source for chicken ingredients was tested to be free of *salmonella*) of the user 13.

Turning now to FIG. 9 illustrating another operational flow 900. Operational flow 900 includes certain operations that mirror the operations included in operational flow 500 of FIG. 5. These operations include a user preference information acquiring operation 902, a capable automated customized food generation machine presence determining operation 904, and a substitute automated customized food generation machine presence identifying operation 906 that corresponds to and mirrors the user preference information acquiring operation 502, the capable automated customized food generation machine presence determining operation 504, and the substitute automated customized food generation machine presence identifying operation 506, respectively, of FIG. 5.

In addition, operational flow 900 further includes an indicator presenting operation 908 for presenting, in response at least in part to the identification, one or more indicators that identify the one or more substitute automated customized food generation machines. For instance, the indicator presenting module 308* of the automated customized food generation machine 10*a* or 10*b* of FIG. 3A or 3B (or of the network device 12*a* or 12*b* of FIG. 3D or 3E) presenting, in response at least in part to the identification (or ascertainment), one or more indicators (e.g., indicators 220* of FIG. 2A, 2B, or 2C) that identify the one or more substitute automated customized food generation machines (e.g., the automated customized food generation machines 10" and 10'" of FIGS. 1B, 1C, 1D, and/or 1E).

Figure 10A:
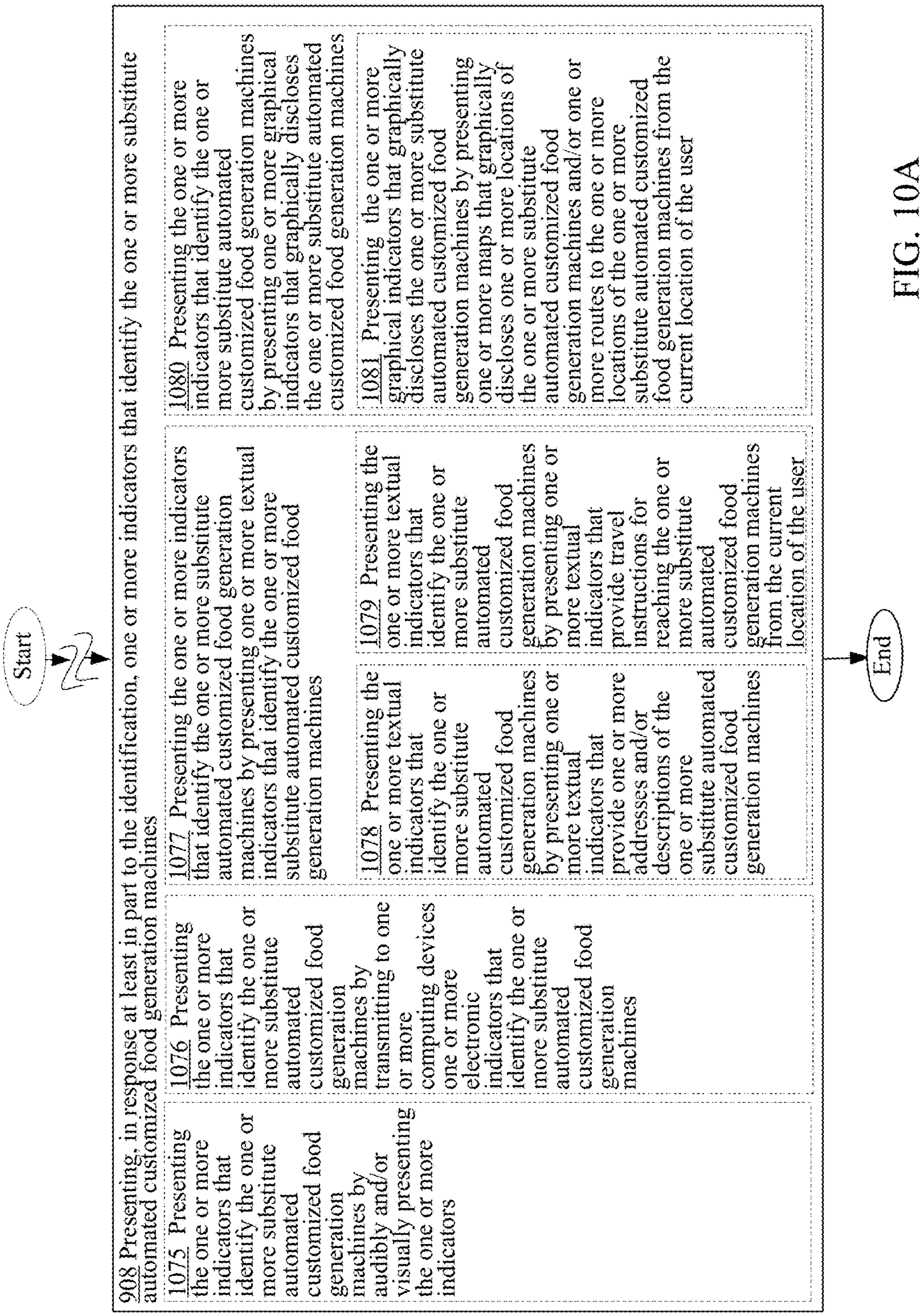
FIG. 10A is a high-level logic flowchart of a process depicting alternate implementations of the indicator presenting operation 908 of FIG. 9.
Figure 10B:
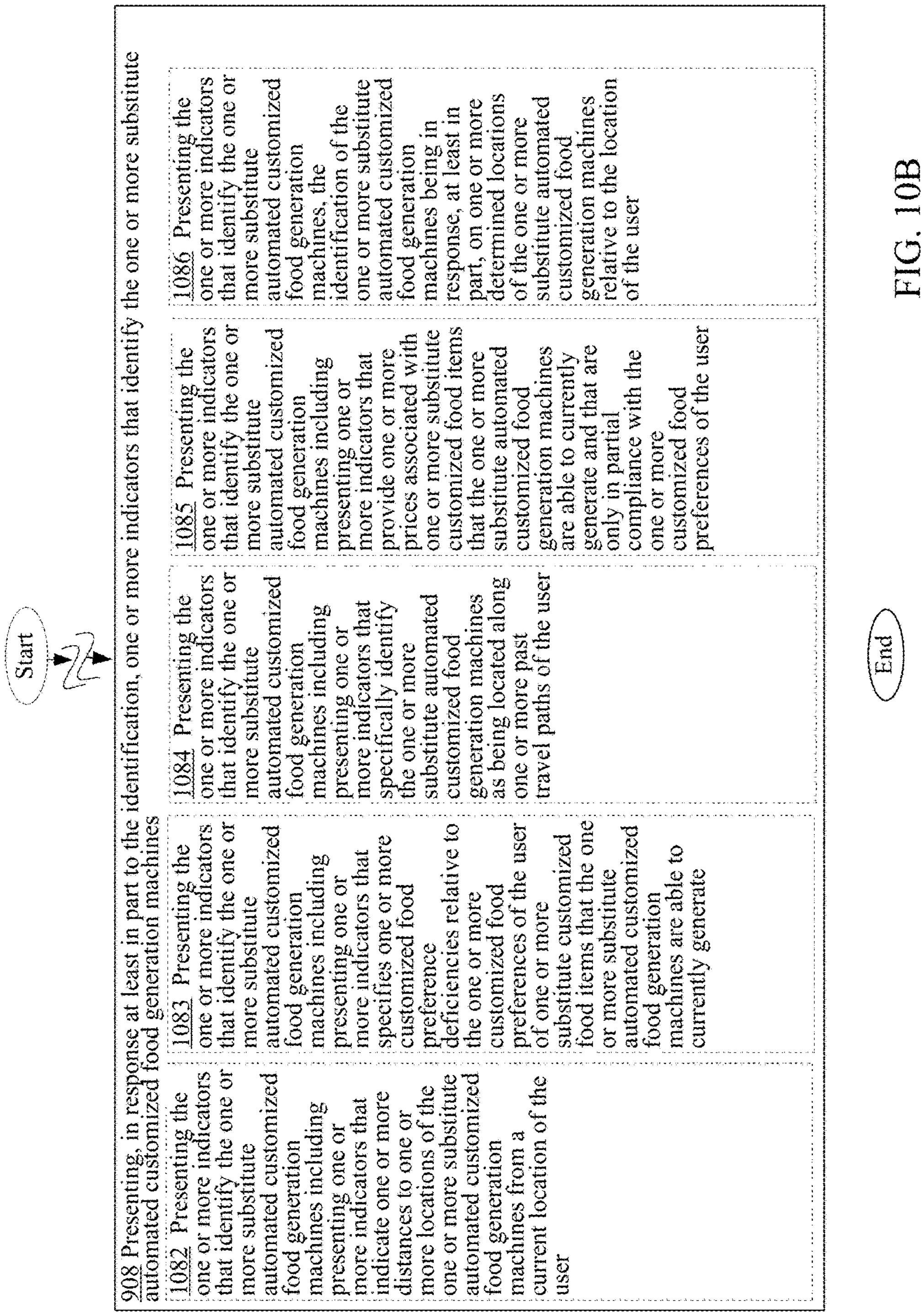
FIG. 10B is a high-level logic flowchart of a process depicting alternate implementations of the indicator presenting operation 908 of FIG. 9.
Figure 10C:
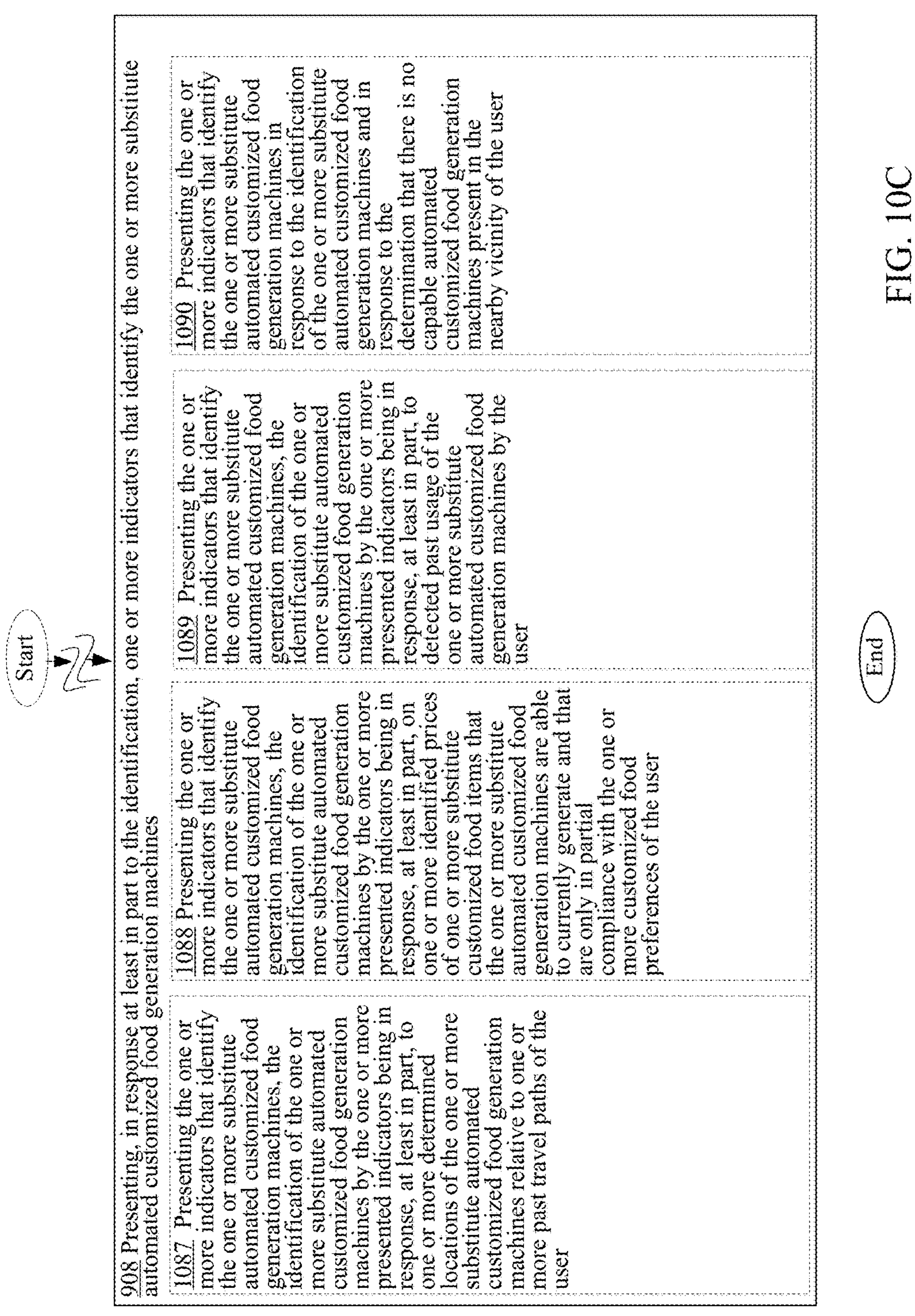
FIG. 10C is a high-level logic flowchart of a process depicting alternate implementations of the indicator presenting operation 908 of FIG. 9.

Referring now to FIGS. 10A, 10B, and 10C, which illustrate various ways that the indicator presenting operation 908 may be executed in various alternative implementations. For example, in some implementations, the indicator presenting operation 908 may include an operation 1075 for presenting the one or more indicators that identify the one or more substitute automated customized food generation machines by audibly and/or visually presenting the one or more indicators. For instance, the indicator presenting module 308* of the automated customized food generation machine 10*a* or 10*b* of FIG. 3A or 3B presenting the one or more indicators that identify the one or more substitute automated customized food generation machines by audibly and/or visually presenting the one or more indicators (e.g., indicators 220* of FIG. 2A, 2B, or 2C) via, for example, user interface 360 (e.g., a display such as a touchscreen and/or one or more speakers).

In some implementations, the indicator presenting operation 908 may include an operation 1076 for presenting the one or more indicators that identify the one or more substitute automated customized food generation machines by transmitting to one or more computing devices one or more electronic indicators that identify the one or more substitute automated customized food generation machines. For instance, the indicator presenting module 308* including the electronic indicator communicating module 444 (see FIG. 4D) of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines by having, for example, the electronic indicator communicating module 444 transmit or communicate to one or more computing devices 15 (e.g., a mobile device such as a Smartphone or tablet computer) one or more electronic indicators 220* that identify the one or more substitute automated customized food generation machines (e.g., the automated customized food generation machines 10" and 10' of FIGS. 1B, 1C, 1D, and/or 1E).

In some implementations, the indicator presenting operation 908 may include an operation 1077 for presenting the one or more indicators that identify the one or more substitute automated customized food generation machines by presenting one or more textual indicators that identify the one or more substitute automated customized food generation machines. For instance, the indicator presenting module 308* including the textual indicator presenting module 446 (see FIG. 4D) of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines by presenting (e.g., electronically transmitting or visually and/or audibly presenting) one or more textual indicators (see, for example, indicators 220*a*, 220*b*, or 220*c* of FIG. 2A, 2B, or 2C, each of which have textual components) that identify the one or more substitute automated customized food generation machines (e.g., the automated customized food generation machines 10" and 10'" of FIGS. 1B, 1C, 1D, and/or 1E).

As further illustrated in FIG. 10A, in some implementations, operation 1077 may further include an operation 1078 for presenting the one or more textual indicators that identify the one or more substitute automated customized food generation machines by presenting one or more textual indicators that provide one or more addresses and/or descriptions of the one or more substitute automated customized food generation machines. For instance, the textual indicator presenting module 446 of the automated customized food generation machine 10*a* or 10*b* of FIG. 3A or 3B (or of the network device 12*a* or 12*b* of FIG. 3D or 3E) presenting the one or more textual indicators 220* that identify the one or more substitute automated customized food generation machines by presenting one or more textual indicators (e.g., indicator 220*a* or 220*b* of FIG. 2A or 2B) that provide one or more addresses and/or descriptions of the one or more substitute automated customized food generation machines (e.g., the automated customized food generation machines 10" and 10'" of FIGS. 1B, 1C, 1D, and/or 1E).

In the same or alternative implementations, operation 1077 may additionally or alternatively include an operation 1079 for presenting the one or more textual indicators that identify the one or more substitute automated customized food generation machines by presenting one or more textual indicators that provide travel instructions for reaching the one or more substitute automated customized food generation machines from the current location of the user. For instance, the textual indicator presenting module 446 of the automated customized food generation machine 10*a* or 10*b* of FIG. 3A or 3B (or of the network device 12*a* or 12*b* of FIG. 3D or 3E) presenting the one or more textual indicators 220* that identify the one or more substitute automated customized food generation machines by presenting one or more textual indicators (e.g., indicator 220*b* of FIG. 2B) that provide travel instructions for reaching the one or more substitute automated customized food generation machines (e.g., the automated customized food generation machines 10" and 10'" of FIGS. 1B, 1C, 1D, and/or 1E) from the current location of the user 13.

In various implementations, the indicator presenting operation 908 may include an operation 1080 for presenting the one or more indicators that identify the one or more substitute automated customized food generation machines by presenting one or more graphical indicators that graphically discloses the one or more substitute automated customized food generation machines. For instance, the indicator presenting module 308* including the graphical indicator presenting module 448 (see FIG. 4D) of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines by having, for example, the graphical indicator presenting module 448 present (e.g., electronically transmit or visually and/or audibly present) one or more graphical indicators (e.g., indicator 220*c* of FIG. 2C) that graphically discloses the one or more substitute automated customized food generation machines (e.g., the automated customized food generation machines 10" and 10"' of FIGS. 1B, 1C, 1D, and/or 1E).

In some cases, operation 1080 may further include an operation 1081 for presenting the one or more graphical indicators that graphically discloses the one or more substitute automated customized food generation machines by presenting one or more maps that graphically discloses one or more locations of the one or more substitute automated customized food generation machines and/or one or more routes to the one or more locations of the one or more substitute automated customized food generation machines from the current location of the user as illustrated in FIG. 10A. For instance, the graphical indicator presenting module 448 (see FIG. 4D) of the automated customized food generation machine 10*a* or 10*b* of FIG. 3A or 3B (or of the network device 12*a* or 12*b* of FIG. 3D or 3E) presenting the one or more graphical indicators 220* that graphically discloses the one or more substitute automated customized food generation machines (e.g., the automated customized food generation machines 10" and 10"' of FIGS. 1B, 1C, 1D, and/or 1E) by presenting (e.g., electronically transmitting or visually and/or audibly presenting) one or more maps (see, for example, indicator 220*c* of FIG. 2C) that graphically discloses one or more locations of the one or more substitute automated customized food generation machines and/or one or more routes (e.g., route 232 of FIG. 2C) to the one or more locations of the one or more substitute automated customized food generation machines from the current location of the user 13.

Referring to FIG. 10B, in the same or alternative implementations, the indicator presenting operation 908 may additionally or alternatively include an operation 1082 for presenting the one or more indicators that identify the one or more substitute automated customized food generation machines including presenting one or more indicators that indicate one or more distances to one or more locations of the one or more substitute automated customized food generation machines from a current location of the user. For instance, the indicator presenting module 308* including the distance indicator presenting module 450 (see FIG. 4D) of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines including presenting, by the distance indicator presenting module 450, for example, one or more indicators (e.g., indicator 220*a* or 220*b* of FIG. 2A or 2B) that indicate one or more distances to one or more locations of the one or more substitute automated customized food generation machines (e.g., the automated customized food generation machines 10" and 10"' of FIGS. 1B, 1C, 1D, and/or 1E) from a current location of the user 13.

In the same or alternative implementations, the indicator presenting operation 908 may additionally or alternatively include an operation 1083 for presenting the one or more indicators that identify the one or more substitute automated customized food generation machines including presenting one or more indicators that specifies one or more customized food preference deficiencies relative to the one or more customized food preferences of the user of one or more substitute customized food items that the one or more substitute automated customized food generation machines are able to currently generate. For instance, the indicator presenting module 308* including the substitute customized food item deficiency indicator presenting module 452 (see FIG. 4D) of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines including presenting, by the substitute customized food item deficiency indicator presenting module 452, for example, one or more indicators (e.g., indicator 220*a* of FIG. 2A) that specifies one or more customized food preference deficiencies relative to the one or more customized food preferences of the user 13 of one or more substitute customized food items that the one or more substitute automated customized food generation machines (e.g., the automated customized food generation machines 10" and 10"' of FIGS. 1B, 1C, 1D, and/or 1E) are able to currently generate.

In the same or alternative implementations, the indicator presenting operation 908 may additionally or alternatively include an operation 1084 for presenting the one or more indicators that identify the one or more substitute automated customized food generation machines including presenting one or more indicators that specifically identify the one or more substitute automated customized food generation machines as being located along one or more past travel paths of the user. For instance, the indicator presenting module 308* of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines including presenting (e.g., electronically transmitting or visually and/or audibly presenting) one or more indicators (e.g., indicator 220*a* of FIG. 2A) that specifically identify the one or more substitute automated customized food generation machines as being located along one or more past travel paths of the user 13 (note that in FIG. 2A, indicator 220*a* indicates that option 1 is "along user travel path").

In the same or alternative implementations, the indicator presenting operation 908 may additionally or alternatively include an operation 1085 for presenting the one or more indicators that identify the one or more substitute automated customized food generation machines including presenting one or more indicators that provide one or more prices associated with one or more substitute customized food items that the one or more substitute automated customized food generation machines are able to currently generate and that are only in partial compliance with the one or more customized food preferences of the user. For instance, the indicator presenting module 308* of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines including presenting (e.g., electronically transmitting or visually and/or audibly presenting) one or more indicators (e.g., indicator 220*a* of FIG. 2A) that provide one or more prices associated with one or more substitute customized food items that the one or more substitute automated customized food generation machines (e.g., the automated customized food generation machines 10" and 10"' of FIGS. 1B, 1C, 1D, and/or 1E) are able to currently generate and that are only in partial compliance with the one or more customized food preferences of the user 13.

In the same or alternative implementations, the indicator presenting operation 908 may additionally or alternatively include an operation 1086 for presenting the one or more indicators that identify the one or more substitute automated customized food generation machines, the identification of the one or more substitute automated customized food generation machines by the one or more presented indicators being in response, at least in part, on one or more determined locations of the one or more substitute automated customized food generation machines relative to the location of the user. For instance, the indicator presenting module 308* of the automated customized food generation machine 10*a* or 10*b* of FIG. 3A or 3B (or of the network device 12*a* or 12*b* of FIG. 3D or 3E) presenting the one or more indicators (e.g., indicator 220*a* or 220*c* of FIG. 2A or 2C) that identify the one or more substitute automated customized food generation machines (e.g., the automated customized food generation machines 10" and 10'" of FIGS. 1B, 1C, 1D, and/or 1E), the identification of the one or more substitute automated customized food generation machines (e.g., indicator 220*a* or 220*c* of FIG. 2A or 2C) being in response, at least in part, on one or more determined locations of the one or more substitute automated customized food generation machines relative to the location of the user 13 (e.g., only those substitute customized food generation machines that is closest to the user 13 may be identified rather than identifying all nearby substitute customized food generation machines).

In some implementations, the indicator presenting operation 908 may include an operation 1087 for presenting the one or more indicators that identify the one or more substitute automated customized food generation machines, the identification of the one or more substitute automated customized food generation machines by the one or more presented indicators being in response, at least in part, to one or more determined locations of the one or more substitute automated customized food generation machines relative to one or more past travel paths of the user as illustrated in FIG. 10C. For instance, the indicator presenting module 308* of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines (e.g., the automated customized food generation machines 10" and 10'" of FIGS. 1B, 1C, 1D, and/or 1E), the identification of the one or more substitute automated customized food generation machines by the one or more presented indicators 220* being in response, at least in part, to one or more determined locations of the one or more substitute automated customized food generation machines relative to one or more past travel paths of the user 13. For example, in some cases, only those substitute automated customized food generation machines that are located along or near (e.g., within 100 yards) the past travel paths of the user 13 may be listed (e.g., in FIG. 2A, only option 1 may be listed as option 2 is not located along or near the past travel paths of the user 13). In such cases, an option could also be provided (e.g. provided through, for example, a graphical user interface), that allows the user 13 to elect to have all nearby substitute automated customized food generation machines including those that are not located along or near the past travel paths of the user 13.

In some implementations, the indicator presenting operation 908 may include an operation 1088 for presenting the one or more indicators that identify the one or more substitute automated customized food generation machines, the identification of the one or more substitute automated customized food generation machines by the one or more presented indicators being in response, at least in part, on one or more identified prices of one or more substitute customized food items that the one or more substitute automated customized food generation machines are able to currently generate and that are only in partial compliance with the one or more customized food preferences of the user. For instance, the indicator presenting module 308* of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines (e.g., the automated customized food generation machines 10" and 10'" of FIGS. 1B, 1C, 1D, and/or 1E), the identification of the one or more substitute automated customized food generation machines by the one or more presented indicators 220* being in response, at least in part, on one or more identified prices of one or more substitute customized food items that the one or more substitute automated customized food generation machines are able to currently generate and that are only in partial compliance with the one or more customized food preferences of the user 13. For example, in some cases, only those nearby substitute automated customized food generation machines that sell the cheapest substitute customized food items may at least be initially identified. Of course, in such cases, the user 13 may be provided with an option (e.g., via graphical user interface) to elect to have all nearby substitute automated customized food generation machines identified.

In some implementations, the indicator presenting operation 908 may include an operation 1089 for presenting the one or more indicators that identify the one or more substitute automated customized food generation machines, the identification of the one or more substitute automated customized food generation machines by the one or more presented indicators being in response, at least in part, to detected past usage of the one or more substitute automated customized food generation machines by the user. For instance, the indicator presenting module 308* of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines (e.g., the automated customized food generation machines 10" and 10'" of FIGS. 1B, 1C, 1D, and/or 1E), the identification of the one or more substitute automated customized food generation machines by the one or more presented indicators 220* being in response, at least in part, to detected past usage of the one or more substitute automated customized food generation machines by the user 13. For example, in some cases, a user 13 may prefer to use automated customized food generation machines that the user 13 has previously used. Thus, in some cases, only those nearby substitute automated customized food generation machines that the user 13 has previously used may at least be initially identified. Again, the user 13 may also be given an option (e.g., via graphical user interface) to view other nearby substitute automated customized food generation machines even if they were never previously used by the user 13.

In some implementations, the indicator presenting operation 908 may include an operation 1090 for presenting the one or more indicators that identify the one or more substitute automated customized food generation machines in response to the identification of the one or more substitute automated customized food generation machines and in response to the determination that there is no capable automated customized food generation machines present in the nearby vicinity of the user. For instance, the indicator presenting module 308* of the automated customized food generation machine 10*a* or 10*b* of FIG. 3A or 3B (or of the network device 12*a* or 12*b* of FIG. 3D or 3E) presenting the one or more indicators 220* that identify the one or more substitute automated customized food generation machines (e.g., the automated customized food generation machines 10'' and 10''' of FIGS. 1B, 1C, 1D, and/or 1E) in response to the identification of the one or more substitute automated customized food generation machines and in response to the determination that there is no capable automated customized food generation machines present in the nearby vicinity (e.g., within 30 minutes walking distance) of the user 13.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In some instances, one or more components may have been referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:

at least one processing device; and one or more instructions which, when executed by the at least one processing device, configure the at least one processing device to perform one or more operations including at least:

acquiring at least one indication of at least one user preference, the at least one user preference related to at least one food customization preferred by at least one user;

determining that there is no capable automated customized food generation machine that is able to currently generate one or more food items in compliance with the at least one user preference;

identifying one or more substitute automated customized food generation machines that are able to currently generate at least one substitute food item that is only in partial compliance with the at least one user preference;

presenting one or more indicators of the identified one or more substitute automated customized food generation machines; and controlling at least one food manufacturing component of the one or more substitute automated customized food generation machines to generate the at least one substitute food item that is only in partial compliance with the at least one user preference.

2. The system of claim 1, wherein acquiring at least one indication of at least one user preference, the at least one user preference related to at least one food customization preferred by at least one user comprises:

acquiring at least one indication of at least one user preference, the at least one user preference related to purity of one or more ingredients for use in generating one or more food items.

3. The system of claim 2, wherein acquiring at least one indication of at least one user preference, the at least one user preference related to purity of one or more ingredients comprises:

acquiring at least one indication of at least one user preference, the at least one user preference including that one or more sources for the one or more ingredients were tested for presence or absence of one or more impurities.

4. The system of claim 1, wherein acquiring at least one indication of at least one user preference, the at least one user preference related to at least one food customization preferred by at least one user comprises:

acquiring at least one indication of at least one user preference, the at least one user preference including that one or more ingredients for use in generating one or more food items were obtained from at least one of one or more specified sources or one or more specified locations.

5. The system of claim 1, wherein acquiring at least one indication of at least one user preference, the at least one user preference related to at least one food customization preferred by at least one user comprises:

acquiring at least one indication of at least one user preference, the at least one user preference including that one or more ingredients for use in generating one or more food items were not obtained from at least one of one or more specified sources or one or more specified locations.

6. The system of claim 1, wherein acquiring at least one indication of at least one user preference, the at least one user preference related to at least one food customization preferred by at least one user comprises:

acquiring at least some user behavior information, the at least some user behavior information related to one or more historical behaviors of the at least one user indicative of one or more past user preferences of the at least one user.

7. The system of claim 6, wherein acquiring at least some user behavior information, the at least some user behavior information related to one or more historical behaviors of the at least one user indicative of one or more past user preferences of the at least one user comprises:

acquiring one or more of at least some historical travel information or at least some movement information related to the at least one user.

8. The system of claim 6, wherein acquiring at least some user behavior information, the at least some user behavior information related to one or more historical behaviors of the at least one user indicative of one or more past user preferences of the at least one user comprises:

acquiring at least some user historical usage information, the at least some user historical usage information indicative of at least some past usage of one or more automated customized food generation machines by the at least one user.

9. The system of claim 1, wherein determining that there is no capable automated customized food generation machine that is able to currently generate one or more food items in compliance with the at least one user preference comprises:

determining that there is no capable automated customized food generation machine that is able to currently generate one or more food items in compliance with one or more ingredient preferences of the at least one user.

10. The system of claim 1, wherein for determining that there is no capable automated customized food generation machine that is able to currently generate one or more food items in compliance with the at least one user preference comprises;

determining that there is no capable automated customized food generation machine that is able to currently generate one or more food items in compliance with one or more ingredient purity preferences of the at least one user.

11. The system of claim 10, wherein determining that there is no capable automated customized food generation machine that is able to currently generate one or more food items in compliance with one or more ingredient purity preferences of the at least one user comprises:

determining that there is no capable automated customized food generation machine that is able to currently generate one or more food items in compliance with one or more user preferences that one or more sources for one or more ingredients for the one or more food items were tested for at least one of presence or absence of one or more impurities.

12. The system of claim 1, wherein identifying one or more substitute automated customized food generation machines that are able to currently generate at least one substitute food item that is only in partial compliance with the at least one user preference comprises:

querying one or more nearby automated customized food generation machines in order to determine whether any one or more of the one or more nearby automated customized food generation machines have one or more appropriate ingredient supplies to be able to currently generate at least one substitute food item that is only in partial compliance with the at least one user preference.

13. The system of claim 1, wherein identifying one or more substitute automated customized food generation machines that are able to currently generate at least one substitute food item that is only in partial compliance with the at least one user preference comprises:

identifying only those substitute automated customized food generation machines present within a mile from a current location of the at least one user.

14. The system of claim 1, wherein identifying one or more substitute automated customized food generation machines that are able to currently generate at least one substitute food item that is only in partial compliance with the at least one user preference comprises:

identifying one or more substitute automated customized food generation machines that do not have one or more preferred ingredients, as preferred by the at least one user, in order to be able to currently generate one or more customized food items in compliance with the one or more customized food preferences of the at least one user.

15. The system of claim 1, wherein identifying one or more substitute automated customized food generation machines that are able to currently generate at least one substitute food item that is only in partial compliance with the at least one user preference comprises:

identifying one or more substitute automated customized food generation machines that are able to currently generate at least one substitute food item that is only in partial compliance with the at least one user preference based at least in part on the one or more substitute automated customized food generation machines not having one or more ingredients preferred by the user as indicated by the at least one user preference in sufficient quantities to be able to generate at least one food item in full compliance with the at least one user preference but having the one or more ingredients preferred by the user as indicated by the at least on user preference in sufficient quantities to be able to generate the at least one food item in partial compliance with the at least one user preference, including at least determining that at least one user preference for artificial sweetener versus non-artificial sweetener may be partially satisfied through generation of at least one food item using at least one remaining quantity of artificial sweetener present in the one or more substitute automated customized food generation machines that is equal to at least half, but not an entirety, of an amount of sweetener required for generation of the at least one food item and using non-artificial sweetener present in the one or more substitute automated customized food generation machines for the remainder.

16. The system of claim 1, wherein identifying one or more substitute automated customized food generation machines that are able to currently generate at least one substitute food item that is only in partial compliance with the at least one user preference comprises:

determining at least one current location of the at least one user at least partially based on at least one received indication derived from at least one hardware-based position sensor of at least one mobile device associated with the at least one user; and identifying one or more substitute automated customized food generation machines within at least one proximity of the at least one current location of the at least one user that are able to currently generate at least one substitute food item that is only in partial compliance with the at least one user preference.

17. The system of claim 1, wherein identifying one or more substitute automated customized food generation machines that are able to currently generate at least one substitute food item that is only in partial compliance with the at least one user preference comprises:

identifying one or more substitute automated customized food generation machines that are able to currently generate at least one substitute food item that is only in compliance with a majority of the at least one user preference.

18. The system of claim 1, wherein identifying one or more substitute automated customized food generation machines that are able to currently generate at least one substitute food item that is only in partial compliance with the at least one user preference comprises:

identifying one or more substitute automated customized food generation machines that are able to currently generate at least one substitute food item that is in compliance with at least a first user preference and not in compliance with at least a second user preference.

19. The system of claim 18, wherein identifying one or more substitute automated customized food generation machines that are able to currently generate at least one substitute food item that is in compliance with at least a first user preference and not in compliance with at least a user preference comprises:

identifying one or more substitute automated customized food generation machines that are able to currently generate at least one substitute food item that is in compliance with at least one user preference related to ingredients preferred by the at least one user and not in compliance with at least one user preference related to ingredient integrity preferred by the at least one user.

20. The system of claim 19, wherein identifying one or more substitute automated customized food generation machines that are able to currently generate at least one substitute food item that is in compliance with at least one user preference related to ingredients preferred by the at least one user and not in compliance with at least one user preference related to ingredient integrity preferred by the at least one user comprises:

identifying one or more substitute automated customized food generation machines that are able to currently generate at least one substitute food item that is in compliance with at least one user preference related to ingredients preferred by the at least one user and not in compliance with at least one user preference related to obtaining or not obtaining one or more ingredients from at least one of one or more specified sources or one or more specified locations.

21. The system of claim 18, wherein identifying one or more substitute automated customized food generation machines that are able to currently generate at least one substitute food item that is in compliance with at least a first user preference and not in compliance with at least a user preference comprises:

identifying one or more substitute automated customized food generation machines that are able to currently generate at least one substitute food item that is in compliance with at least one user preference related to ingredient integrity of the at least one user and not in compliance with at least one user preference related to ingredient preferences of the at least one user.

22. The system of claim 21, wherein identifying one or more substitute automated customized food generation machines that are able to currently generate at least one substitute food item that is in compliance with at least one user preference related to ingredient integrity of the at least one user and not in compliance with at least one user preference related to ingredient preferences of the at least one user comprises:

ascertaining one or more substitute automated customized food generation machines that are able to currently generate at least one substitute food item that is in compliance with at least one user preference related to obtaining or not obtaining one or more ingredients from at least one of one or more specified sources or from one or more specified locations and not in compliance with at least one user preference related to ingredient preferences.

23. The system of claim 18, wherein identifying one or more substitute automated customized food generation machines that are able to currently generate at least one substitute food item that is in compliance with at least a first user preference and not in compliance with at least a user preference comprises:

ascertaining one or more substitute automated customized food generation machines that are able to currently generate at least one substitute food item that is in compliance with at least a first user preference related to one or more ingredients preferred by the at least one user and not in compliance with at least a second user preference related to one or more ingredients preferred by the at least one user.

24. The system of claim 18, wherein identifying one or more substitute automated customized food generation machines that are able to currently generate at least one substitute food item that is in compliance with at least a first user preference and not in compliance with at least a user preference comprises:

ascertaining one or more substitute automated customized food generation machines that are able to currently generate at least one substitute food item that is in compliance with at least a first user preference related to ingredient integrity and not in compliance with at least a second user preference related to ingredient integrity.

25. The system of claim 1, wherein presenting one or more indicators of the identified one or more substitute automated customized food generation machines comprises:

presenting one or more indicators of the identified one or more substitute automated customized food generation machines in response to the determining that there is no capable automated customized food generation machine that is able to currently generate one or more food items in compliance with the at least one user preference.

26. The system of claim 1, wherein presenting one or more indicators of the identified one or more substitute automated customized food generation machines comprises:

presenting one or more graphical indicators that graphically indicate the one or more substitute automated customized food generation machines.

27. The system of claim 1, wherein presenting one or more indicators of the identified one or more substitute automated customized food generation machines comprises:

presenting one or more indicators that indicate one or more distances to one or more locations of the one or more substitute automated customized food generation machines from a current location of the at least one user.

28. The system of claim 1, wherein presenting one or more indicators of the identified one or more substitute automated customized food generation machines comprises:

presenting one or more indicators that specify one or more customized food preference deficiencies relative to the at least one user preference of one or more substitute food items that the one or more substitute automated customized food generation machines are able to currently generate.

29. The system of claim 1, wherein presenting one or more indicators of the identified one or more substitute automated customized food generation machines comprises:

presenting one or more indicators that specifically identify the one or more substitute automated customized food generation machines as being located along one or more past travel paths of the at least one user.

30. The system of claim 1, wherein presenting one or more indicators of the identified one or more substitute automated customized food generation machines comprises:

presenting one or more indicators that provide one or more prices associated with one or more substitute food items that the one or more substitute automated customized food generation machines are able to currently generate and that are only in partial compliance with the at least one user preference.

31. The system of claim 1, wherein presenting one or more indicators of the identified one or more substitute automated customized food generation machines comprises:

presenting one or more indicators that identify the one or more substitute automated customized food generation machines in response, at least in part, on one or more determined locations of the one or more substitute automated customized food generation machines relative to the location of the at least one user.

32. The system of claim 1, wherein presenting one or more indicators of the identified one or more substitute automated customized food generation machines comprises:

presenting one or more indicators that identify the one or more substitute automated customized food generation machines in response, at least in part, to one or more determined locations of the one or more substitute automated customized food generation machines relative to one or more past travel paths of the at least one user.

33. The system of claim 1, wherein presenting one or more indicators of the identified one or more substitute automated customized food generation machines comprises:

presenting one or more indicators that identify the one or more substitute automated customized food generation machines in response, at least in part, on one or more identified prices of one or more substitute food items that the one or more substitute automated customized food generation machines are able to currently generate and that are only in partial compliance with the at least one user preference.

34. The system of claim 1, wherein presenting one or more indicators of the identified one or more substitute automated customized food generation machines comprises:

presenting one or more indicators that identify the one or more substitute automated customized food generation machines in response, at least in part, to at least some detected past usage of the one or more substitute automated customized food generation machines by the at least one user.

35. A system, comprising:

a computing device; and at least one non-transitory computer-readable medium coupled with the computing device including at least one or more instructions which, when executed by the computing device, cause the computing device to perform one or more operations including at least:

acquiring at least one indication of at least one user preference, the at least one user preference related to at least one food customization preferred by at least one user;

determining that there is no capable automated customized food generation machine that is able to currently generate one or more food items in compliance with the at least one user preference;

identifying one or more substitute automated customized food generation machines that are able to currently generate at least one substitute food item that is only in partial compliance with the at least one user preference;

presenting one or more indicators of the identified one or more substitute automated customized food generation machines; and controlling at least one food manufacturing component of the one or more substitute automated customized food generation machines to generate the at least one substitute food item that is only in partial compliance with the at least one user preference.

36. A method, comprising:

acquiring at least one indication of at least one user preference, the at least one user preference related to at least one food customization preferred by at least one user;

determining that there is no capable automated customized food generation machine that is able to currently generate one or more food items in compliance with the at least one user preference;

identifying one or more substitute automated customized food generation machines that are able to currently generate at least one substitute food item that is only in partial compliance with the at least one user preference;

presenting one or more indicators of the identified one or more substitute automated customized food generation machines; and controlling at least one food manufacturing component of the one or more substitute automated customized food generation machines to generate the at least one substitute food item that is only in partial compliance with the at least one user preference.

37. The system of claim 1, wherein identifying one or more substitute automated customized food generation machines that are able to currently generate at least one substitute food item that is only in partial compliance with the at least one user preference comprises:

identifying one or more substitute automated customized food generation machines that have one or more ingredients preferred by the user as indicated by the at least one user preference in one or more insufficient quantities that only allows the one or more substitute automated customized food generation machines to be able to currently generate at least one substitute food item that is only in partial compliance with the at least one user preference.

38. The system of claim 1, wherein identifying one or more substitute automated customized food generation machines that are able to currently generate at least one substitute food item that is only in partial compliance with the at least one user preference comprises:

identifying one or more substitute automated customized food generation machines that are able to currently generate at least one substitute food item that is in compliance with one or more food preparation preferences of the user and not in compliance with one or more ingredient preferences of the user.

39. The system of claim 1, wherein identifying one or more substitute automated customized food generation machines that are able to currently generate at least one substitute food item that is only in partial compliance with the at least one user preference comprises:

receiving at least one travel route associated with the at least one user; and identifying one or more substitute automated customized food generation machines within at least one proximity of the at least one travel route associated with the at least one user that are able to currently generate at least one substitute food item that is only in partial compliance with the at least one user preference.

40. The system of claim 1 wherein presenting one or more indicators of the identified one or more substitute automated customized food generation machines comprises:

transmitting the one or more indicators of the identified one or more substitute automated customized food generation machines to at least one mobile device associated with the at least one user; and causing the at least one mobile device to present one or more locations of the one or more substitute automated customized food generation machines.

41. The system of claim 1, wherein controlling at least one food manufacturing component of the one or more substitute automated customized food generation machines to generate the at least one substitute food item that is only in partial compliance with the at least one user preference comprises:

initiating the generation of the at least one substitute food item that is only in partial compliance with the at least one user preference upon the one or more substitute automated customized food generation machines detecting at least one mobile device associated with the at least one user within at least one proximity of the one or more substitute automated customized food generation machines at least in part based on at least one Wi-Fi communication between the at least one mobile device and the one or more substitute automated customized food generation machines.

* * * * *

UNITED STATES PATENT AND TRADEMARK OFFICE

CERTIFICATE OF CORRECTION

PATENT NO. : 10,346,899 B2
APPLICATION NO. : 14/228601
DATED : July 9, 2019
INVENTOR(S) : Pablos Holman et al.

It is certified that error appears in the above-identified patent and that said Letters Patent is hereby corrected as shown below:

In the Claims

Please replace Column 72, Line 50, Claim 15:
"by the at least on user preference"

With:
--by the at least one user preference--

Signed and Sealed this
Third Day of September, 2019

Andrei Iancu
*Director of the United States Patent and Trademark Office*